US012803305B2

(12) United States Patent
Li et al.

(10) Patent No.: US 12,803,305 B2
(45) Date of Patent: Nov. 17, 2026

(54) POWER TOOL AND POWER TOOL SYSTEM

(71) Applicant: Nanjing Chervon Industry Co., Ltd., Nanjing (CN)

(72) Inventors: Peiyong Li, Nanjing (CN); Baofeng Fan, Nanjing (CN); Qingqing Pei, Nanjing (CN); Changwei Zuo, Nanjing (CN); Shubin Tong, Nanjing (CN); Min Zhu, Nanjing (CN); Guillaume Keller, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 803 days.

(21) Appl. No.: 18/187,869

(22) Filed: Mar. 22, 2023

(65) Prior Publication Data

US 2023/0352951 A1 Nov. 2, 2023

(30) Foreign Application Priority Data

Apr. 27, 2022 (CN) ......................... 202210453517.0
Dec. 2, 2022 (CN) ......................... 202211534750.8
(Continued)

(51) Int. Cl.
*H02J 7/60* (2026.01)
*F21L 4/04* (2006.01)
(Continued)

(52) U.S. Cl.
CPC ................ *H02J 7/685* (2026.01); *F21L 4/04* (2013.01); *H02J 7/50* (2026.01); *H02J 7/63* (2026.01);
(Continued)

(58) Field of Classification Search
CPC ...... H02J 7/685; H02J 7/50; H02J 7/63; H02J 7/751; H02J 7/96; H02J 2105/44;
(Continued)

(56) References Cited

U.S. PATENT DOCUMENTS 6,104,162 A * 8/2000 Sainsbury ............... H02J 7/875 320/111
7,656,131 B2 * 2/2010 Embrey .................. H02J 7/685 320/152
(Continued)

FOREIGN PATENT DOCUMENTS

CN 105207282 A 12/2015
CN 103001275 B 7/2017
(Continued)

*Primary Examiner* — M Baye Diao
(74) *Attorney, Agent, or Firm* — Greenberg Traurig, LLP

(57) ABSTRACT

A power tool includes a power tool body. The power tool body is configured to be adapted to at least a first battery pack having a first nominal voltage and a first output terminal set and a second battery pack having a second nominal voltage and a second output terminal set, where the first nominal voltage is different from the second nominal voltage. The power tool body includes a first input terminal
(Continued)

set configured to be selectively electrically connected to one of the first output terminal set and the second output terminal set to supply power to the power tool body.

18 Claims, 34 Drawing Sheets

(30) Foreign Application Priority Data

| | | |
|---|---|---|
| Dec. 2, 2022 | (CN) | 202223218090.0 |
| Dec. 8, 2022 | (CN) | 202223293650.9 |
| Feb. 9, 2023 | (CN) | 202310107579.0 |

(51) Int. Cl.

| | |
|---|---|
| ***F21V 21/06*** | (2006.01) |
| ***F21V 21/14*** | (2006.01) |
| ***F21V 21/22*** | (2006.01) |
| ***H02J 7/50*** | (2026.01) |
| ***H02J 7/63*** | (2026.01) |
| ***H02J 7/70*** | (2026.01) |
| ***H02J 7/96*** | (2026.01) |
| ***H02J 105/44*** | (2026.01) |
| ***H02P 4/00*** | (2006.01) |

(52) U.S. Cl.
CPC ................ *H02J 7/751* (2026.01); *H02J 7/96* (2026.01); *H02P 4/00* (2013.01); *F21V 21/06* (2013.01); *F21V 21/145* (2013.01); *F21V 21/22* (2013.01); *H02J 2105/44* (2026.01)

(58) Field of Classification Search
CPC .... F21L 4/04; H02P 4/00; F21V 21/06; F21V 21/145; F21V 21/22; B25F 5/00
USPC .......................................... 320/137; 307/150
See application file for complete search history.

(56) References Cited

U.S. PATENT DOCUMENTS

| | | | | |
|---|---|---|---|---|
| 7,731,386 | B2 * | 6/2010 | Levine | F21V 19/02 362/427 |
| 8,025,418 | B2 * | 9/2011 | Zick | F21V 21/406 362/183 |
| 8,169,298 | B2 * | 5/2012 | Wiesner | G08B 13/1409 340/10.33 |
| 8,197,083 | B2 * | 6/2012 | Halasz | F21V 23/0414 362/187 |
| 8,813,866 | B2 * | 8/2014 | Suzuki | B25F 5/00 173/2 |
| 10,378,739 | B2 * | 8/2019 | Harvey | F21V 17/007 |
| 11,096,265 | B1 * | 8/2021 | Lin | H05B 47/20 |
| 2003/0203669 | A1 * | 10/2003 | Glauning | H01M 50/296 439/500 |
| 2007/0076410 | A1 * | 4/2007 | Halasz | F21V 14/045 362/197 |
| 2011/0197389 | A1 * | 8/2011 | Ota | B25F 5/00 429/121 |
| 2011/0198103 | A1 * | 8/2011 | Suzuki | B25F 5/00 173/46 |
| 2015/0054464 | A1 * | 2/2015 | Suzuki | H01M 10/46 320/112 |
| 2016/0204475 | A1 * | 7/2016 | White | B25F 5/02 429/97 |
| 2018/0198299 | A1 * | 7/2018 | Martinen | H02J 7/751 |
| 2019/0259985 | A1 * | 8/2019 | Hanawa | H01M 50/213 |

FOREIGN PATENT DOCUMENTS

| | | | |
|---|---|---|---|
| CN | 112128647 | A | 12/2020 |
| CN | 212298876 | U | 1/2021 |
| CN | 212434789 | U | 1/2021 |
| CN | 112377838 | A | 2/2021 |
| CN | 110912240 | B | 9/2025 |
| DE | 102008040061 | A1 | 1/2010 |
| KR | 20100134360 | A | 12/2010 |
| WO | 2017167210 | A1 | 10/2017 |

* cited by examiner

POWER TOOL AND POWER TOOL SYSTEM

RELATED APPLICATION INFORMATION

This application claims the benefit under 35 U.S.C. § 119(a) of Chinese Patent Application No. 202210453517.0, filed on Apr. 27, 2022, Chinese Patent Application No. 202211534777.7, filed on Dec. 2, 2022, Chinese Patent Application No. 202223218090.0, filed on Dec. 2, 2022, Chinese Patent Application No. 202211534750.8, filed on Dec. 2, 2022, Chinese Patent Application No. 202223293650.9, filed on Dec. 8, 2022, and Chinese Patent Application No. 202310107579.0, filed on Feb. 9, 2023, which applications are incorporated herein by reference in their entirety.

BACKGROUND

A power tool may be used in various scenarios of production and life. A rechargeable battery pack is configured to supply power to the power tool so that the power tool is free from wires and more convenient for a user to use.

In the related art, when the power tool uses the battery pack, the power tool needs to be adapted to the battery pack in dimension and specification. That is to say, one power tool can be adapted to only battery packs with one specification and one dimension.

SUMMARY

A power tool includes a power tool body. The power tool body is configured to be adapted to at least a first battery pack having a first nominal voltage and a first output terminal set and a second battery pack having a second nominal voltage and a second output terminal set, where the first nominal voltage is different from the second nominal voltage. The power tool body includes a first input terminal set configured to be selectively electrically connected to one of the first output terminal set and the second output terminal set to supply power to the power tool body.

In some examples, the power tool body includes a controller configured to acquire a connection state of a preset terminal in the first input terminal set and determine, according to the connection state of the preset terminal, that the first battery pack or the second battery pack is connected to the power tool body.

In some examples, when a number or structure of terminals in the first output terminal set is different from a number or structure of terminals in the second output terminal set, any terminal in the first input terminal set is arranged in correspondence to a terminal in the first output terminal set, and the preset terminal in the first input terminal set is staggered relative to a terminal in the second output terminal set.

In some examples, the controller is configured to determine that the first battery pack is connected to the power tool body when acquiring that the preset terminal in the first input terminal set is connected to a signal.

In some examples, the preset terminal is selectively connected to a first output terminal in the first output terminal set or a second output terminal in the second output terminal set, where the first output terminal outputs a first type of signal and the second output terminal outputs a second type of signal.

In some examples, the controller is configured to determine that the first battery pack is connected to the power tool body when acquiring that the preset terminal is connected to the first type of signal and determine that the second battery pack is connected to the power tool body when the preset terminal is connected to the second type of signal.

In some examples, the power tool body includes a conversion circuit configured to, when the second battery pack is connected to the power tool body, make a communication power supply be electrically connected to the preset terminal and when the first battery pack is connected to the power tool body, make the communication power supply be disconnected from the preset terminal.

In some examples, the conversion circuit is further configured to, when the first battery pack is connected to the power tool body, prevent a current of the first battery pack from flowing to the power tool body through the first output terminal.

In some examples, the power tool body includes an over-discharge protection circuit configured to prevent a current of a battery pack from flowing to the power tool body when a voltage outputted by the battery pack is less than a preset voltage; and a compatible circuit configured to enable the over-discharge protection circuit to be adapted to a first preset voltage of the first battery pack and a second preset voltage of the second battery pack.

In some examples, the first output terminal set is different from the second output terminal set, and the first input terminal set is configured to be selectively electrically connected to one of the first output terminal set and the second output terminal set to supply power to the power tool body.

In some examples, the controller is configured to operate when a first voltage is applied. The power tool body further includes a voltage regulation mechanism converting an input voltage inputted from the first input terminal set and outputting the converted input voltage to supply power to the controller. The voltage regulation mechanism includes a first transformer circuit and a second transformer circuit, where when the input voltage is greater than the first voltage, the second transformer circuit transforms the input voltage to the first voltage; and when the input voltage is less than or equal to the first voltage, the first transformer circuit transforms the input voltage to a second voltage and the second transformer circuit transforms the second voltage to the first voltage.

In some examples, the voltage regulation mechanism further includes a first control circuit, where when the input voltage is greater than the first voltage, the first control circuit is turned on and the second transformer circuit transforms the input voltage to the first voltage; and when the input voltage is less than or equal to the first voltage, the first transformer circuit transforms the input voltage to the second voltage and the second transformer circuit transforms the second voltage to the first voltage.

In some examples, the power tool body is a lighting device.

In some examples, the lighting device is used for standing on the ground and illuminating a work region and includes a support mechanism; a lighting mechanism including a lamp head for emitting light; and a connection mechanism for supporting the lamp head, where the connection mechanism is connected to the support mechanism. The lighting device includes a standing mode and a storage mode, where in the standing mode, the lighting device is configured to be supported by a resting surface of the support mechanism. The support mechanism includes a base and a support leg, where one support leg is provided; when the lighting device is in the standing mode, a first end of the support leg is connected to the base, a second end of the support leg is away from the base, and a projection of the second end on the resting surface is at least partially outside a projection of the base on the resting surface.

In some examples, the power tool body includes an electric motor and a controller for controlling the electric motor.

A power tool system includes a power tool body and multiple battery packs having different nominal voltages. The multiple battery packs having different nominal voltages have at least two different output terminal sets. The power tool body includes a first input terminal set configured to be selectively electrically connected to one of the different output terminal sets to supply power to the power tool body.

A power tool system includes a power tool body and a first battery pack having a first nominal voltage and a first output terminal set. The power tool body is configured to be further adapted to at least a second battery pack having a second nominal voltage and a second output terminal set, where the first nominal voltage is different from the second nominal voltage. The power tool body includes a first input terminal set configured to be selectively electrically connected to one of the first output terminal set and the second output terminal set to supply power to the power tool body.

In some examples, the power tool body is a lighting device.

In some examples, the lighting device is used for standing on the ground and illuminating a work region and includes a support mechanism; a lighting mechanism including a lamp head for emitting light; and a connection mechanism for supporting the lamp head, where the connection mechanism is connected to the support mechanism. The lighting device includes a standing mode and a storage mode, where in the standing mode, the lighting device is configured to be supported by a resting surface of the support mechanism; and the support mechanism includes a base and a support leg, where one support leg is provided, and in the standing mode, the resting surface includes at least one end of the support leg.

In some examples, the power tool body includes an electric motor and a controller for controlling the electric motor.

DETAILED DESCRIPTION

The present application is described below in detail in conjunction with drawings and examples.

In the description of the present application, terms "joined", "connected", and "secured" are to be understood in a broad sense unless otherwise expressly specified and limited. For example, the term "connected" may refer to "securely connected", "detachably connected", or "integrated", may refer to "mechanically connected" or "electrically connected", or may refer to "connected directly", "connected indirectly through an intermediary", "connected inside two components", or "an interaction relation between two components". For those of ordinary skill in the art, specific meanings of the preceding terms in the present application may be understood based on specific situations.

In the present application, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

Figure 1:
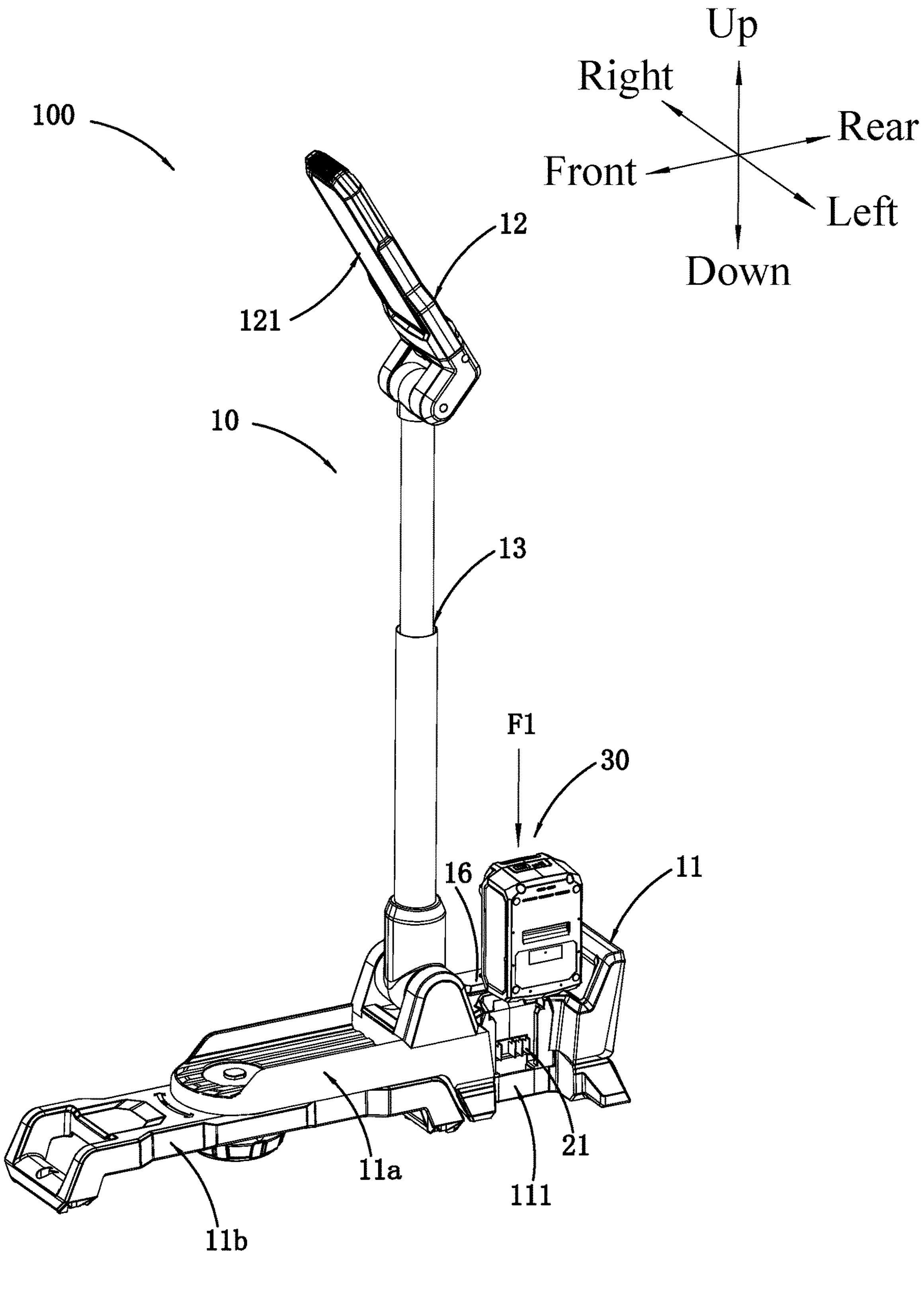
FIG. 1 is a structural view of an example of the present application, with a battery pack not connected to a lighting device.
Figure 2:
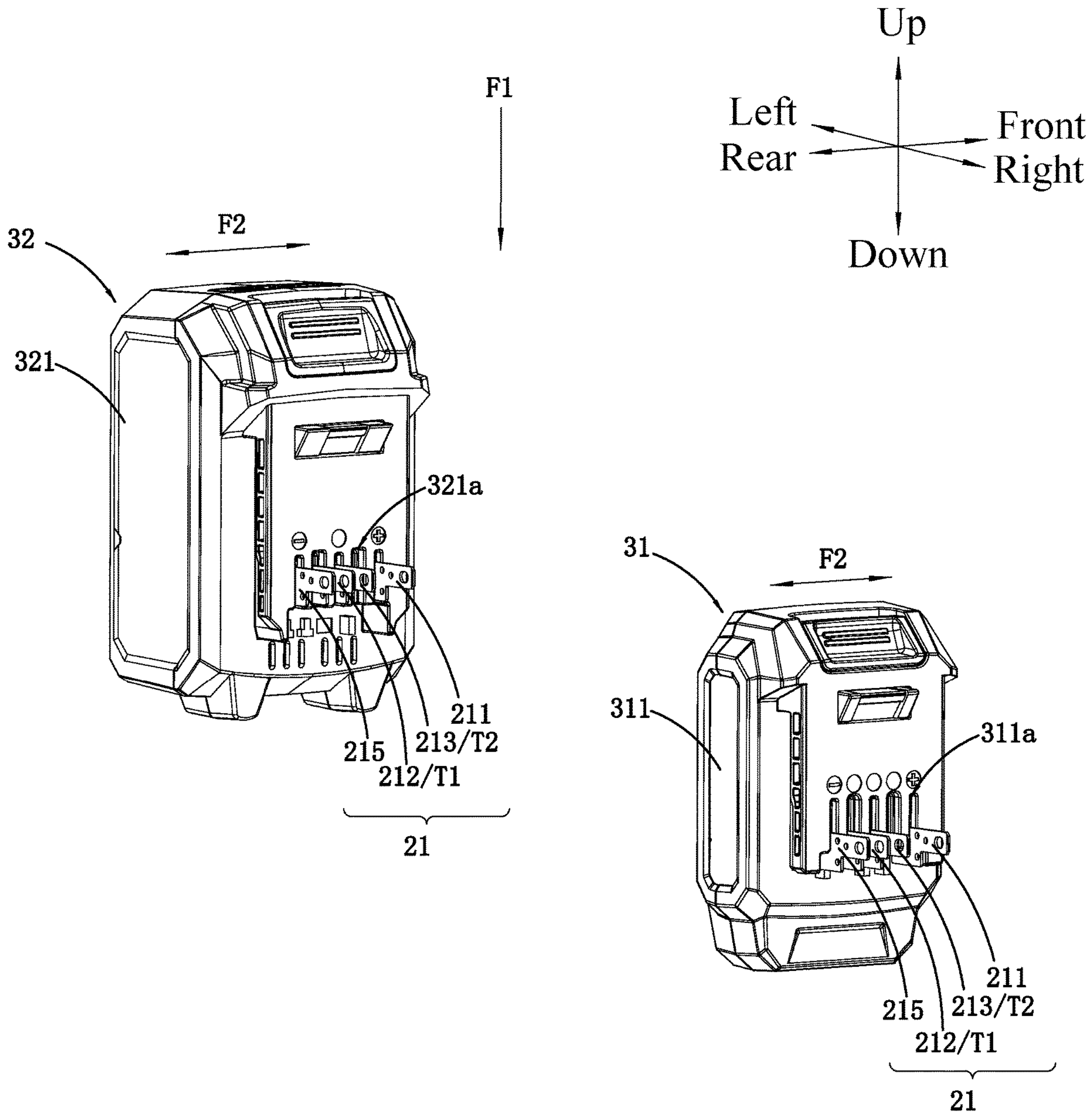
FIG. 2 is a structural view of a first battery pack and a first input terminal set that are assembled and a second battery pack and the first input terminal set that are assembled in the present application.

To describe technical solutions of the present application clearly, an upper side, a lower side, a left side, a right side, a front side, and a rear side as shown in FIGS. 1 and 2 are further defined.

FIG. 1 shows a power tool 100 in an example of the present application. The power tool 100 includes a power tool body 10 and a direct current power supply 30. The direct current power supply 30 is detachably connected to the power tool body 10 to supply power to the power tool body 10. In this example, the power tool body 10 is specifically a lighting device 10. The direct current power supply 30 is a battery pack. In the following description, the direct current power supply 30 is replaced with the battery pack 30, which is not intended to limit the present invention.

FIG. 1 shows the lighting device 10 in the example of the present application, where the lighting device 10 is used for illuminating a work region. The lighting device 10 is a portable frame lamp that is easy to carry. When a user needs to work outdoors, the user may bring the lighting device 10 to the outdoors, thereby satisfying lighting requirements. The lighting device 10 in this example is different from a desk lamp which is generally placed on a desktop for illumination. The lighting device 10 in FIG. 1 generally stands on the ground to illuminate the work region when in use, so the lighting device 10 may also be referred to as a ground standing lamp.

The lighting device 10 may be powered by the battery pack 30 so that even when the user works outdoors and no mains power is provided around, the battery pack 30 can be used for supplying power to the lighting device 10 which is convenient to use. Therefore, the lighting device 10 is different from an existing lamp that can only be powered by an alternating current, and the lighting device 10 may also be referred to as a direct current lighting device 10. It is to be understood that the lighting device 10 is not limited to the power supplied by only the battery pack 30. If the lighting device 10 can be powered by both the battery pack 30 and the alternating current, the lighting device 10 may also be referred to as a direct current standing lamp.

In this example, the lighting device 10 includes a support mechanism 11, a lighting mechanism 12, and a connection mechanism 13. The support mechanism 11 includes a base 11*a* and a support leg 11*b* connected to the base 11*a*. The base 11*a* includes a battery mounting portion 111 for connecting and holding the battery pack 30. The lighting mechanism 12 includes a lamp head 121 for emitting light. The connection mechanism 13 is used for supporting the lamp head 121. The connection mechanism 13 is connected to the support mechanism 11.

As shown in FIGS. 1 to 5, the lighting device 10 is adaptable to at least a first battery pack 31 having a first nominal voltage and a second battery pack 32 having a second nominal voltage. The first nominal voltage is different from the second nominal voltage. The first battery pack 31 includes a first output terminal set 22. The second battery pack 32 includes a second output terminal set 23. The first output terminal set 22 is different from the second output terminal set 23. The lighting device 10 is selectively electrically connected to the first output terminal set 22 and the second output terminal set 23 through a first input terminal set 21. In this example, the first nominal voltage is different from the second nominal voltage, and a first dimension of the first battery pack 31 is different from a second dimension of the second battery pack 32. Thus, a position of a first output terminal on the first battery pack 31 is different from a position of a second output terminal on the second battery pack 32. The first input terminal set 21 is partially disposed on the battery mounting portion 111. The first input terminal set 21 includes a first input terminal 21*a*. The first input terminal is at least partially disposed on the battery mounting portion 111. The first input terminal 21*a* includes a first inserting portion 1121 and a second inserting portion 1122, where the first inserting portion 1121 is in contact with the first output terminal 22*a* of the first battery pack 31, and the second inserting portion 1122 is in contact with the second output terminal 23*a* of the second battery pack 32.

In the related art, battery packs with different specifications have different output terminal interfaces and different volumes, and the power tool body is generally adaptable to only battery packs with one specification. Even though the power tool body in the related art is adaptable to multiple different battery packs, the power tool body is generally provided with multiple interfaces. Thus, the battery mounting portion of the power tool body has a complicated structure and a greater dimension, which is not conducive to the usage of the power tool. Alternatively, the interfaces of the battery packs with different specifications may be configured to be the same to make the battery packs platformable. The specification of the battery pack is identified through communication between the battery pack and the power tool body. In this manner, on the one hand, the existing structures of the battery packs need to be eliminated or modified to a large scale. On the other hand, when identification is performed using the communication, battery packs used to different degrees are identified with unstable accuracy, and the reliability of a battery management program cannot be ensured.

In the present application, the first input terminal set 21 with versatility is provided on the power tool body to be compatible with the battery packs 30 with different specifications of different output terminal sets. The specifications of the battery packs 30 are identified using the difference between the output terminal sets. Different inserting portions are provided on the first input terminal 21*a* so that the battery packs 30 of different dimensions can be stably connected to the power tool body, and the power tool body is compatible with the battery packs 30 of different dimensions. In this manner, the battery packs 30 with different specifications do not need to be eliminated or modified and can be used for the power tool body.

It is to be understood that the battery pack 30 may be a lithium battery pack, a solid-state battery pack, or a pouch battery pack. The first battery pack 31 and the second battery pack 32 are one example of this embodiment. The number of battery packs to which the power tool body is adaptable is not limited in the present application, that is to say, the power tool body is adaptable to two or more types of battery packs. In this example, the nominal voltage of the first battery pack 31 is 12 V, and the nominal voltage of the second battery pack 32 is 20 V. In some examples, the nominal voltage of the first battery pack 31 is 10.8 V, 24 V, 36 V, 48 V, 56 V, or 80 V. The nominal voltage of the second battery pack 32 is 10.8 V, 24 V, 36 V, 48 V, 56 V, or 80 V and different from the nominal voltage of the first battery pack 31.

In this example, the first battery pack 31 and the second battery pack 32 are each a lithium battery pack 30. The first battery pack 31 is used as an example. The first battery pack 31 includes a first battery pack housing 311 and a cell group. The first battery pack housing 311 is assembled to form an accommodation space to fix and accommodate the cell group. The cell group includes multiple cells for storing energy, where the multiple cells are connected in series, in parallel, or both in series and in parallel to form the cell group. The second battery pack 32 differs from the first battery pack 31 in the dimension of the battery pack housing and the number of cells in the cell group or the capacity of a single cell.

As shown in FIGS. 1 to 5, both the first battery pack 31 and the second battery pack 32 are detachably connected to the lighting device 10 along a first direction F1. The first direction F1 is defined as a length direction of the first battery pack 31 and the second battery pack 32 along an up and down direction. A second direction F2 is defined as a width direction of the first battery pack 31 and the second battery pack 32 along a front and rear direction. A first terminal interface 311*a* corresponding to the first output terminal set 22 is formed on the right side of the first battery pack housing 311 of the first battery pack 31. A second terminal interface 321*a* corresponding to the second output terminal set 23 is formed on the right side of a second battery pack housing 321 of the second battery pack 32.

The specific structure and method for identifying the specifications of the battery packs 30 using the difference between the output terminal sets are described below.

As shown in FIGS. 2 to 9, the lighting device 10 includes a controller 171 configured to acquire a connection state of a preset terminal in the first input terminal set 21 and determine, according to the connection state of the preset terminal, that the first battery pack 31 or the second battery pack 32 is connected to the lighting device 10. The controller 171 is disposed on a control circuit board, including a printed circuit board (PCB) and/or a flexible printed circuit (FPC) board. The controller includes a control unit, and the control unit uses a dedicated control chip, for example, a single-chip microcomputer and a microcontroller unit (MCU).

Figure 3:
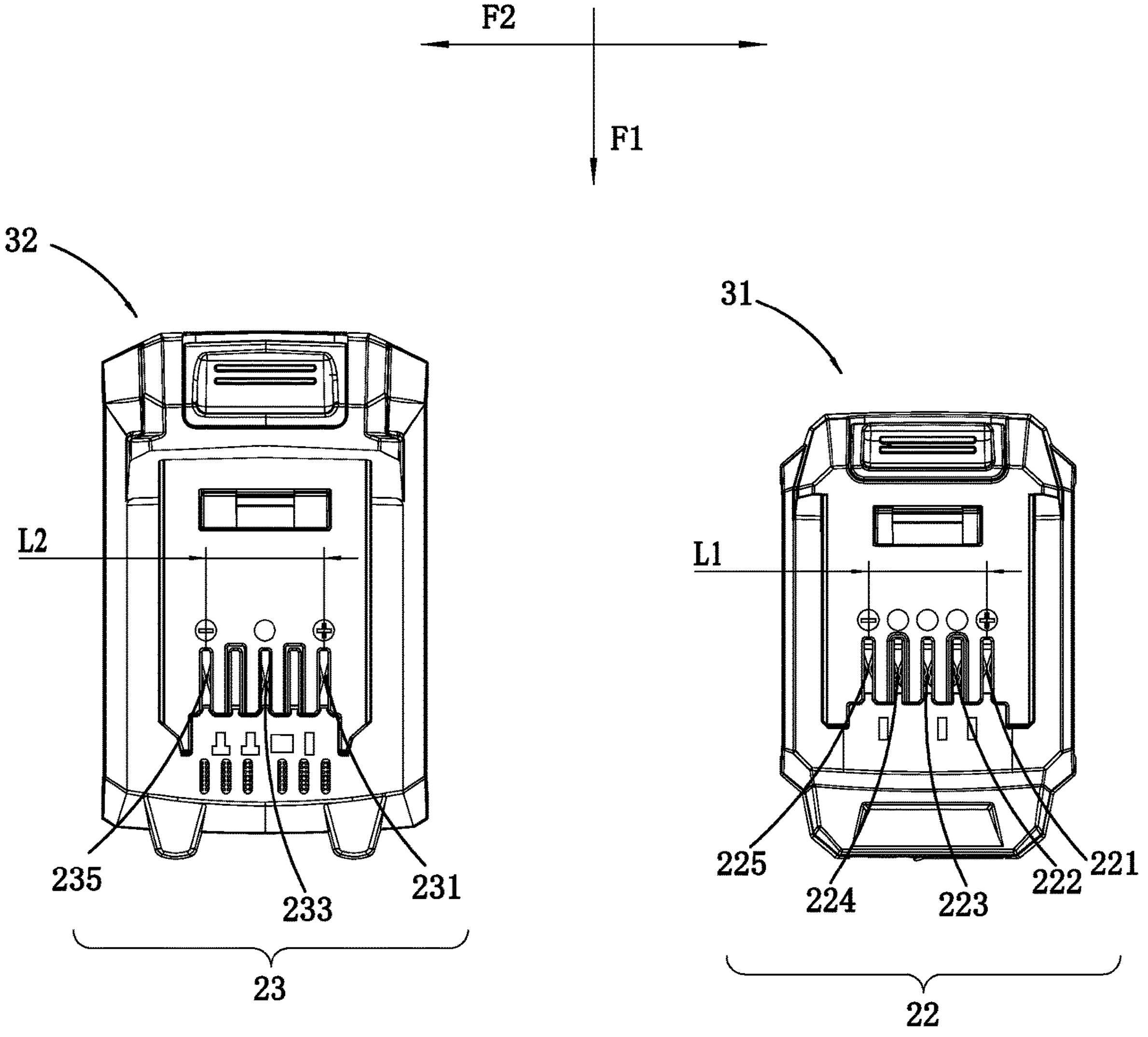
FIG. 3 is a structural view of a first battery pack and a second battery pack in the present application.

As shown in FIGS. 2 and 3, the number or structure of terminals in the first output terminal set 22 is different from the number or structure of terminals in the second output terminal set 23. The first output terminal set 22 includes five first output terminals 22*a*, which are a first positive electrode output terminal 221, a second voltage detection terminal 222, a first voltage detection terminal 223, a temperature detection terminal 224, and a first negative electrode output terminal 225 in sequence along the second direction F2. Therefore, correspondingly, five first terminal interfaces 311*a* are opened on the first battery pack housing 311. The second output terminal set 23 includes three second output terminals 23*a*, which are a second positive electrode output terminal 231, a communication terminal 233, and a second negative electrode output terminal 235 in sequence along the second direction F2. A distance L1 between the first positive electrode output terminal 221 and the first negative electrode output terminal 225 is the same as a distance L2 between the second positive electrode output terminal 231 and the second negative electrode output terminal 235. The communication terminal 233 has the same distances from two ends in the width direction as any one of the temperature detection terminal 224, the first voltage detection terminal 223, and the second voltage detection terminal 222, that is to say, the communication terminal 233 corresponds to any one of the temperature detection terminal 224, the first voltage detection terminal 223, and the second voltage detection terminal 222 along the direction F2. In this example, the communication terminal 233 has the same position as the first voltage detection terminal 223 in the width direction. Similarly, five second terminal interfaces 321*a* are opened on the second battery pack housing 321. In the width direction, the five second terminal interfaces 321*a* correspond to the five first terminal interfaces 311*a* opened on the first battery pack housing 311. It is to be understood that the five second terminal interfaces have the same widths and intervals as the five first terminal interfaces in the width direction.

The temperature detection terminal 224 is connected to a temperature measuring element of the first battery pack 31. The temperature measuring element is used for detecting the internal temperature of the battery pack. The temperature measuring element is disposed near a cell inside the battery pack so that the temperature measuring element can detect a change of the cell in temperature. The temperature measuring element may be a thermistor, such as a negative temperature coefficient (NTC) thermistor. The first voltage detection terminal 223 and the second voltage detection terminal 222 are used for detecting a voltage value of a cell and electrically connected to the cell.

The communication terminal 233 may be connected to a communication module through hardware or in a wireless manner to implement data transmission, where the communication module needs to be connected to a communication power supply.

In this example, the first input terminal set 21 includes four first input terminals 21*a*, which are sequentially a positive electrode input terminal 211 corresponding to the first positive electrode output terminal 221 and the second positive electrode output terminal 231, a second input detection terminal 213, a first input detection terminal 212, and a negative electrode input terminal 215 corresponding to the first negative electrode output terminal 225 and the second negative electrode output terminal 235. The first input detection terminal 212 corresponds to an output terminal only existing in the first battery pack 31. In this example, the first input detection terminal 212 corresponds to the temperature detection terminal 224 of the first battery pack 31. The second input detection terminal 213 corresponds to the positions of the first battery pack 31 and the second battery pack 32 where output terminals exist. In this example, the second input detection terminal 213 corresponds to both the first voltage detection terminal 223 and the communication terminal 233.

The first input detection terminal 212 is configured to be a first preset terminal T1. When the first battery pack 31 is connected to the lighting device 10, the first preset terminal T1 is in contact with the temperature detection terminal 224. When the second battery pack 32 is connected to the lighting device 10, the first preset terminal T1 corresponds to an empty position and is in contact with nothing, that is, the first preset terminal T1 is suspended. It is to be understood that when the controller detects a signal at the first preset terminal T1, in this example, when detecting a signal from the temperature detection terminal 224, the controller 171 determines that the first battery pack 31 is connected to the lighting device 10. When detecting no connection or signal at the first preset terminal T1, the controller 171 determines that the second battery pack 32 is connected to the lighting device 10. In this manner, the type of the battery pack is more conveniently and accurately detected without complicated threshold identification and determination processes, and the type of the connected battery pack can be determined simply by the presence or absence of the signal.

In other alternative examples, the first preset terminal may be connected to only a terminal in the second output terminal set. Then, when detecting a signal at the first preset terminal, the controller determines that the second battery pack is connected to the lighting device.

In other alternative examples, the number of output terminals of the battery pack 30 may be configured to be more or less according to electrical characteristics. The specific number of terminals in the output terminal set or the input terminal set does not affect the essence of the present application.

In some examples, when the number of terminals in the first output terminal set 22 is the same as the number of terminals in the second output terminal set 23, at least one terminal in the first output terminal set 22 and at least one terminal in the second output terminal set 23 are staggered in position. That is, when the first input terminal set 21 is arranged in correspondence to the positions of any terminals in the first output terminal set 22 or the second output terminal set 23, at least one terminal in the first input terminal set 21, that is, the first preset terminal T1, cannot be connected to the other one of the first output terminal set 22 or the second output terminal set 23.

To sum up, when the number or structure of terminals in the first output terminal set 22 is different from the number or structure of terminals in the second output terminal set 23, the terminals in the first input terminal set 21 are arranged in correspondence to the terminals in any one of the first output terminal set 22 or the second output terminal set 23, and the preset terminal in the first input terminal set 21 is staggered relative to a terminal in the other one of the first output terminal set 22 or the second output terminal set 23. The specification of the battery pack connected to the lighting device 10 is determined according to whether the preset terminal (the first preset terminal T1 in this example) is connected or not.

In this example, the specification of the battery pack connected to the lighting device 10 may also be determined through the function of the terminal or the type of an output signal. In this example, the second input detection terminal 213 is configured to be a second preset terminal T2. When the second preset terminal T2 is in contact with one first output terminal 22*a* in the first output terminal set 22, the first output terminal outputs a first type of signal to the second preset terminal T2. When the second preset terminal T2 is in contact with one second output terminal 23*a* in the second output terminal set 23, the second output terminal outputs a second type of signal to the second preset terminal T2. In this example, when the first battery pack 31 is connected to the lighting device 10, the second preset terminal T2 is in contact with the first voltage detection terminal 223. When the second battery pack 32 is connected to the lighting device 10, the second preset terminal T2 is in contact with the communication terminal 233. The first voltage detection terminal 223 outputs an electrical signal. The communication terminal 233 outputs a communication signal. It is to be understood that when detecting that the second preset terminal T2 is connected to the electrical signal, the controller determines that the first battery pack 31 is connected to the lighting device 10. When detecting that the second preset terminal T2 is connected to the communication signal, the controller determines that the second battery pack 32 is connected to the lighting device 10. The detection is more conveniently and accurately performed without the complicated threshold identification and determination processes, and the type of the connected battery pack can be determined simply by the type of the signal.

In other alternative examples, the functions of output terminals of the battery packs may be configured to be different according to the electrical characteristics. For example, the first type of signal is the communication signal and the second type of signal is the electrical signal.

It is to be understood that, in this example, the first preset terminal T1 and the second preset terminal T2 are used in combination. In other alternative examples, the first preset terminal T1 or the second preset terminal T2 may be used alone. A selection may be made according to actual requirements.

Figure 6:
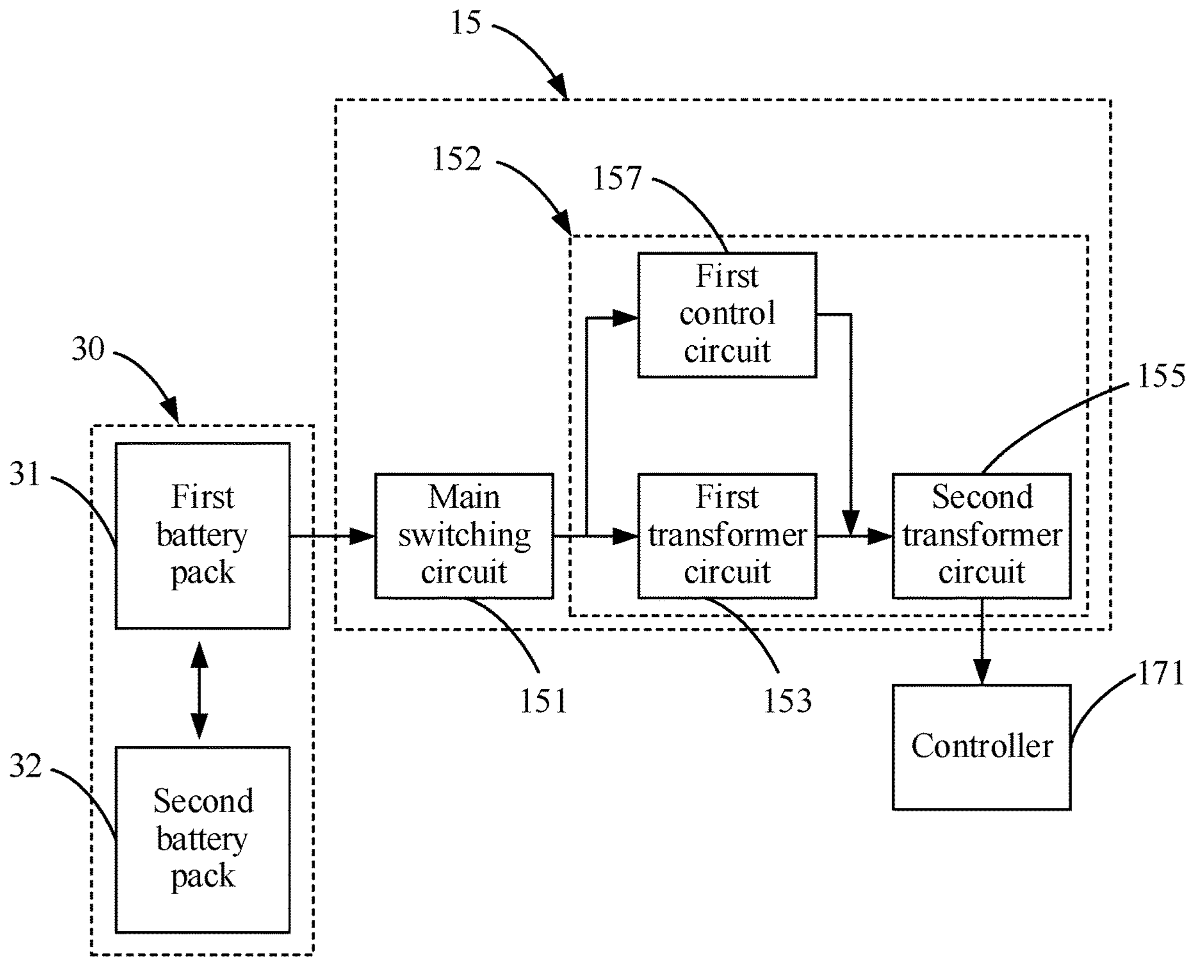
FIG. 6 is a schematic diagram of some electrical structures of a power tool in the present application.
Figure 7:
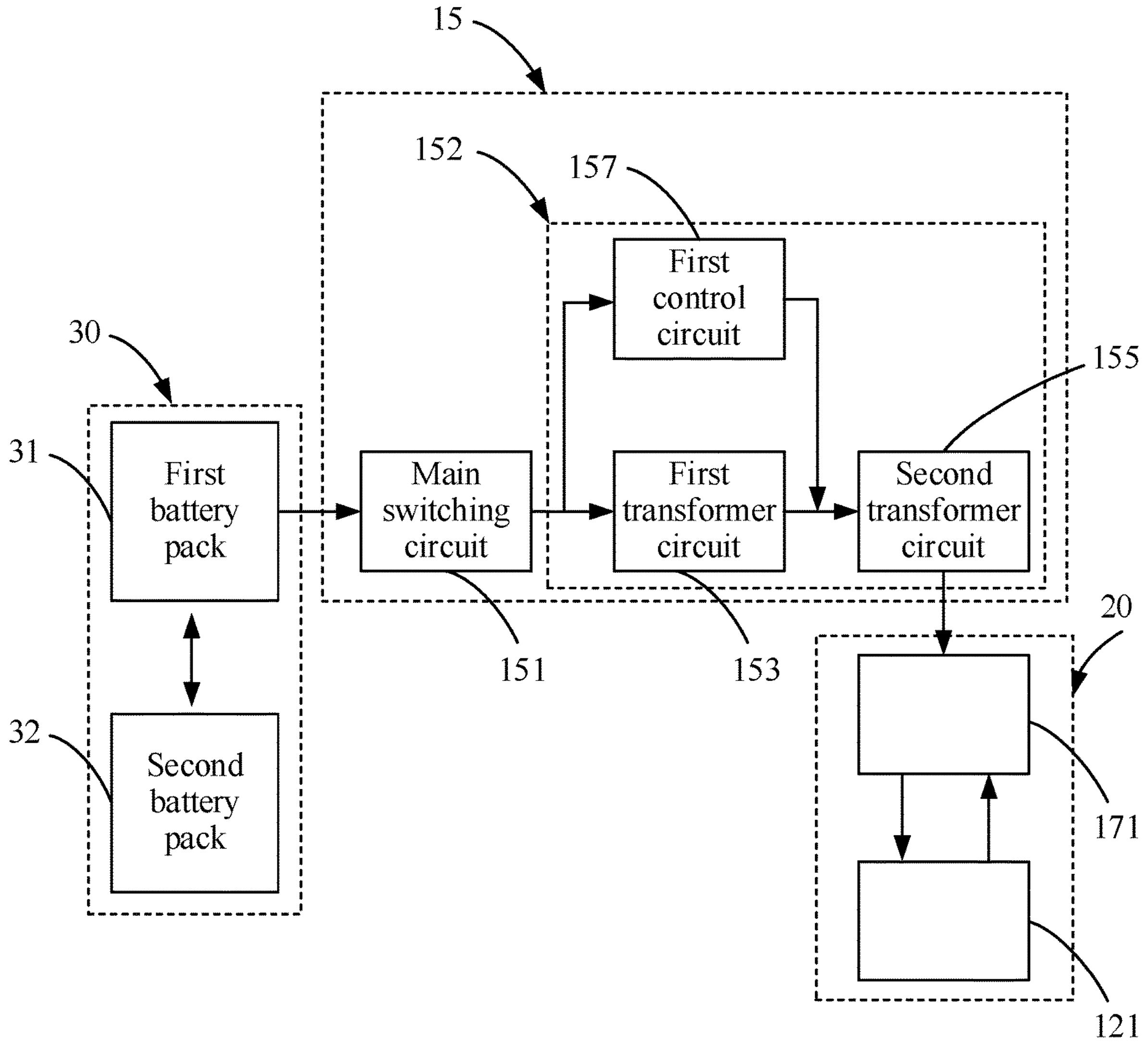
FIG. 7 is a schematic diagram of electrical structures of a power tool in the present application.

As is known in the related art, the power tool body 10 includes a target work mechanism 20 that requires electrical energy. A powered device is used at a voltage within a certain range. As shown in FIGS. 6 and 7, in this example, the target work mechanism 20 of the lighting device includes the controller 171 and the lamp head 121. Electronic components of the controller 171 have high precision and are compatible with a small range of operating voltages. When the nominal voltage of the connected battery pack is inappropriate, the controller 171 may be damaged or even scrapped. However, as the range of the nominal voltage of the adapted battery pack is required to be larger, the associated circuit regulation fails to satisfy the requirement on the accuracy of the operating voltage of the controller 171.

As shown in FIG. 6, the controller 171 is used as an example in the example of the present application so as to illustrate a specific implementation in which the lighting device 10 regulates a voltage applied to the controller 171 when different nominal voltages are connected. It is to be understood that after the relatively stringent voltage requirement of the controller 171 is satisfied, the voltage adaptation requirement of the lamp head 121 can also be satisfied.

In this example, the controller 171 is configured to operate when a first voltage is applied, that is to say, the controller 171 can operate stably and normally when the first voltage is connected. It is to be understood that the first voltage is not limited to one voltage point value, for example, 12 V and 10 V. The first voltage may also be in a range of voltage values, for example, 12.0 V to 12.5 V. The specific value of the first voltage is set according to the actual requirement on the type of the controller 171. The value of the first voltage is adjusted according to different lighting devices and different control functions of different controllers 171.

The battery mounting portion 111 outputs and supplies the electrical energy of the connected first battery pack 31 or second battery pack 32 to a power supply circuit 15. The power supply circuit 15 includes a main switching circuit 151 and a voltage regulation mechanism 152. A main switch 16 is a switch that turns on/off the main switching circuit 151. When the main switch 16 is turned on, the main switching circuit 151 is turned on, and the power supply circuit 15 is in a standby mode, that is to say, the lighting device 10 is in a powered-on state. When the main switch 16 is turned off, the main switching circuit 151 is turned off, the power supply circuit 15 is not started, and no electric power is supplied, that is to say, the lighting device 10 is stopped.

The voltage regulation mechanism 152 is configured to convert an input voltage inputted from the battery mounting portion 111 and output the converted input voltage to supply power to the controller 171. It is to be understood that the voltage regulation mechanism 152 is connected in series to the main switching circuit 151. When the main switching circuit 151 is turned on, the connected direct current is inputted into the voltage regulation mechanism 152. In this example, the voltage inputted into the voltage regulation mechanism 152 at this time is the input voltage. Since the voltage of the connected direct current is basically equal to the voltage inputted into the voltage regulation mechanism 152 in this example, the voltage inputted by the direct current connected from the battery mounting portion 111 is basically equal to the input voltage. In other alternative examples, the voltage inputted by the direct current connected from the battery mounting portion 111 may be different from the input voltage, which is not intended to limit the essence of the present application.

As shown in FIGS. 6 to 9, the voltage regulation mechanism 152 includes a first transformer circuit 153 and a second transformer circuit 155. When the input voltage is greater than the first voltage, the second transformer circuit 155 transforms the input voltage to the first voltage. When the input voltage is less than or equal to the first voltage, the first transformer circuit 153 transforms the input voltage to a second voltage and the second transformer circuit 155 transforms the second voltage to the first voltage.

In this example, the first transformer circuit 153 includes a boost circuit 154. The second transformer circuit 155 includes a buck circuit 156 that includes at least one low-dropout regulator 1561. As a specific example, the boost circuit 154 and the buck circuit 156 are connected in series.

The voltage regulation mechanism 152 further includes a first control circuit 157 for controlling, according to a determination result of the magnitudes of the input voltage and the first voltage, whether the current flows through the first transformer circuit 153. When the input voltage is greater than the first voltage, the first control circuit 157 is turned on, and the first control circuit 157 forms a bypass of the first transformer circuit 153. After flowing through the first control circuit 157, the inputted current is inputted into the second transformer circuit 155 so that a step-down action is performed and then the first voltage is outputted. When the input voltage is less than or equal to the first voltage, the inputted current is inputted into the first transformer circuit 153 so that a step-up action is performed and then the second voltage is outputted, and the second voltage is then inputted into the second transformer circuit 155 so that the step-down action is performed and then the first voltage is outputted. In this example, the second voltage is greater than the first voltage. In some alternative examples, the second voltage is greater than or equal to the first voltage.

In this example, as a specific example of the first control circuit 157, the first control circuit 157 includes a diode. In some examples, the first control circuit 157 includes a Zener diode. In some examples, the first control circuit 157 includes a Schottky diode. When the input voltage is less than or equal to the first voltage, the resistance value of the first control circuit 157 increases so that the inputted current is inputted into the first transformer circuit 153.

In some alternative examples, the first control circuit 157 includes a switch integrated circuit (IC) that turns on/off the loop of the first control circuit 157 by determining the magnitudes of the input voltage and the first voltage.

Figure 8:
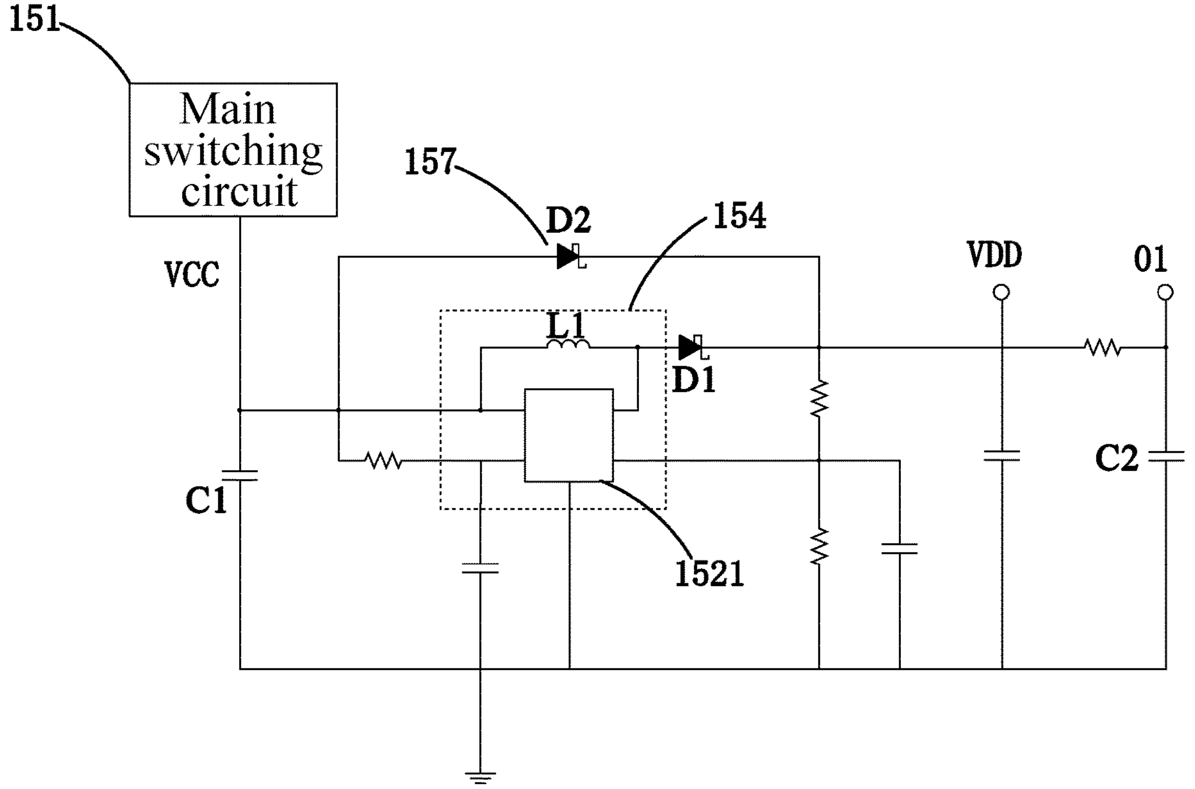
FIG. 8 is a circuit diagram of a specific example of a first transformer circuit in the present application.

As shown in FIG. 8, as a specific example of the first transformer circuit 153, the first transformer circuit 153 includes a smoothing capacitor C1, the boost circuit 154, a rectifier diode D1, and a smoothing capacitor C2.

The smoothing capacitor C1 is connected in parallel between the main switching circuit 151 and the boost circuit 154. The boost circuit 154 is connected in series between the main switching circuit 151 and the rectifier diode D1. The rectifier diode D1 is connected in series between the boost circuit 154 and an output terminal 01. The smoothing capacitor C2 is connected in parallel between the rectifier diode D1 and the output terminal 01. The smoothing capacitor C2 removes additional fluctuations in the voltage supplied from the main switching circuit 151, thereby smoothing a waveform.

The boost circuit 154 is composed of, for example, a boost regulator 1521 and a choke coil L1. The boost circuit 154 boosts the input voltage using the boost regulator 1521 and the choke coil L1 and outputs the boosted voltage.

The first control circuit 157 is connected in parallel to the boost circuit 154 and the rectifier diode D1. The first control circuit 157 includes a Schottky diode D2. When the first control circuit 157 forms a bypass of the boost circuit 154 and the rectifier diode, the inputted current is inputted from the smoothing capacitor C1 into the smoothing capacitor C2 through the first control circuit 157.

The rectifier diode D1 rectifies the output of the boost circuit 154. The smoothing capacitor C2 removes additional fluctuations in the voltage rectified by the rectifier diode D1, thereby smoothing the waveform.

Figure 9:
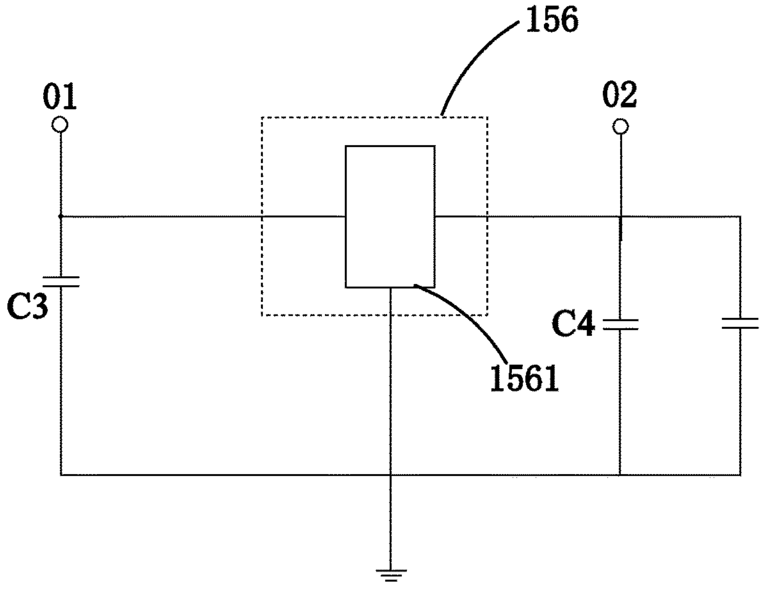
FIG. 9 is a circuit diagram of a specific example of a second transformer circuit in the present application.

As shown in FIG. 9, as a specific example of the second transformer circuit 155, the second transformer circuit 155 includes a smoothing capacitor C3, the buck circuit 156, and a smoothing capacitor C4. The smoothing capacitor C3 is connected in parallel between the output terminal 01 and the boost circuit 154. The buck circuit 156 is connected in series between the output terminal 01 and the smoothing capacitor C3. The smoothing capacitor C4 is connected in parallel between the buck circuit 156 and an output terminal 02. The smoothing capacitor C3 removes additional fluctuations in the voltage supplied from the output terminal 01, thereby smoothing a waveform.

The buck circuit 156 is composed of, for example, at least one low-dropout regulator 1561. The buck circuit 156 bucks the input voltage using the low-dropout regulator 1561 and outputs the bucked voltage.

The first transformer circuit 153 and the second transformer circuit 155 are used in combination and turned on or off so that different input voltages can be regulated to a voltage suitable for the operation of the target work mechanism 20.

By setting the boost circuit and the buck circuit in series, and by judging whether the input voltage is greater than a target voltage, to control whether the boost function circuit works, better improve the efficiency of boosting and bucking the voltage, to reduce the difficulty in designing the boost and buck circuits and selecting components, and further to reduce product costs and product complexity. On the other hand, the lighting device 10 is adaptable to a larger range of the nominal voltage of the direct current power supply.

The specification of the battery pack connected to the lighting device 10 is determined through the function of the terminal or the type of the output signal. In this example, when the second battery pack 32 is connected to the lighting device 10, the communication power supply in the lighting device 10 supplies power to the communication module through the second preset terminal T2 and the communication terminal 233 to achieve the communication between the second battery pack 32 and the lighting device 10.

However, when the first battery pack 31 is connected to the lighting device 10, if the communication power supply supplies power to the first battery pack 31 through the second preset terminal T2 and the first voltage detection terminal 223, the cell in the first battery pack 31 is damaged. Therefore, the lighting device 10 is provided with a conversion circuit 100*a* configured to, when the second battery pack 32 is connected to the lighting device 10, make the communication power supply be electrically connected to the preset terminal and when the first battery pack 31 is connected to the lighting device 10, make the communication power supply be disconnected from the preset terminal.

Meanwhile, the battery pack is discharged through a positive electrode output terminal and a negative electrode output terminal. When the first battery pack 31 is connected to the lighting device 10, the first voltage detection terminal 223 is electrically connected to the lighting device 10 through the second preset terminal T2. In this example, the conversion circuit 100*a* is further configured to, when the first battery pack 31 is connected to the power tool body, prevent a current of the first battery pack 31 from flowing to the lighting device 10 through the first voltage detection terminal 223. In this manner, a voltage imbalance of the battery pack 30 is avoided.

Specifically, in this example, the conversion circuit 100*a* is configured to, when the communication terminal is connected to a non-communication signal, prevent a current of the communication terminal from flowing through.

Figure 10:
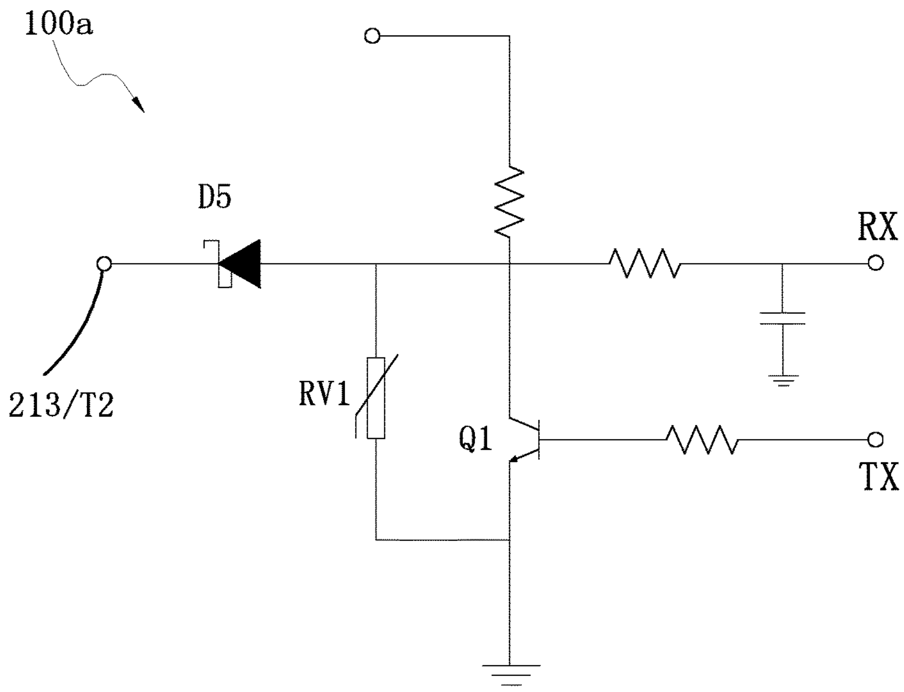
FIG. 10 is a circuit diagram of a specific example of a conversion circuit in the present application.

As shown in FIG. 10, as a specific example of the conversion circuit 100*a*, the conversion circuit 100*a* includes a first switching device Q1 and a Schottky diode D5. An input terminal of the conversion circuit 100*a* is connected to the communication power supply. A varistor RV1 is connected to a collector C and an emitter S of the first switching device Q1, a signal ground wire is connected to the emitter S of the first switching device Q1, RX (a communication module interface) is connected to the collector C of the first switching device Q1, a cathode of the Schottky diode D5 is connected to T2, an anode of the Schottky diode D5 is connected to the collector C of the first switching device Q1, and TX (a communication power supply interface) is connected to a base B of the first switching device Q1.

In this manner, when a communication interface of the second battery pack 32 is connected, a machine controls the communication power supply to supply power to the conversion circuit 100*a*, and the communication signal can be normally detected. When a first voltage detection interface of the first battery pack 31 is connected, the machine controls the communication power supply to cut off the power supply, and at the same time, a reverse cut-off function of the diode is enabled so as to prevent the current leakage of the cell of the first battery pack 31.

The conversion circuit 100*a* is provided so that one input terminal of the power tool body can be compatible with both the communication signal and the electrical signal. In this example, the first voltage detection terminal 223 is prevented from being charged by and discharged to the power tool body while the communication function of the communication interface is considered, thereby protecting the safety of the battery pack and the power tool body.

As is known from the related art, if the battery pack is over-discharged, the battery pack will be seriously damaged. Generally, different preset voltages are set according to different specifications of the battery packs so as to prevent the battery packs from being over-discharged. In this example, the first battery pack 31 is configured with a first preset voltage. The second battery pack 32 is configured with a second preset voltage. To protect the battery pack 30, the power tool body includes an over-discharge protection circuit and a compatible circuit 100*b*. The over-discharge protection circuit is configured to prevent a current of the battery pack from flowing to the power tool body when a voltage outputted by the battery pack is less than a preset voltage. The compatible circuit 100*b* is configured to enable the over-discharge protection circuit to be adapted to the first preset voltage of the first battery pack 31 and the second preset voltage of the second battery pack 32. In this manner, the same interface can be compatible with multiple preset voltages for preventing over-discharge. In this example, the first preset voltage is less than the second preset voltage. If the lighting device 10 satisfies an over-discharge prevention requirement of the first battery pack 31, the second battery pack 32 has a risk of over-discharge. If the lighting device 10 satisfies an over-discharge prevention requirement of the second battery pack 32, the first battery pack 31 has low discharge efficiency. The compatible circuit 100*b* is provided so that the over-discharge protection circuit can satisfy the over-discharge prevention requirements of the two battery packs 30.

Figure 11:
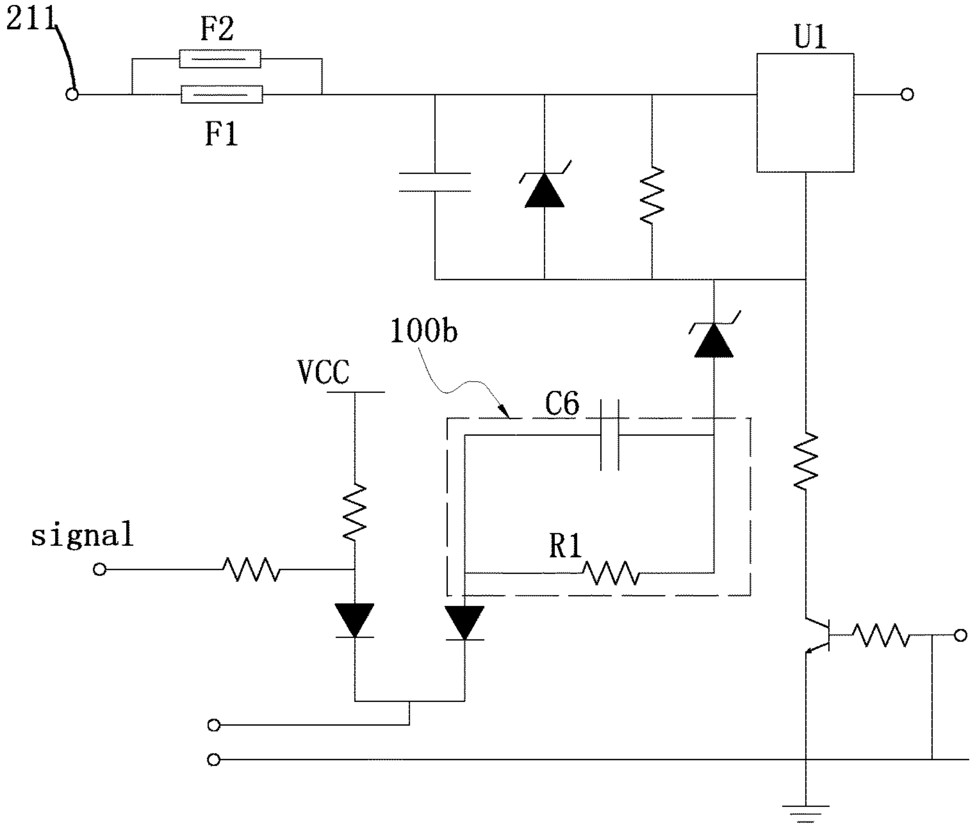
FIG. 11 is a circuit diagram of a specific example of a compatible circuit in the present application.

As shown in FIG. 11, as a specific example of the compatible circuit 100*b*, the compatible circuit 100*b* includes a first resistor R1 and a third capacitor C6. An input terminal of the compatible circuit 100*b* is connected to a Zener diode. The first resistor R1 and the third capacitor C6 are connected in parallel, and then one terminal is connected to a start switch.

In this manner, when the first battery pack or the second battery pack is connected, the third capacitor C6 is charged after the start switch is triggered so that a control loop is provided and an electronic switch is turned on so as to supply power to a subsequent circuit; after the capacitor C6 is charged, an open circuit is formed and a suitable resistance value is selected for the first resistor R1 so as to ensure that the control loop of the compatible circuit cannot satisfy an opening condition of the electronic switch, thereby satisfying the over-discharge prevention requirement. When the first voltage detection interface of the first battery pack 31 is connected, the communication power supply cuts off the power supply to the conversion circuit, and the diode enables the reverse cut-off function so as to prevent the cell from being over-discharged.

The structure of the first input terminal 21*a* is described in detail below.

Figure 4:
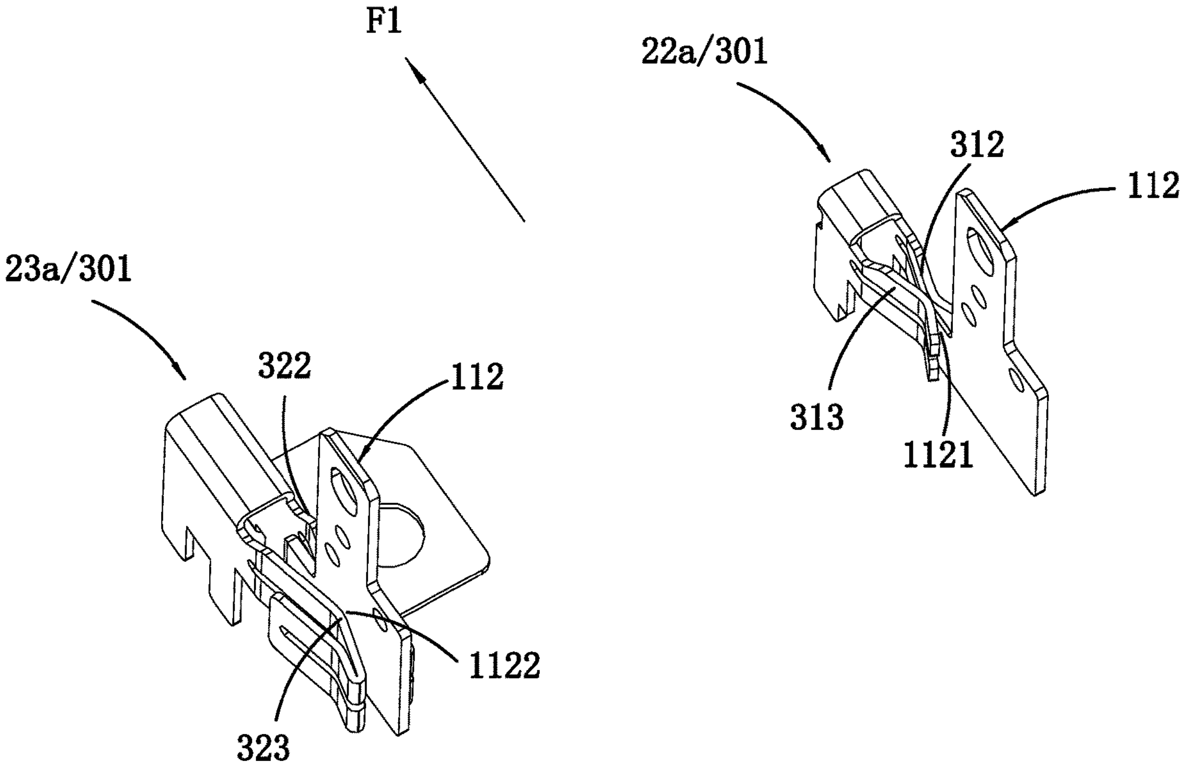
FIG. 4 is a structural view of a first output terminal and a first input terminal that are connected and a second output terminal and the first input terminal that are connected in the present application.
Figure 5:
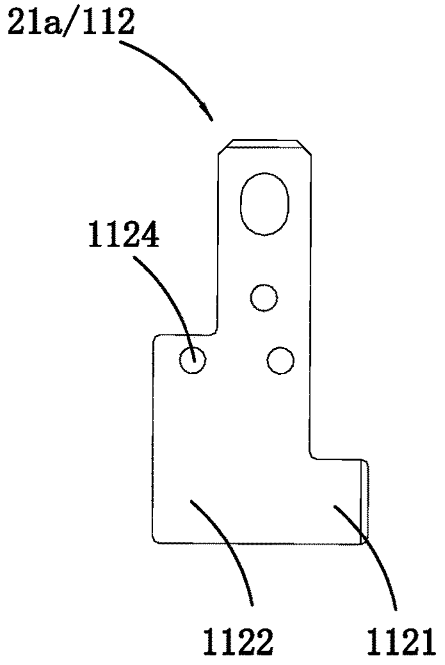
FIG. 5 is a structural view of a first input terminal in the present application.

As shown in FIGS. 4 and 5, the first input terminal 21*a* in the first input terminal set 21 is a male terminal, and the output terminals in the first output terminal set 22 and the second output terminal set 23 are female terminals. When the power tool body is engaged with the battery pack, the female terminal is connected to the male terminal in a contact manner so as to provide an electrical connection between the power tool body and the battery pack.

The female terminal includes elastic plate portions 301, the male terminal includes a flat plate portion 112, and the flat plate portion 112 of the male terminal may be inserted between the elastic plate portions 301 of the female terminal so as to implement a contact connection between the female terminal and the male terminal.

For the output terminal, that is, the female terminal, the elastic plate portions 301 include a right elastic plate portion 312 or 322 and a left elastic plate portion 313 or 323. The left elastic plate portion 312 or 322 and the left elastic plate portion 313 or 323 are disposed at the same height and parallel to each other. That is, the left elastic plate portion 312 or 322 and the left elastic plate portion 313 or 323 are symmetrical about an insertion centerline of the flat plate portion 112 of the male terminal, that is, the left elastic plate portion 312 or 322 and the left elastic plate portion 313 or 323 of the elastic plate portions are symmetrical about an axis of the first direction F1. The right elastic plate portion 312 or 322 and the left elastic plate portion 313 or 323 of the elastic plate portions 301 can be bent in a shape such that an elastic force pressing the flat plate portion 112 is generated between left and right elastic plate portions when the flat plate portion 112 of the male terminal is inserted between the left and right elastic plate portions. For example, the left elastic plate portion 312 or 322 and the left elastic plate portion 313 or 323 are bent in a tulip shape or a quincunx shape.

In this example, along the first direction F1, a position of the flat plate portion 112 pressed by the first output terminal 22*a* is different from a position of the flat plate portion 112 pressed by the second output terminal 23*a*. Then, the flat plate portion 112 of the first input terminal 21*a* is provided with the first inserting portion 1121 and the second inserting portion 1122 along the first direction F1. The first inserting portion 1121 and the second inserting portion 1122 are connected to each other by a connecting portion or the first inserting portion 1121 is formed on the second inserting portion 1122. The first inserting portion 1121 is inserted, along the first direction F1, between the left elastic plate portion 312 and the left elastic plate portion 313 of the first output terminal 22*a*. The second inserting portion 1122 is inserted, along the first direction F1, between the left elastic plate portion 322 and the left elastic plate portion 323 of the second output terminal 23*a*. When each flat plate portion 112 is in contact with each pair of elastic plate portions 301, the temperature of a contact portion is increased due to a current. Therefore, multiple small holes 1124 may be provided on a portion of each flat plate portion 112 in non-contact with the elastic plate portions 301 and are used for heat dissipation.

The female terminal may be provided in the power tool and the male terminal is provided in the battery pack 30.

In some examples, the first battery pack and the second battery pack may have the same nominal voltage, but the first output terminal set is different from the second output terminal set, where the first input terminal set is still compatible with the first battery pack and the second battery pack.

In other alternative examples, two or more first input terminal sets 21 are provided on the power tool body, that is, the lighting device 10 so that two battery packs 30 can be connected to the lighting device 10 at the same time so as to form a power tool system. The two battery packs 30 may have the same nominal voltage or different nominal voltages. In collaboration with the associated hardware, voltage regulation circuit, and switching circuit, the two battery packs 30 simultaneously supply power to the lighting device 10 in any manner: being connected in parallel, being connected in series, or being connected in series and in parallel.

In the related art, the ground standing lamp is required to be unfolded to a relatively large dimension when in operation and to be easily packaged and carried when stored. In this manner, the occupied space and a package dimension can be reduced.

As for a working environment, compared with a desk lamp or an indoor decoration lamp, the ground standing lamp works outdoors, so the ground standing lamp needs more stable support to resist the influence of general outdoor wind or an outdoor environment. Moreover, an outdoor working environment is more complicated and working conditions are more diverse so that a more stable standing mode is required.

As shown in FIG. 1 and FIGS. 12 to 17, the lighting device 10 includes a standing mode and a storage mode. It is to be understood that in the standing mode, the lighting device 10 is in a working state and the user can use the lighting device 10 to illuminate a work region; and in the storage mode, the lighting device 10 is convenient for the user to carry.

As shown in FIG. 12 and FIGS. 14 to 16, when the lighting device 10 is in the standing mode, the lighting device 10 is configured to be supported by a resting surface 10*a* formed by the support mechanism 11. It is to be understood that the lighting device 10 in the standing mode is placed on the ground or a work surface for use and the resting surface 10*a* formed by the support mechanism 11 is in contact with the ground or the work surface. Providing support here means that the lighting device 10 can be placed stably on the ground or the work surface without relying on an external force.

Figure 14:
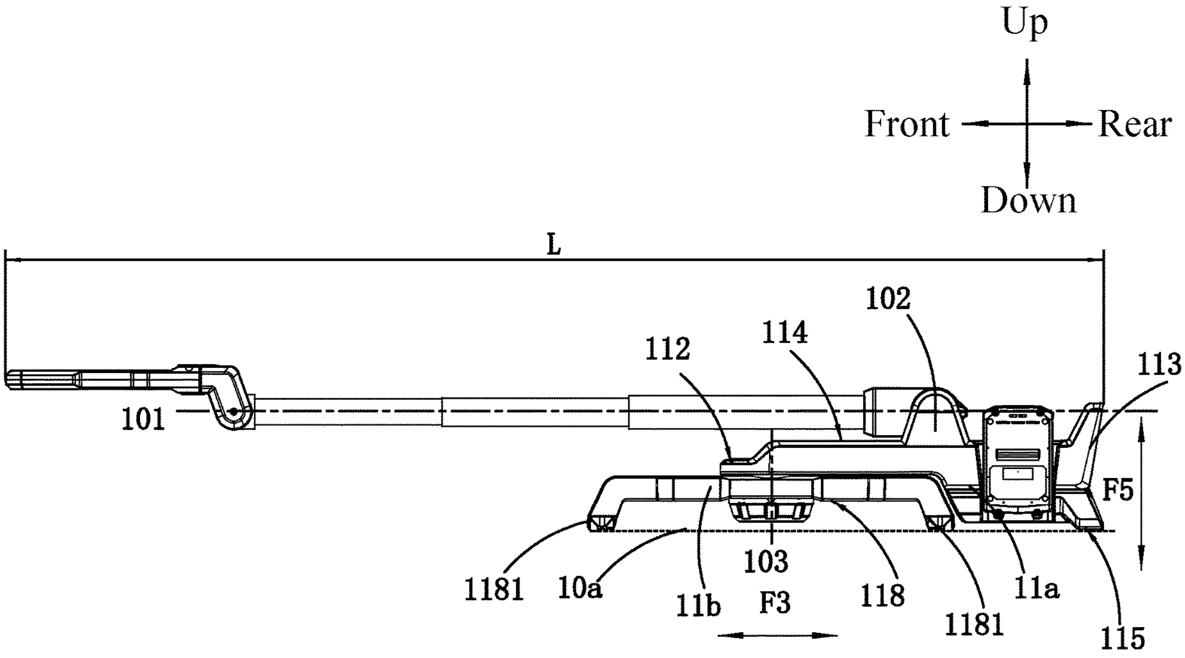
FIG. 14 is a structural view of a first example of the present application, where a lighting device is in a standing mode, a telescopic assembly is at a first position, and a support mechanism is at a first support position.
Figure 15:
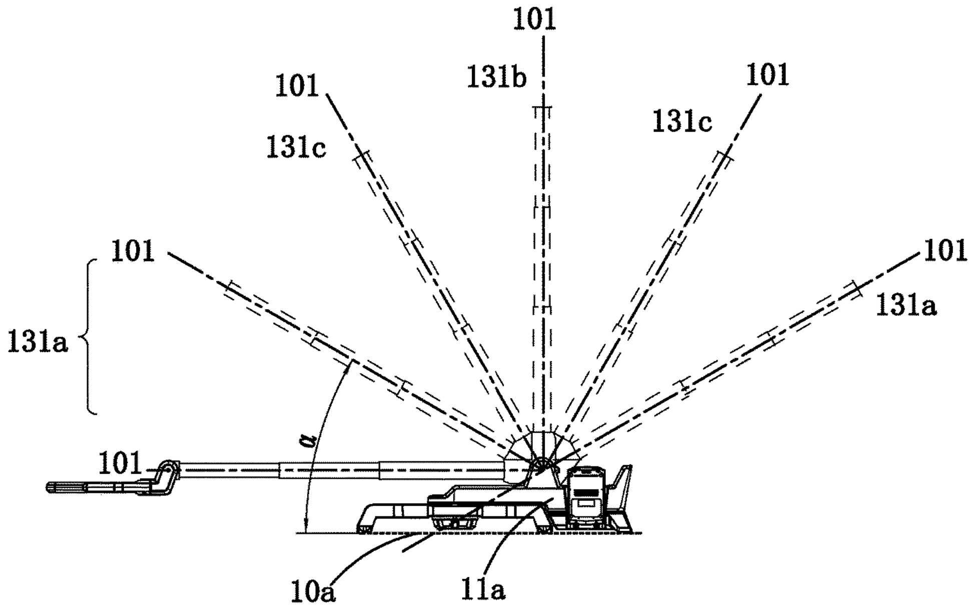
FIG. 15 is a structural view of multiple positions of the telescopic assembly in FIG. 14 rotating relative to a base about a second axis.

The connection mechanism 13 includes a telescopic assembly 131. The telescopic assembly 131 is configured with a central axis 101. When the lighting device 10 is in the standing mode, the telescopic assembly 131 extends and retracts along a direction of the central axis 101 to drive the lighting mechanism 12 away from and toward the support mechanism 11. The telescopic assembly 131 further includes at least a first position and a second position. As shown in FIGS. 14 and 15, when the telescopic assembly 131 is at the first position, the angle α between the central axis 101 and the resting surface 10*a* is greater than or equal to 0° and less than or equal to 30°. In this example, at the first position, the telescopic assembly 131 is at a limit position such that the angle between the central axis 101 and the resting surface 10*a* is approximately 0°, that is to say, the central axis 101 is basically parallel to the resting surface 10*a*. The first position is a position range. In this example, when the angle α between the central axis 101 and the resting surface 10*a* is greater than or equal to 0° and less than or equal to 30°, any position point (one or more position points) within the range of the angle falls within the range of the first position in the present application. It is to be explained that during actual adjustment, due to tolerances, manufacturing errors, or measurement-related errors, the central axis is not completely parallel to the resting surface 10*a*. Therefore, being parallel or basically parallel here should be considered as disclosing a range defined by absolute values of two endpoints. Being parallel or basically parallel may refer to an angle of 0° increased or reduced by a certain percentage (for example, 1%, 5%, 10%, or more) between the central axis 101 and the resting surface 10*a*. At the first position, a projection of the lamp head on the resting surface is located outside a projection of the support mechanism on the resting surface. In this example, the projection of the lamp head on the resting surface extends beyond an outer contour of the resting surface 10*a*. It is to be understood that when the telescopic assembly 131 is at the first position, the telescopic assembly 131 may still extend along the central axis, that is, it leaves a position of the telescopic assembly when the lighting device is in the storage mode. When the telescopic assembly 131 is at the first position, the telescopic assembly 131 extends along the central axis to an extreme value of the length of the telescopic assembly 131, that is, a longest state. At this time, the lighting device 10 can still be stably placed on the ground or the work surface and supported by the resting surface 10*a* without relying on the external force.

Figure 12:
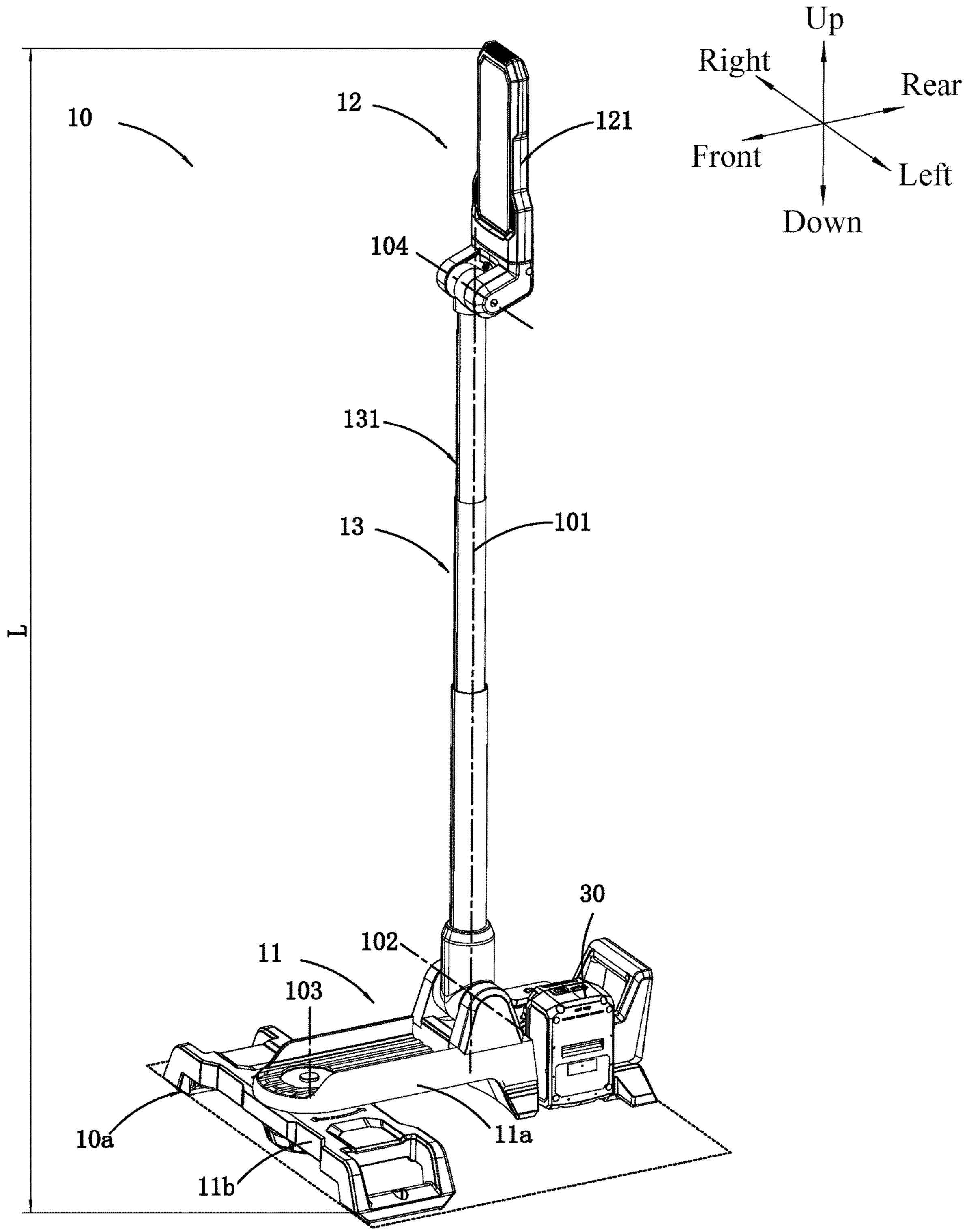
FIG. 12 is a structural view of a first example of the present application, where a lighting device is in a standing mode, a telescopic assembly is at a second position, and a support mechanism is at a first support position.
Figure 16:
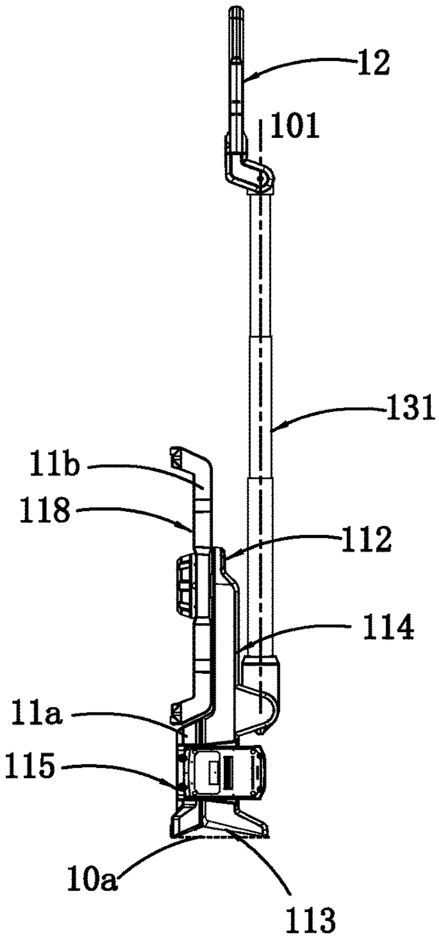
FIG. 16 is a structural view of a first example of the present application, where a lighting device is in a standing mode, a telescopic assembly is at a second position, and a support mechanism is at a second support position.

As shown in FIGS. 12 and 16, when the telescopic assembly 131 is at the second position, the central axis 101 is basically perpendicular to the resting surface 10*a*. It is to be explained that during the actual adjustment, due to the tolerances, the manufacturing errors, or the measurement-related errors, the central axis is not completely perpendicular to the resting surface 10*a*. Therefore, being perpendicular or basically perpendicular here should be considered as disclosing a range defined by absolute values of two endpoints. Being perpendicular or basically perpendicular may refer to an angle of 90° increased or reduced by a certain percentage (for example, 1%, 5%, 10%, or more) between the central axis 101 and the resting surface 10*a*.

In some examples, as shown in FIG. 15, in addition to the first position 131*a* and the second position 131*b*, the telescopic assembly 131 further includes multiple rotation positions 131*c*, including, but not limited to, an angle of 45°, an angle of 60°, and an angle of 75° between the central axis 101 and the resting surface 10*a*.

It is to be understood that the angle α between the central axis 101 and the resting surface 10*a* refers to an acute angle between the central axis 101 and the resting surface 10*a*. In this example, the telescopic assembly 131 is rotatably connected to the base 11*a* about a second axis 102. The second axis 102 is perpendicular to the central axis 101. The telescopic assembly 131 rotates about the second axis 102 relative to the base 11*a* within a range of 0° to 180°. Therefore, when the angle between the central axis 101 and the resting surface 10*a* is determined, if the telescopic assembly 131 rotates about the second axis 102 relative to the base Ha to 0° to 300 and 1500 to 180°, the angle between the central axis 101 and the resting surface 10*a* is greater than or equal to 0° and less than or equal to 30°, that is, the telescopic assembly 131 is at the first position 131*a*.

In this example, the telescopic assembly 131 drives the lamp head 121 to be displaced. When the angle between the central axis 101 of the telescopic assembly 131 and the resting surface 10*a* is greater than or equal to 0° and less than or equal to 30°, the lamp head 121 is closer to the resting surface 10*a* so that the lighting device 10 in this example can be used in a relatively low working condition and still be used stably. In the present application, when the angle between the central axis 101 of the telescopic assembly 131 and the resting surface 10*a* is greater than or equal to 0° and less than or equal to 30°, the telescopic assembly can still freely extend and be stably placed without being supported or held by the external force. The lighting device 10 with an optimal lighting manner in a variety of working conditions expands the use scenarios of the frame lamp or standing frame lamp.

Figure 25:
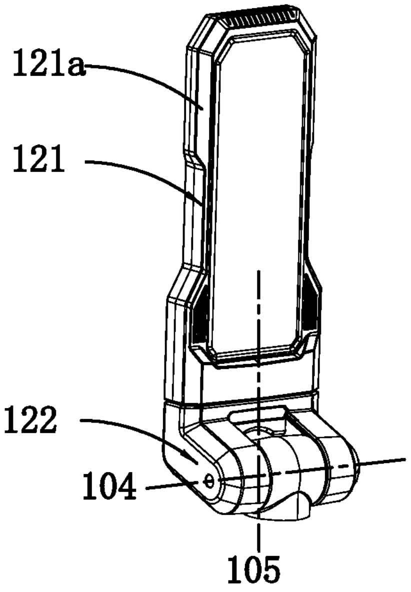
FIG. 25 is a structural view of a lighting mechanism in a first example of the present application.
Figure 26:
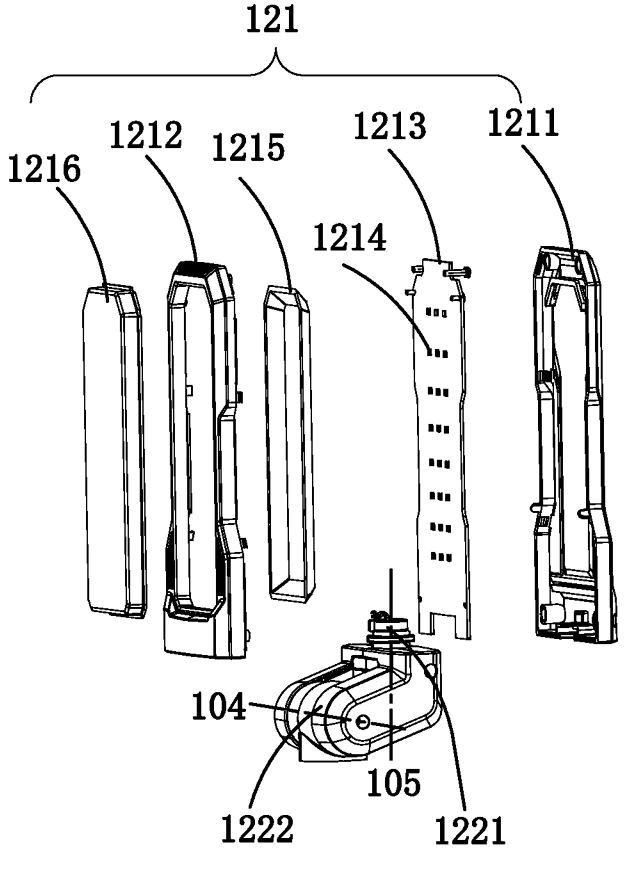
FIG. 26 is an exploded view of a lamp head in a lighting mechanism.
Figure 27:
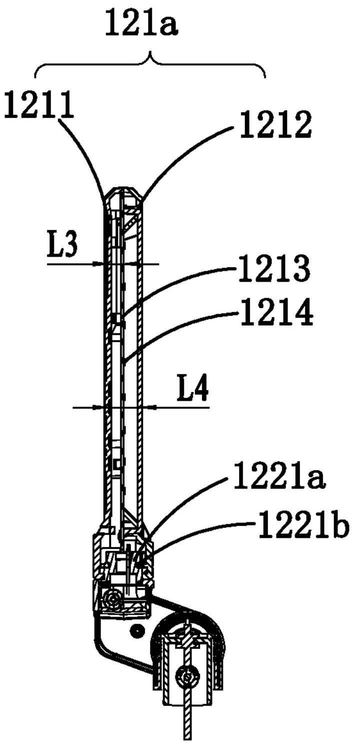
FIG. 27 is a sectional view of FIG. 25.

As shown in FIGS. 25 to 27, the lamp head 121 includes a lamp head housing 121*a* and a light board 1213. The light board 1213 is accommodated in the lamp head housing 121*a*, a light flux of light emitted by the lamp head 121 at maximum power is greater than or equal to 2200 lm, and the ratio of the light flux of the light emitted by the lamp head 121 at the maximum power to the weight of the lamp head 121 is greater than or equal to 9 lm/g. In some examples, the weight of the lamp head 121 is less than or equal to 310 g. The weight of the lamp head 121 is reduced without affecting the light flux of a lighting tool. The lamp head 121 is designed to be lightweight, facilitating the stabilization of the center of gravity of the frame lamp, especially the standing frame lamp with telescopic height adjustment. In this manner, the standing lamp is used in multiple working conditions.

The lighting device 10 in the standing mode is described below as an example.

As shown in FIGS. 12, 14, and 16 and FIGS. 18 to 21, in the standing mode, the resting surface 10*a* of the support mechanism 11 supports the lighting device 10 so that the lighting device 10 is stably placed on the ground or the work surface without relying on the external force. The resting surface 10*a* of the support mechanism 11 is formed by at least one surface of the base 11*a* and an end of the support leg 11*b*. The support mechanism 11 further includes a first locking assembly 11*c* connecting the base 11*a* and the support leg 11*b*. The support leg 11*b* is rotatably connected to the base 11*a* about a third axis 103, and the first locking assembly 11*c* is configured to hold the support leg 11*b* at multiple rotation positions relative to the base 11*a*. In this example, one support leg 11*b* is provided. The third axis 103 is perpendicular to the second axis 102. The support leg 11*b* rotates relative to the base 11*a* in a range of 360° about the third axis 103. The third axis 103 penetrates through the first locking assembly 11*c*.

Figure 18:
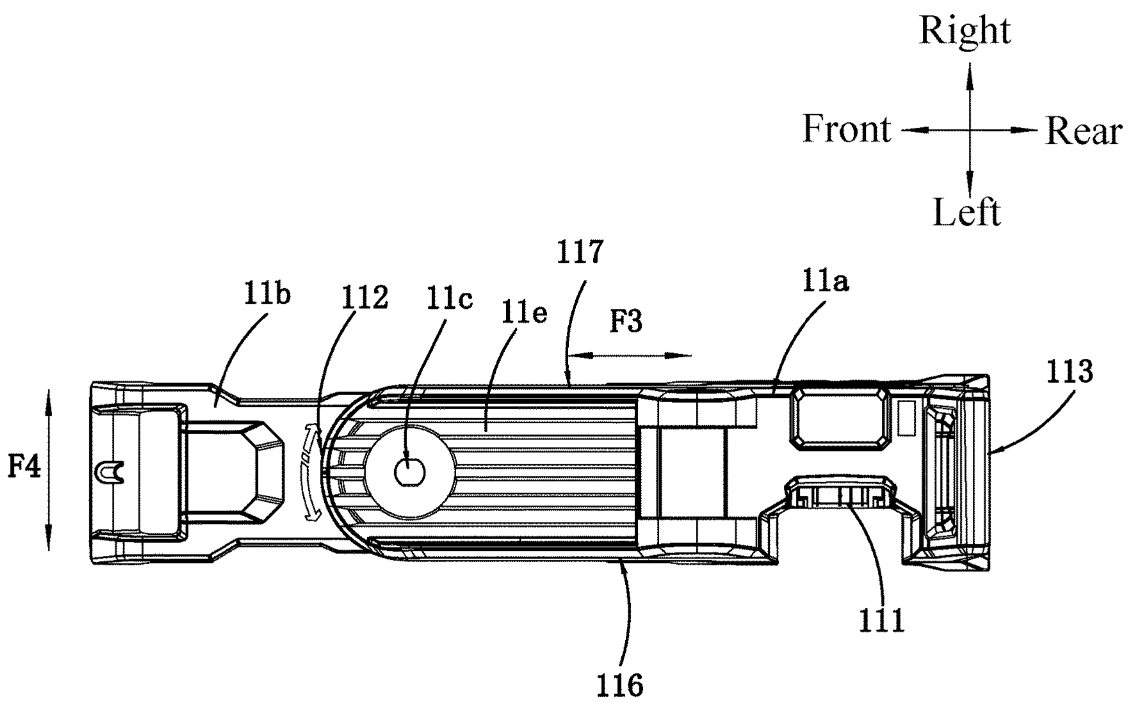
FIG. 18 is a structural view of a support mechanism in a first example of the present application, where a support leg is located at an initial position.

The base 11*a* is substantially rectangular. As shown in FIGS. 14 and 18, the base 11*a* has a length direction F3, a width direction F4, and a height direction F5. A dimension of the base 11*a* in the length direction F3 is greater than a dimension of the base 11*a* in the width direction F4 and greater than a dimension of the base 11*a* in the height direction F5. In this example, the base 11*a* includes a front end 112 and a rear end 113 along the length direction F3, includes an upper end 114 and a lower end 115 along the height direction F5, and includes a left end 116 and a right end 117 along the width direction F4.

The support leg 11*b* extends along the length direction of the base 11*a*, and a central position of the support leg 11*b* is rotatably connected to the front end 112 of the base 11*a* through the first locking assembly 11*c*. The specific shape of the support leg 11*b* is not limited to a rectangle. In some examples, the support leg 11*b* may be formed in a T shape, a Y shape, or another special shape.

Figure 19:
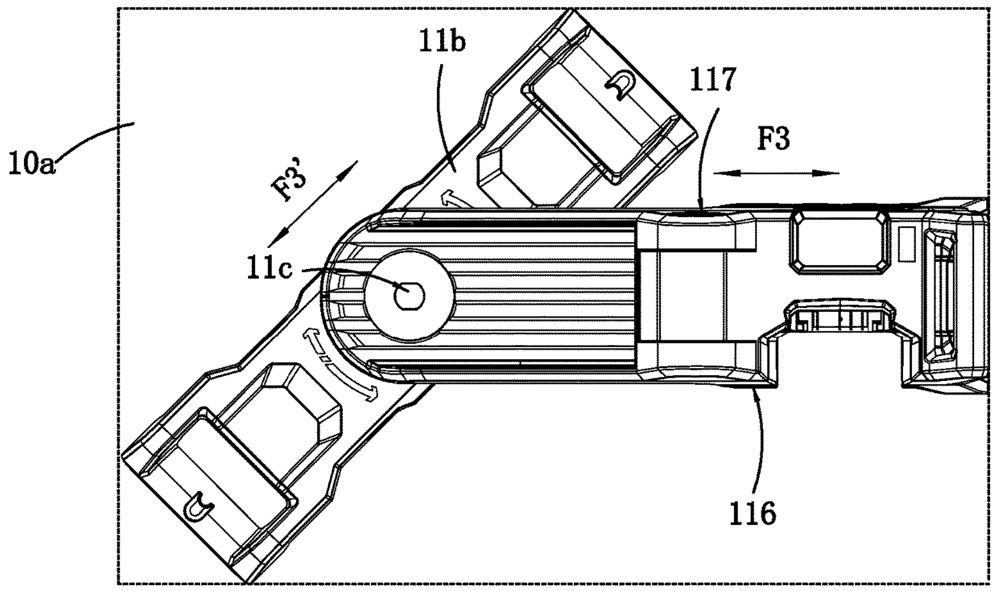
FIG. 19 is a schematic view of the support leg in FIG. 18 rotating relative to a base about a third axis and shows any stop position in a rotary motion.

As shown in FIG. 18, it is defined that when a length direction F3' of the support leg 11*b* coincides with the length direction F3 of the base 11*a*, the support leg 11*b* rotates by 0° and 360° relative to the base 11*a*. At this time, the support leg 11*b* is in an initial state relative to the base 11*a*. As shown in FIGS. 12 and 19, when the support leg 11*b* rotates relative to the base 11*a*, the length direction F3' of the support leg 11*b* and the length direction F3 of the base 11*a* generate an angle of rotation. Two ends of the support leg 11*b* extend relative to the base 11*a* to the outside of the base 11*a* along the width direction F4, that is, left and right sides, thereby enlarging the area of the resting surface 10*a*. In this manner, the stability of the support of the lighting device 10 by the support mechanism 11 is increased. In this example, when the support leg 11*b* is in the initial state, the support leg 11*b* extends along the length direction of the base 11*a*. When the support leg 11*b* is in the initial state, as shown in FIGS. 14 to 16, the lighting device 10 can still be in the standing mode, and the telescopic assembly 131 may drive the lamp head 121 away from and toward the base 11*a*.

Figure 17:
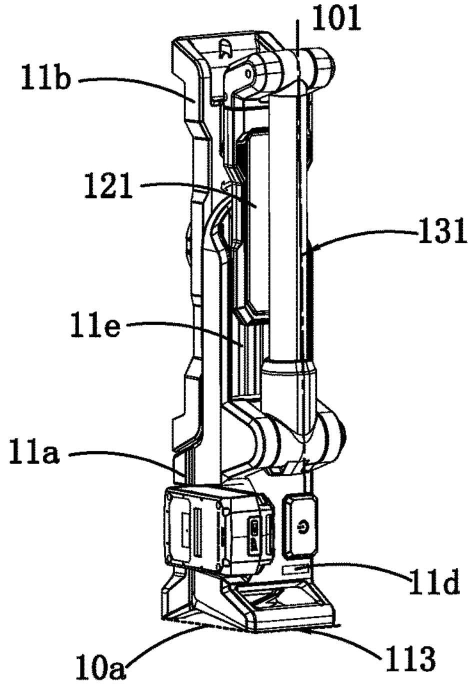
FIG. 17 is a structural view of a first example of the present application, where a lighting device is in a storage mode and a support mechanism is at a second support position.

In this example, the support mechanism 11 includes a first support position and a second support position. As shown in FIGS. 12 to 15, the support mechanism 11 is at the first support position, and a first side surface of the base 11*a* at the lower end 115 and a first end 118 of the support leg 11*b* form the resting surface 10*a*. The first end 118 includes multiple protruding contact surfaces 1181 that can perform avoidance and adjustment when the ground or the work surface is uneven. As shown in FIGS. 16 and 17, the support mechanism 11 is at the second support position, and a second side surface of the base 11*a* at the rear end 113 forms the resting surface 10*a*. The rear end 113 of the base 11*a* is heavier than the front end 112 of the base 11*a*. In this example, the battery pack 30 is mounted on a portion of the base 11*a* facing the rear end 113. For example, the battery pack 30 is mounted on a left side or rear side and near the rear end 113.

In other alternative examples, when the length of the support leg 11*b* extends to the rear end 113 of the base 11*a* and the support mechanism 11 is at the second support position, the second side surface and a second end of the support leg 11*b* form the resting surface 10*a*. In this example, the support mechanism 11 includes multiple support positions. Since the resting surface 10*a* has different areas for different support positions, the working conditions in which the lighting mechanism 12 can be used are further enlarged. In some examples, the support mechanism 11 further includes a third support position and more support positions, and the base 11*a* may be configured with different shapes so as to achieve different support positions.

In some alternative examples, an end of the support leg 11*b* is rotatably connected to the base 11*a*. The specific shape of the support leg 11*b* and the connection position between the support leg 11*b* and the base 11*a* are not intended to limit the essence of the present application. As a component that forms the resting surface 10*a* together with the base 11*a*, the support leg 11*b* is attached to the base 11*a* about a rotation axis. A positional relationship between the support leg 11*b* and the base 11*a* is adjusted so that the area of the outer contour of the resting surface 10*a* is adjusted. It is to be explained that the outer contour of the resting surface 10*a* refers to a shape covered by all portions of the base 11*a* and the support leg 11*b* in contact with the ground or the work surface. Alternatively, the outer contour of the resting surface 10*a* may be understood as a circle or a rectangle that covers a projection of the base 11*a* and the support leg 11*b* along a direction perpendicular to the ground or the work surface.

Figure 20:
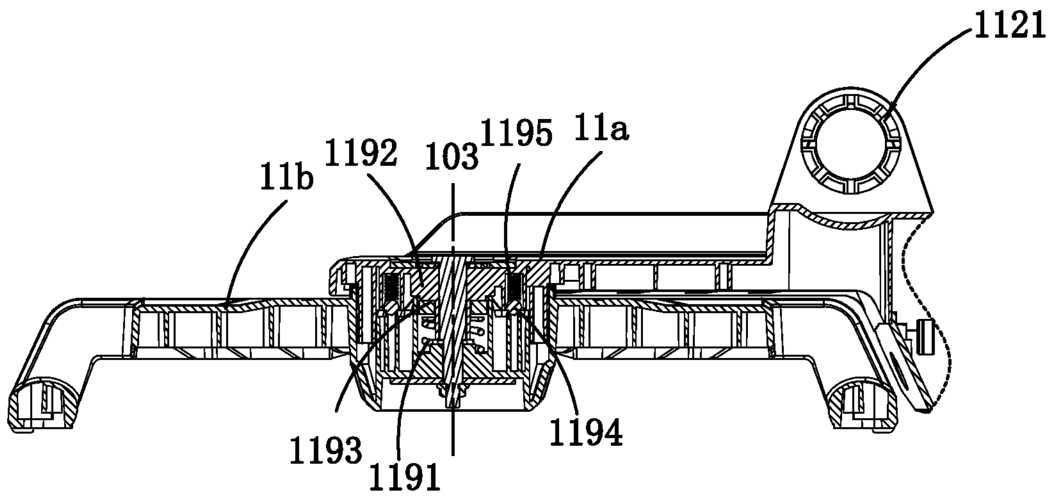
FIG. 20 is a sectional view of FIG. 18.
Figure 21:
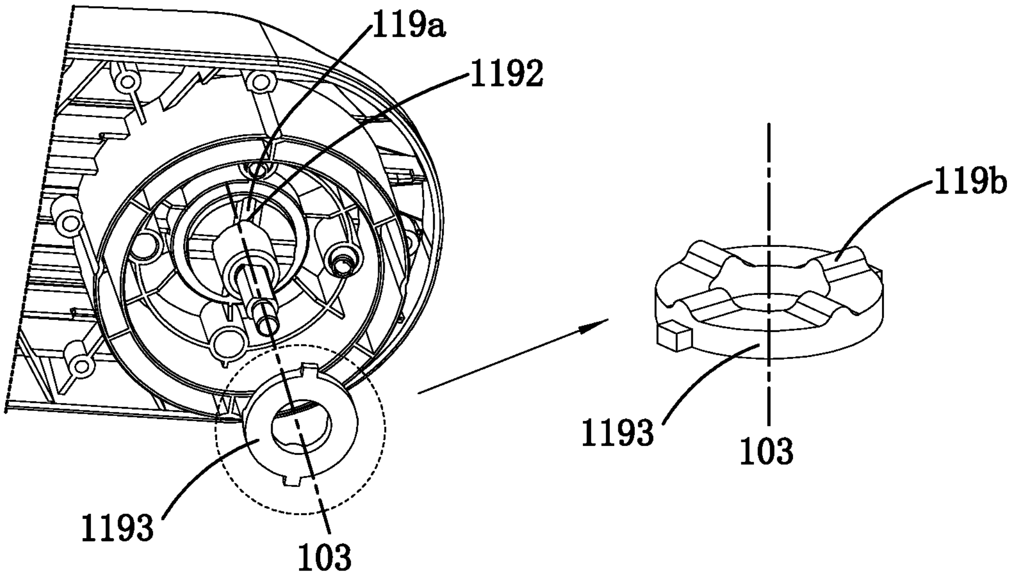
FIG. 21 is an exploded view of FIG. 18 taken from another perspective and showing some components of a first locking assembly, where second gear teeth show two angles.

As shown in FIGS. 20 and 21, the first locking assembly 11*c* includes an operating member and a first locking structure 119. In this example, the operating member is operated by the user to drive the locking structure to act. The operating member is disposed on the support leg 11*b* or the base 11*a*. In this example, the operating member is the support leg 11*b*. In some examples, the operating member may be disposed at another position of the lighting device 10. The operating member may be mechanically or electronically driven.

The first locking structure 119 includes a first gear member 1192 connected to the base 11*a*, a second gear member 1193 connected to the support leg 11*b*, and a biasing element 1191 for biasing the second gear member 1193 toward the first gear member 1192. The first gear member 1192 is provided with first engagement teeth 119*a* arranged along a circumferential direction of the third axis 103 and recessed inward. The second gear member 1193 is provided with second engagement teeth 119*b* arranged along the circumferential direction of the third axis 103 and mating with first engagement teeth 119*a*. After the engagement teeth of the first gear member 1192 and the second gear member 1193 are engaged with each other, the relative rotational displacement between the first gear member 1192 and the second gear member 1193 is restricted. The biasing element 1191 is connected between the support leg 11*b* and the second gear member 1193. The second gear member 1193 is circumferentially limited and connected to the support leg 11*b*, and the second gear member 1193 is displaced along the third axis 103 to compress the biasing element 1191. The first gear member 1192 is formed on or connected to the base 11*a*. An engagement tooth is provided with a guide surface and a limiting surface. When the support leg 11*b* is rotated, the second gear member 1193 is forced to rotate, the limiting surface is driven by the first gear member 1192, and the second gear member 1193 biases against the biasing element 1191 so that the second gear member 1193 compresses the biasing element 1191, and limiting surfaces of the first engagement teeth 119*a* and the second engagement teeth 119*b* are disengaged. The support leg 11*b* continues to be rotated, the limiting surface passes through the guide surface and then is in contact with the next limiting surface, and the biasing element 1191 applies a biasing force in a direction from the second gear member 1193 to the first gear member 1192. At this time, if no external force continues rotating the support leg 11$b$, the engagement teeth of the first gear member 1192 and the second gear member 1193 are engaged with each other. In this example, relative rotation positions between the support leg 11$b$ and the base 11$a$ are determined according to the number of engagement teeth and an interval between the engagement teeth of the first gear member 1192 or the second gear member 1193. In this example, the first locking structure 119 further includes a second biasing element 1195 and a rolling ball 1194 for rotational guidance and limiting. The second biasing element 1195 is compressed and released along the direction of the third axis, and the second biasing element 1195 is disposed in the base 11$a$. Specifically, the second biasing element 1195 is disposed at the periphery of the first gear member 1192. The rolling ball 1194 is in contact with the second biasing element 1195 and the support leg 11$b$ separately. When the support leg 11$b$ rotates, the rolling ball 1194 rolls with the support leg 11$b$. The second biasing element 1195 is elastically deformable to equalize the axial and circumferential motions of the support leg 11$b$. In some examples, the first gear member 1192 and the second gear member 1193 may be switched in position. The second biasing element and the rolling ball are disposed in the support leg. The essence of the present application is not affected and details are not disclosed one by one here.

In some alternative examples, the locking structure includes an electric motor and a pneumatic, hydraulic, or damping mechanism and the stop of the locking structure is not affected by a mechanical limiting mechanism, allowing stepless adjustment of the relative position between the support leg 11$b$ and the base 11$a$.

In this example, in order that the weight of the support mechanism 11 is increased so that the lighting device 10 can be stably placed in each form, the battery pack 30 is disposed on the base 11$a$. In other alternative examples, the weight of the support mechanism 11 may be increased through an increase of the weight of the base 11$a$ or the addition of other structures. When the telescopic assembly 131 moves between the first position and the second position, a projection of the center of gravity of the lighting device 10 is located within an outer contour of the support mechanism 11, and in an up and down direction, the center of gravity is close to the support mechanism 11.

Figure 22:
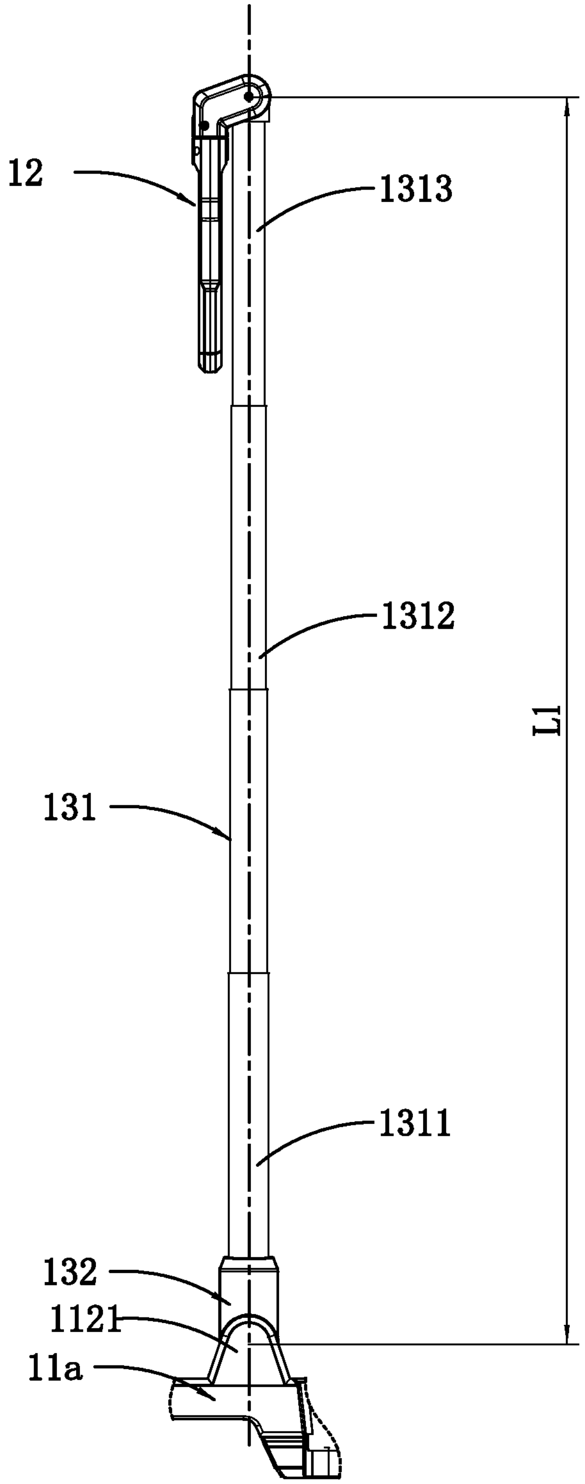
FIG. 22 is a structural view of a connection mechanism, a lighting mechanism, and part of a support mechanism in a first example of the present application, where a lighting device is in a standing mode, a telescopic assembly is at a second position, and the support mechanism is at a first support position.
Figure 23:
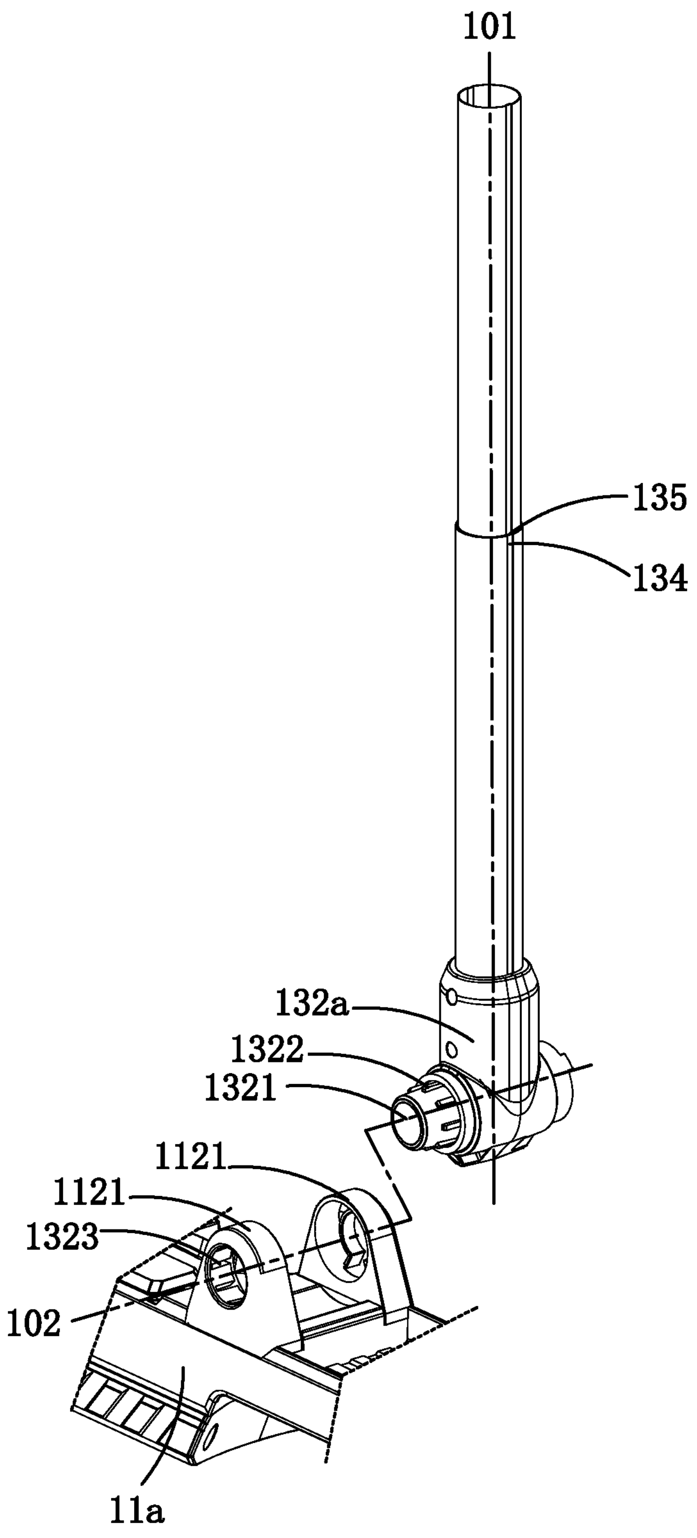
FIG. 23 is an exploded view of part of components in FIG. 22 and shows some components of a second locking assembly.
Figure 24:
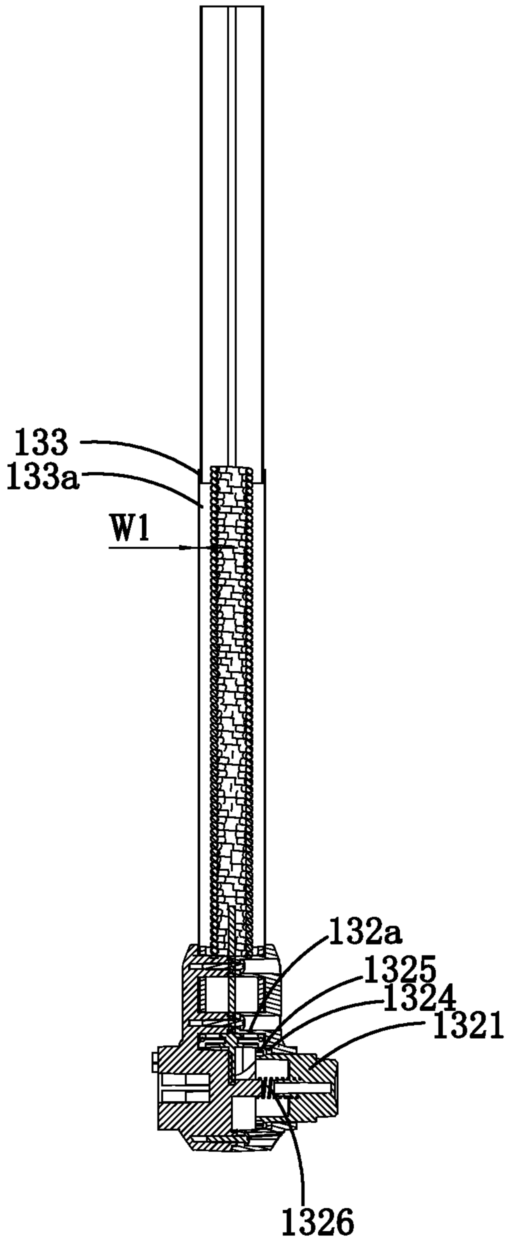
FIG. 24 is a sectional view of FIG. 23.

As shown in FIGS. 22 to 24, the connection mechanism 13 further includes a second locking assembly 132 connecting the telescopic assembly 131 and the base 11$a$. The telescopic assembly 131 is rotatably connected to the upper side of the base 11$a$ by the second locking assembly 132. In this example, a hinge seat 1121 is formed on the upper side of the base 11$a$, and the second locking assembly 132 is rotatably connected to the hinge seat 1121. The second axis 102 penetrates through the hinge seat 1121.

The second locking assembly 132 includes a body portion 132$a$, a second operating member 1321, first guide teeth 1322, first guide grooves 1323, first limiting teeth 1325, first limiting grooves 1324, and a third biasing element 1326. The second operating member 1321 slides and rotates within the body portion 132$a$. The body portion 132$a$ is fixedly connected to the telescopic assembly 131. The first guide teeth 1322 are disposed on an outer side surface of the second operating member 1321, and the first guide teeth 1322 uniformly protrude along a circumferential direction. The first guide grooves 1323 are disposed on an inner sidewall of the hinge seat 1121. The first guide teeth 1322 are operated to axially slide in the first guide grooves 1323. The rotation between the second operating member 1321 and the hinge seat 1121 about the second axis 102 is limited through the cooperation of the first guide teeth 1322 and the first guide grooves 1323. The third biasing element 1326 connects the body portion 132$a$ to the second operating member 1321, thereby biasing the second operating member 1321 away from the body portion 132$a$. The first limiting teeth 1325 are disposed at an end of the second operating member 1321 facing the body portion 132$a$, and multiple first limiting grooves 1324 mating with the first limiting teeth 1325 in shape are disposed on the body portion 132$a$. The first limiting grooves 1324 are uniformly arranged along the circumferential direction of the second axis 102. When the second operating member 1321 is operated to disengage the first limiting teeth 1325 from the first limiting grooves 1324, the second operating member 1321 biases against the third biasing member 1326 and the body portion 132$a$ is rotatable about the second axis. When the body portion 132$a$ reaches a proper position, an external force on the second operating member 1321 is removed and the third biasing element 1326 biases against the second operating member 1321. The second operating member 1321 is reset so that the first limiting teeth 1325 mate with the first limiting grooves 1324, and the rotation of the body portion 132$a$ is locked. In this example, the telescopic assembly 131 includes the first position and the second position, and thus the first limiting grooves 1324 are provided in correspondence to the first position and the second position of the telescopic assembly. In other alternative examples, the telescopic assembly includes multiple positions, and multiple first limiting grooves 1324 are provided in correspondence to the multiple positions of the telescopic assembly.

The telescopic assembly 131 includes multiple telescopic members that can be extended and retracted to achieve different rod heights. In this example, at least three elongated telescopic members are included. A first telescopic member 1311 is rotatably coupled to the base 11$a$, a third telescopic member 1313 is coupled to the lighting mechanism 12, and a second telescopic member 1312 is connected to the first telescopic member 1311 and the third telescopic member 1313. In this example, the second telescopic member includes two telescopic rods. In some examples, the second telescopic member includes one telescopic rod or more than two telescopic rods. The telescopic members are retractable concentrically relative to each other into a compact configuration. The third telescopic member 1313 extends within a hollow portion of the second telescopic member 1312, and the second telescopic member 1312 extends within a hollow portion of the first telescopic member 1311. The telescopic members are translatable relative to each other in the direction of the central axis 101. The second telescopic member 1312 and the first telescopic member 1311 each include a channel 133$a$ in which a limiting portion 133 is accommodated. The limiting portion 133 achieves stepless telescopic adjustment of the telescopic assembly 131. In this manner, the telescopic assembly 131 can be adjusted to any position within a rated height range according to the working condition.

The limiting portion 133 includes a two-way damping assembly, and the two-way damping assembly limits the telescopic motion of the telescopic assembly 131 under the action of the weight of the lamp head 121. In this example, the two-way damping assembly includes a damping rubber ring. The relative motion between the telescopic rods is limited by a frictional force provided by the damping rubber ring. The damping rubber ring is separately connected to the second telescopic member 1312 and the third telescopic member 1313.

Each of the first telescopic member 1311, the second telescopic member 1312, and the third telescopic member

1313 is further provided with a circumferential limiting structure. In this example, each of the first telescopic member 1311, the second telescopic member 1312, and the third telescopic member 1313 is provided with a groove 134 and a protrusion 135 that axially extend. The protrusion 135 is embedded into the groove 134, thereby limiting the circumferential displacements of the first telescopic member 1311, the second telescopic member 1312, and the third telescopic member 1313 during their slides along the axis. In some examples, circumferential limiting may be implemented by the shape of the rod, and a cross-section of the rod is hexagonal.

In this example, the telescopic member is made of a lightweight metal material, and a wall thickness W1 of the telescopic member is less than or equal to 1 mm. In this example, the wall thickness W1 of the telescopic member is 0.75 mm. The outer diameter of the telescopic member is less than or equal to 40 mm. In this example, the outer diameter of the telescopic member is 35-36 mm. In this manner, the telescopic assembly 131 is lightweight. In this example, the telescopic assembly 131 has the longest state and a shortest state along the central axis 101, that is, a rated height L1 of the telescopic assembly 131 ranges from 0.33 meters to 1.32 meters. A maximum bearing capacity of the telescopic assembly 131 is greater than or equal to 10 N. In some examples, the maximum bearing capacity of the telescopic assembly 131 is 13 N.

As shown in FIGS. 25 to 28, the lighting mechanism 12 includes a third locking assembly 122 that rotatably connects the lamp head 121 to the telescopic assembly 131. In this manner, the lamp head 121 can be adjusted to various orientations to emit light in various directions (that is, adjusted in a direction of rotation). In this example, the third locking assembly 122 includes a first hinge portion 1221 and a second hinge portion 1222. The first hinge portion 1221 rotates the lamp head 121 within 360° around the direction of the central axis 101. In this example, the first hinge portion 1221 rotates the lamp head 121 within 360° about a fifth axis 105 parallel to the central axis 101. In some examples, the first hinge portion 1221 rotates the lamp head 121 within 360° about the central axis 101. The first hinge portion 1221 includes a rotating shaft portion **1221*a* extending into a lamp head assembly and a damping portion 1221*b* sleeved on an outer side of the rotating shaft portion 1221*a*. The damping portion 1221*b* is connected to the lamp head housing in a damping manner such that the lamp head rotates within 360° about the central axis 101** and is damped and locked at a desired position.

The second hinge portion 1222 rotates the lamp head 121 along a fourth axis 104 perpendicular to the central axis 101. In this example, the fourth axis 104 is parallel to the second axis 102. In this example, the second hinge portion 1222 enables the lamp head 121 to rotate by 0° to 180° about the fourth axis 104. In some examples, the second hinge portion 1222 enables the lamp head 121 to rotate by 0° to 270° about the fourth axis 104. In some examples, the second hinge portion 1222 enables the lamp head 121 to rotate by 0° to 360° about the fourth axis 104.

Figure 28:
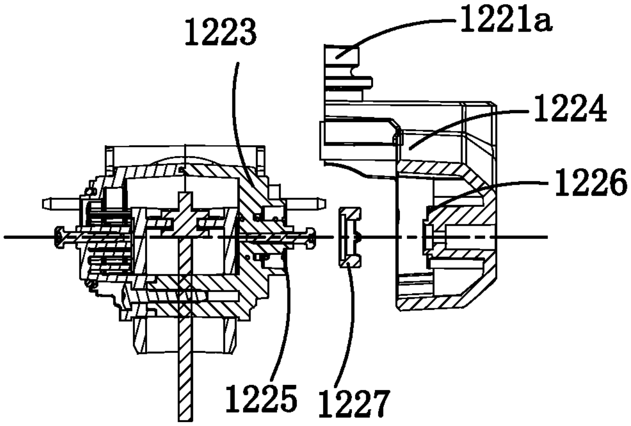
FIG. 28 is a sectional view of an exploded view of a third locking assembly in FIG. 25.

As shown in FIG. 28, the second hinge portion 1222 includes a first hinge housing 1223 and a second hinge housing 1224, where the first hinge housing 1223 is fixedly connected to the telescopic assembly 131. The second hinge housing 1224 is connected to the lamp head 121, and the rotation of the lamp head 121 relative to the second hinge housing 1224 about the fourth axis 104 is limited. In this example, the rotating shaft portion **1221*a* of the first hinge portion 1221 is formed on the second hinge housing 1224. The second hinge portion 1222 further includes a fourth biasing element 1225, a third gear tooth 1226, and a fourth gear tooth 1227. The third gear tooth 1226 is formed on or connected to the second hinge housing 1224. The fourth gear tooth 1227 is connected to the first hinge housing 1223, and the fourth gear tooth 1227 moves relative to the first hinge housing 1223 along the fourth axis 104. The fourth biasing element 1225 connects the fourth gear tooth 1227 to the first hinge housing 1223 to bias the fourth gear tooth 1227 toward the third gear tooth 1226. When the second hinge housing 1224 is rotated and locked relative to the first hinge housing 1223, the working principle of the second hinge housing 1224 and the first hinge housing 1223** is the same as that of the support leg and the base. The details are not repeated here.

The lamp head 121 includes the lamp head housing **121*a*, the light board 1213, a protective cover 1216, and a reflective ring 1215. The lamp head housing 121*a* is at least partially made of thermally conductive plastic, and the lamp head housing 121*a* dissipates the heat of the light board 1213. In this manner, no heat dissipation component needs to be provided in the lamp head 121 so that the lamp head 121 is lightweight. In this example, the weight of the lamp head 121 is less than or equal to 310 g. It is to be explained that the weight of the lamp head 121 does not include that of the third locking assembly 122. In some examples, the weight of the lamp head 121 is less than or equal to 300 g, 280 g, 260 g, 240 g, or 220 g. In this example, the light flux of the light emitted by the lamp head 121** at the maximum power is greater than or equal to 2200 lm. In some examples, the light flux is greater than or equal to 2500 lm or 2700 lm.

In this example, the lamp head housing **121*a* is formed with an accommodation space in which the light board 1213 is disposed. The lamp head housing 121*a* includes a first housing portion 1211 and a second housing portion 1212, and the first housing portion 1211 and the second housing portion 1212 are connected to form the accommodation space. Lamp beads 1214 are provided on the light board 1213. The lamp beads 1214 constitute a main emitting surface, and the area of the main emitting surface is greater than or equal to 3000 square millimeters and less than or equal to 3500 square millimeters. To quickly dissipate heat emitted by the lamp beads 1214, the light board 1213 is further configured to be made of an aluminum plate. The reflective ring 1215 is further provided on a side of the light board 1213 facing the lamp beads 1214, and the reflective ring 1215 mates with the lamp beads 1214. Along a direction perpendicular to a plane of the light board 1213, the distance between a side of the light board 1213 on which the lamp beads 1214 are not provided and the lamp head housing facing the side of the light board 1213 is L3. In this example, L3 denotes the distance from the side of the light board 1213 on which the lamp beads 1214 are not provided to an inner side of the first housing portion 1211. Along the direction perpendicular to the plane of the light board 1213, the accommodation space in the lamp head housing has a distance L4. In this example, L4 denotes the distance from the inner side of the first housing portion 1211 to an inner side of the second housing portion 1212**. L3/L4 is greater than or equal to 0.2 and less than or equal to 0.5. In this example, L3/L4 is 0.35. Specifically, L3 is 4.8 mm and L4 is 13.7 mm. In this manner, a gap between the light board and the lamp head housing is reasonable, which is conducive to heat dissipation.

The second housing portion 1212, that is, the housing on the side of the light board facing the lamp beads 1214, is formed with an opening through which light can pass, the protective cover 1216 is used for closing the opening, and the protective cover 1216 allows the light to be emitted out. The protective cover 1216 has a light-transmissive structure. When the lamp beads 1214 on the light board 1213 are activated, different effects can be achieved through the control of a microcomputer chip. The different effects include, but are not limited to, lighting together to the same brightness at the same time, allowing the lamp beads to light up at different times and in different sequences to form a running water lamp effect, and the gradual change of the lamp beads from high brightness to low brightness.

As an example, the whole lamp head housing 121*a* is made of thermally conductive plastic and has a thermal conductivity greater than or equal to 3.0 W/(m·K) so that heat of a heat sink can be quickly dissipated. The thermally conductive plastic is formed by uniformly filling a polymer with thermally conductive filler particles, fibers, or plies. A filler includes metal oxides (such as $Al_2O_3$, MgO, and $SiO_2$), metal nitrides (such as AlN, $Si_3N_4$, and BN), SiC, $B_4C_3$, or the like. In this manner, the lamp head 121 is lightweight without affecting the heat dissipation efficiency.

As an example, the structure of the lamp head ensures the gap between the light board and the lamp head housing, L3/L4 is greater than or equal to 0.2 and less than or equal to 0.5, and the lamp head housing 121*a* is made of one of thermally conductive plastics or a combination thereof, so that the lamp head is lightweight while the heat dissipation efficiency is ensured. In this manner, the center of gravity of the whole machine is closer to the support mechanism 11. When the battery pack 30 is detached from the lighting device 10, the ratio of the weight of the lighting device 10 to the weight of the lamp head 121 is greater than or equal to 10. In this example, the weight of the lamp head 121 is less than or equal to 310 g and the weight of the lighting device 10 is less than or equal to 3200 g.

As shown in FIG. 12, when the lighting device 10 is in the standing mode, the support mechanism 11 is at the first support position, and the telescopic assembly 131 is at the second position and in the longest state, the height L1 of the lighting device 10 is greater than or equal to 1 meter and less than or equal to 1.8 meters. As shown in FIG. 16, when the lighting device 10 is in the standing mode, the support mechanism 11 is at the second support position, and the telescopic assembly 131 is at the second position and in the longest state, the height L1 of the lighting device 10 is greater than or equal to 1.2 meters and less than or equal to 2 meters. As shown in FIG. 14, when the support mechanism 11 is at the first support position, and the telescopic assembly 131 is at the first position and in the longest state, the length L of the lighting device 10 along the central axis is greater than or equal to 1 meter and less than or equal to 1.8 meters. It is to be explained that when the telescopic assembly 131 is at the first position, the central axis is closer to the resting surface so that the height L of the lighting device 10 along the central axis here may be understood as a length dimension of the lighting device 10 relative to the resting surface. When the lighting device 10 is in the standing mode and the telescopic assembly 131 at the second position, the height is high enough to allow a larger region to be illuminated by the standing lamp 100. When the telescopic assembly 131 is at the first position, the standing lamp 100 is low enough in height and long enough in length.

The lighting device 10 is further provided with a charging interface 11*d*. In this example, the charging interface 11*d* is disposed on the base 11*a*. In other alternative examples, the charging interface 11*d* may be disposed on the connection mechanism 13 or the lighting mechanism 12.

The charging interface 11*d* may supply power to an external device, such as an electronic device of the user, including a mobile phone, a tablet, a wearable device, and the like. When the user needs to charge the mobile phone, the mobile phone is placed on the base 11*a* or at another position and connected to the charging interface 11*d* through a data cable so that the mobile phone is charged through the charging interface 11*d*. The charging interface 11*d* is specifically one or more of a universal serial bus (USB) interface, a type-c interface, and a lighting interface. The battery pack 30 on the lighting device 10 may be charged through the charging interface 11*d*. Therefore, when it is inconvenient to charge the lighting device 10, the battery pack 30 may be charged by using the remaining power of the mobile phone or some other adaptable devices. Alternatively, the battery pack 30 is connected to an in-vehicle power supply and charged by the in-vehicle power supply. Alternatively, the lighting device 10 may be directly powered through the charging interface 11*d*.

In this example, the support mechanism 11 is provided with rollers so that the support mechanism 11 moves in the field more reliably. Each roller has a rotation locking structure to ensure the stability of placement of the lighting device 10. The rollers are detachably connected to the support mechanism 11. In some examples, the rollers and a plate are connected to form a whole and the support mechanism 11 is detachably connected to the whole.

Figure 13:
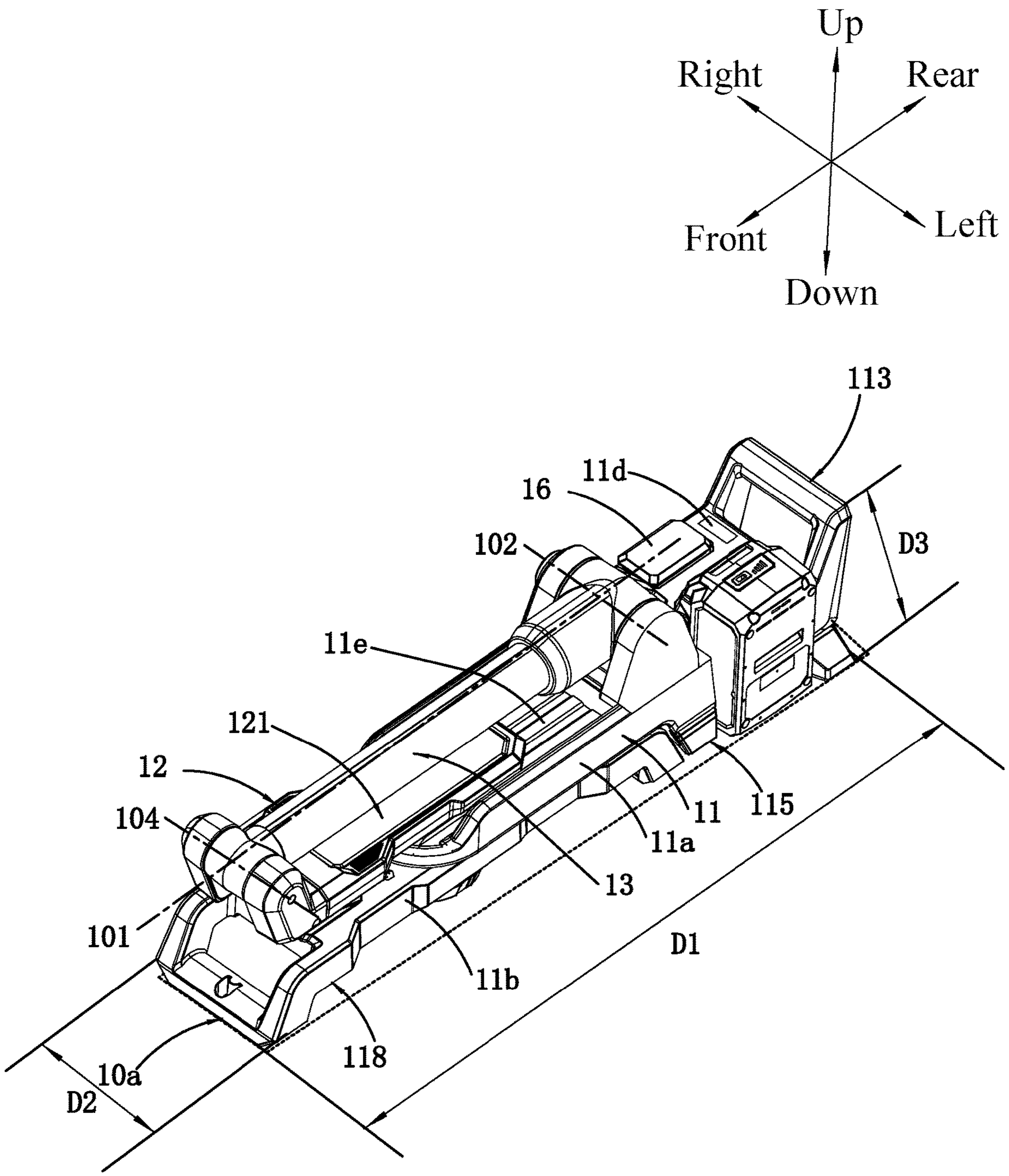
FIG. 13 is a structural view of a first example of the present application, where a lighting device is in a storage mode and a support mechanism is at a first support position.

As shown in FIGS. 13 and 17, when the lighting device 10 is in the storage mode, the lighting device 10 needs to be as compact as possible for convenient storage and carrying. When the lighting device 10 is in the storage mode, the support leg 11*b* is in the initial state. In this example, the width of the support leg 11*b* is less than or equal to the width of the base 11*a*. In this manner, the support mechanism 11 is more compact when the support leg 11*b* is in the initial state. In the storage mode, the telescopic assembly 131 is in a second state. It is to be understood that the second state does not necessarily correspond to a shortest length of the telescopic assembly 131. In this case, the central axis 101 is parallel or basically parallel to the length direction of the base 11*a*. The lamp head 121 rotates to between the base 11*a* and the telescopic assembly 131. To protect the lamp head 121, a lamp head accommodation groove 11*e* is provided on a side surface of the base 11*a* at the upper end. The lamp head 121 is accommodated in the lamp head accommodation groove 11*e*.

In the storage mode, the overall outer contour of the lighting device 10 does not exceed the outer contour of the support mechanism 11. In this example, as for storage dimensions of the lighting device 10, a dimension D1 in the front and rear direction is less than or equal to 600 mm, a dimension D2 in a left and right direction is less than or equal to 200 mm, and a dimension D3 in the up and down direction is less than or equal to 200 mm. In the storage mode, the lighting device 10 is supported by the support mechanism 11. In this manner, the lighting device 10 in the storage mode can be stably placed on the ground or the work surface without the external force. In the storage mode, the support mechanism 11 also includes the first support mode and the second support mode. In a storage mode, the support leg 11*b* is used as a handle for the user to conveniently hang and store the lighting device 10 or carry the lighting device 10 by hand.

Figure 29:
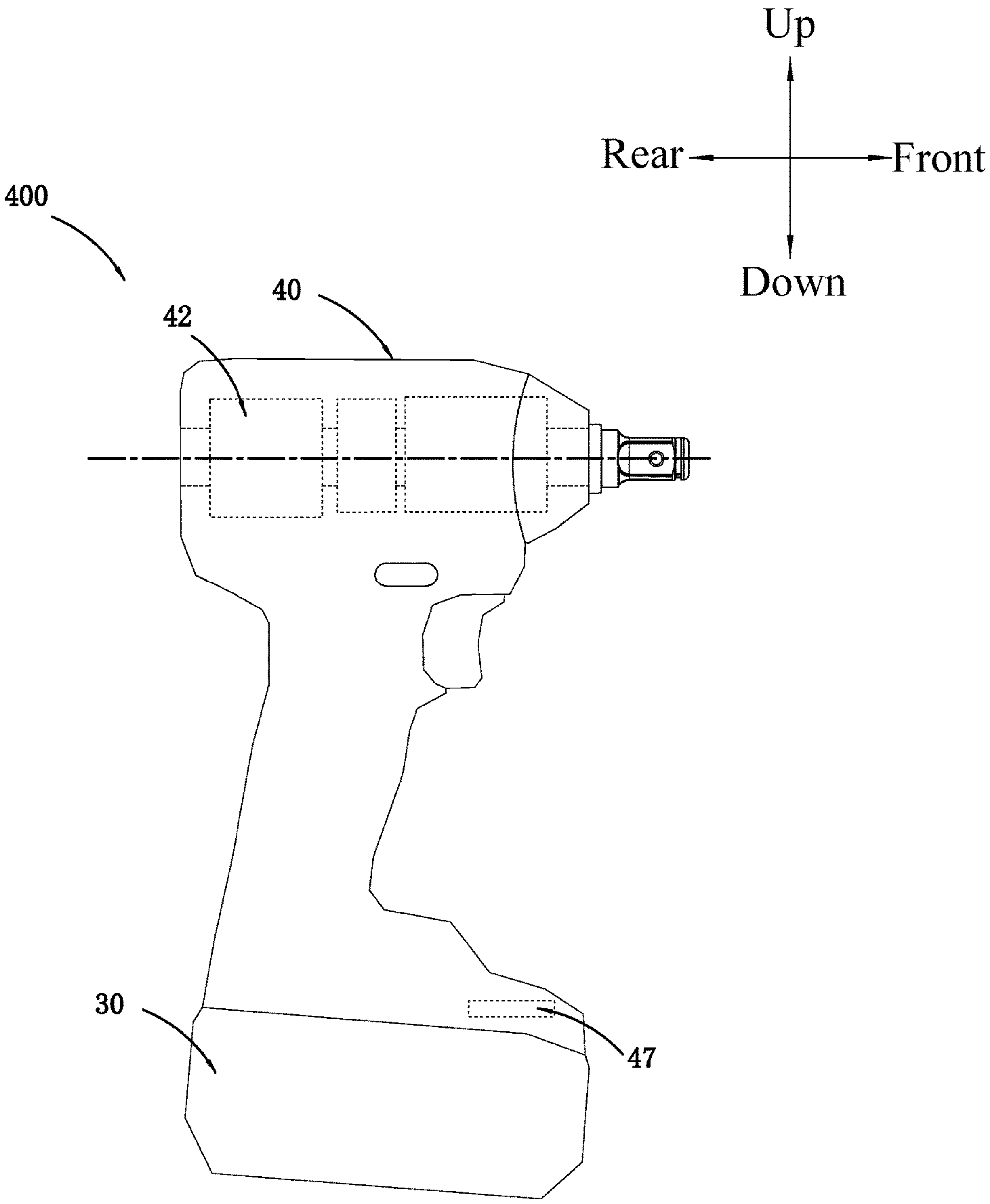
FIG. 29 is a structural view of a second example of a power tool in the present application.

FIG. 29 shows a second example of the power tool of the present application. Parts of the first example that are compatible with this example can be applied to this example, and only differences between this example and the first example are described below.

Figure 30:
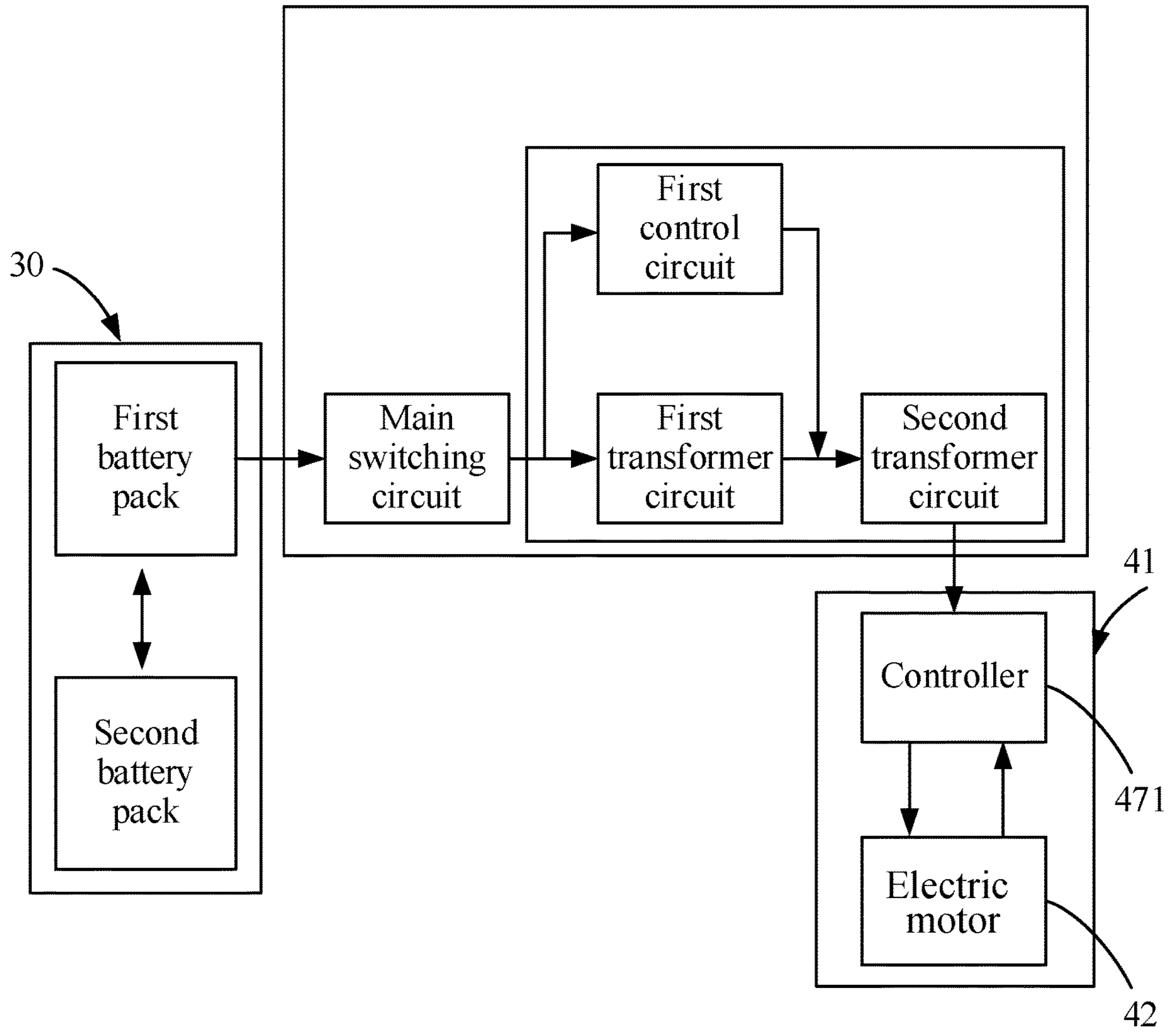
FIG. 30 is a schematic diagram of electrical structures of a power tool in this example.
Figure 31:
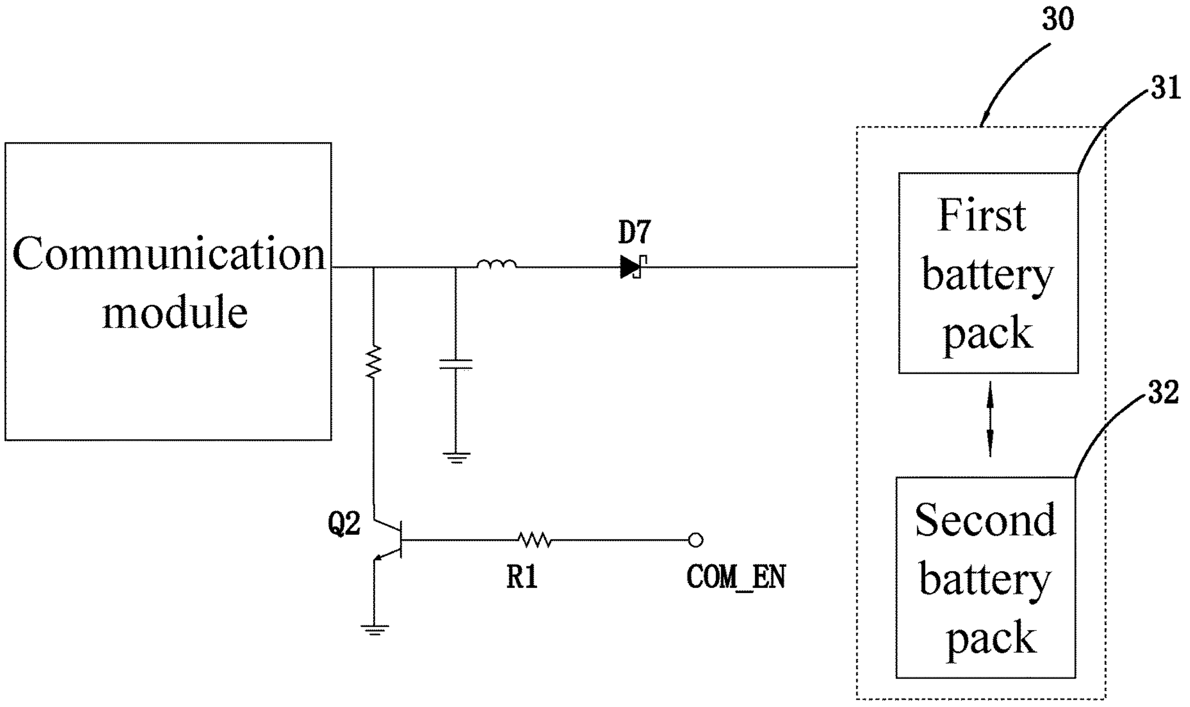
FIG. 31 is a circuit diagram of another specific example of a conversion circuit in the present application.

As shown in FIGS. 29 to 31, in this example, a power tool 400 includes a power tool body 40 and the direct current power supply 30. The power tool body 40 is specifically an impact wrench. The power tool body 40 differs from that in the first example of the present application in that a target work mechanism 41 includes an electric motor 42 and a controller 471 for controlling the electric motor 42. It is to be understood that the power tool body in which the target work mechanism 41 includes the electric motor 42 and the controller 471 for controlling the electric motor 42 may be a vegetation care tool, such as a grass trimmer, a mower, a hedge trimmer, and a chain saw. Alternatively, the power tool may be a cleaning tool, such as a blower, a snow thrower, and a washer. Alternatively, the power tool may be a drill-like tool, such as a drill, a screwdriver, a wrench, and an electric hammer. Alternatively, the power tool may be a saw-like tool, such as a reciprocating saw, a jigsaw, and a circular saw. Alternatively, the power tool may be a table tool, such as a table saw, a miter saw, a metal cutter, and an electric router. Alternatively, the power tool may be a sanding tool, such as an angle grinder and a sander. The above cannot be construed as limiting the present invention.

In this example, the electric motor 42 is specifically a brushless motor. The controller 471 is disposed on a control circuit board 47, where the control circuit board 47 includes a PCB and an FPC board. The controller 471 uses a dedicated control chip, for example, a single-chip micro-computer and an MCU.

In the related art, different nominal voltages are adjusted through circuit regulation so that an operating voltage applied to the electric motor 42 is a constant voltage suitable for the electric motor 42. The applicant has found that in the power tool body, the electric motor 42 is compatible with a relatively wide voltage range. However, electronic components of the controller 471 for controlling the electric motor 42 have high precision and are compatible with a small range of operating voltages. When the nominal voltage of the connected battery pack is inappropriate, the controller 471 may be damaged or even scrapped. However, as the range of the nominal voltage of the adapted battery pack is required to be larger, the associated circuit regulation fails to satisfy the requirement on the accuracy of the operating voltage of the controller 471.

An example in which the target work mechanism 41 includes the controller 471 is used in the example of the present application so as to illustrate a specific implementation in which the power tool body 40 regulates a voltage applied to the controller 471 when different nominal voltages are connected. It is to be understood that after the relatively stringent voltage requirement of the controller 471 is satisfied, the voltage adaptation requirement of the electric motor 42 can also be satisfied. The power tool body 40 regulates the voltage applied to the controller 471 in the same manner as in the first example.

In this example, as shown in FIG. 31, as another specific example of the conversion circuit, the conversion circuit includes a first switching device Q2 and a Schottky diode D7. The input terminal of the conversion circuit is connected to a communication power supply COM_EN. The signal ground wire is connected to an emitter S of the first switching device Q2, a cathode of a diode D3 is connected to the battery pack 30, an anode of the diode D3 is connected to a collector C of the first switching device Q2, and the communication power supply COM_EN is connected to a base B of the first switching device Q2.

In this manner, when the communication interface of the second battery pack 32 is connected, the machine controls the communication power supply to supply power to the conversion circuit, and the communication signal can be normally detected. When the first voltage detection interface of the first battery pack 31 is connected, the machine controls the communication power supply to cut off the power supply, and at the same time, a reverse cut-off function of the diode D7 is enabled so as to prevent the current leakage of the cell of the first battery pack 31.

The conversion circuit is provided so that one input terminal of the power tool body 40 can be compatible with both the communication signal and the electrical signal. In this example, the first voltage detection terminal is prevented from being charged by and discharged to the power tool body 40 while the communication function of the communication interface is considered. The safety of the battery pack and the power tool body 40 is protected.

Figure 32:
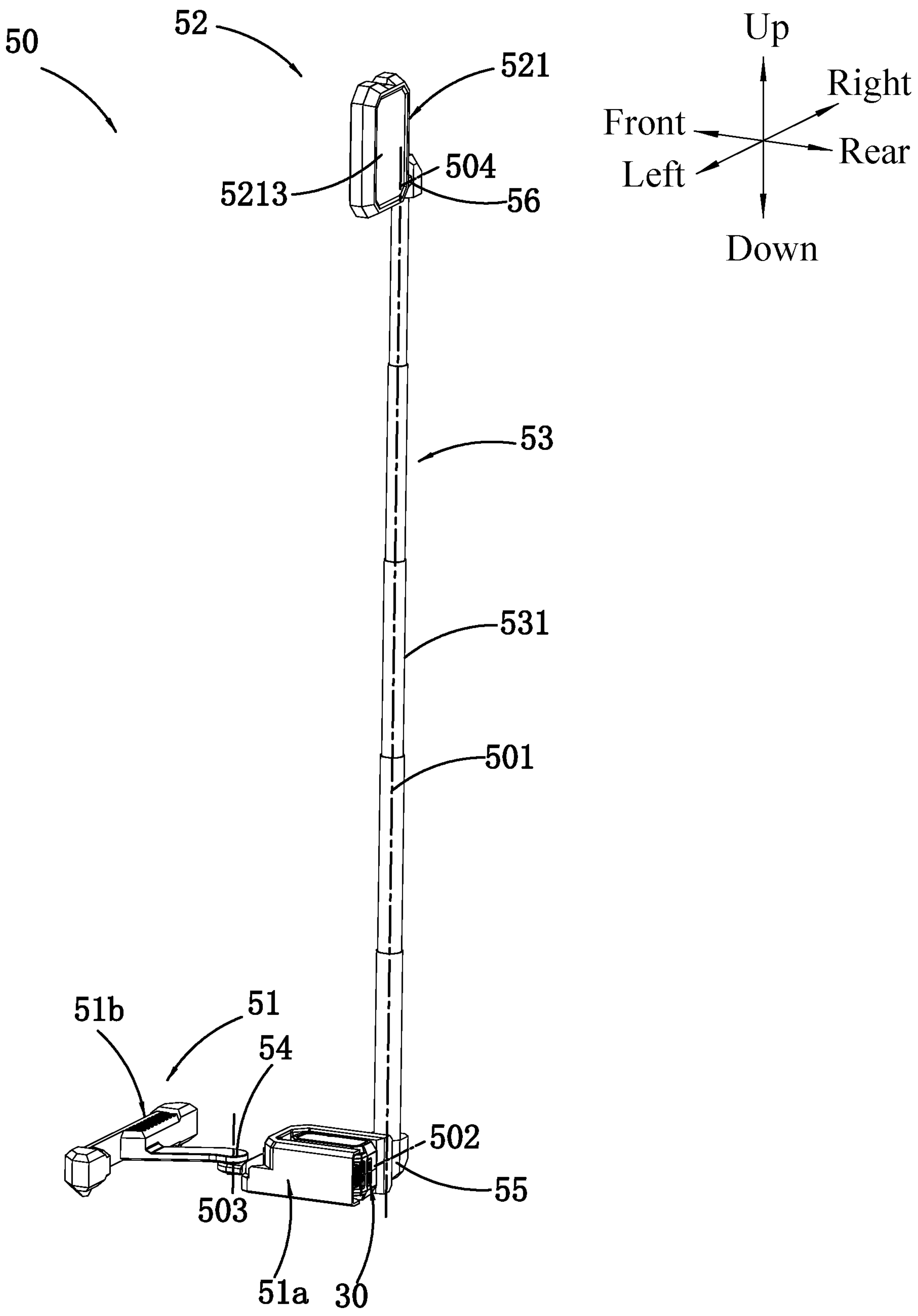
FIG. 32 is a structural view of alighting device in a standing mode and a telescopic portion in a first state according to a third example of the present application.
Figure 33:
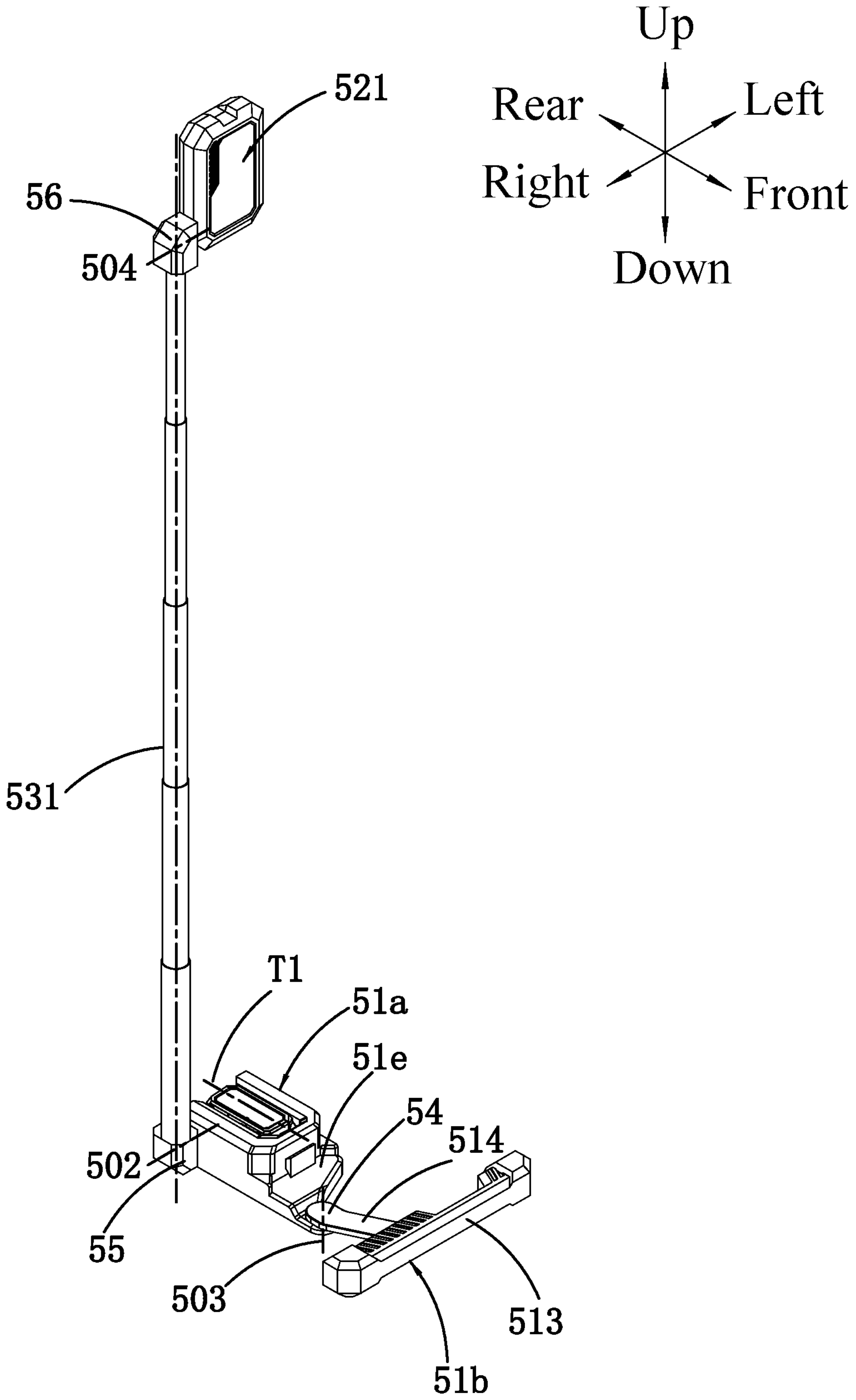
FIG. 33 is a structural view of FIG. 32 from another perspective.
Figure 34:
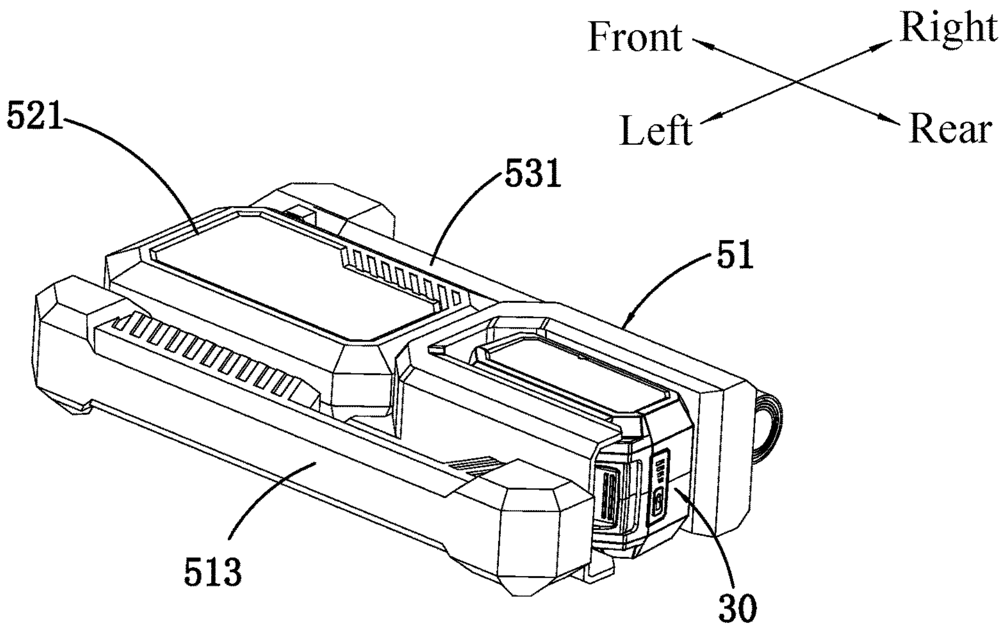
FIG. 34 is a structural view of a lighting device in a storage mode according to a third example of the present application.
Figure 35:
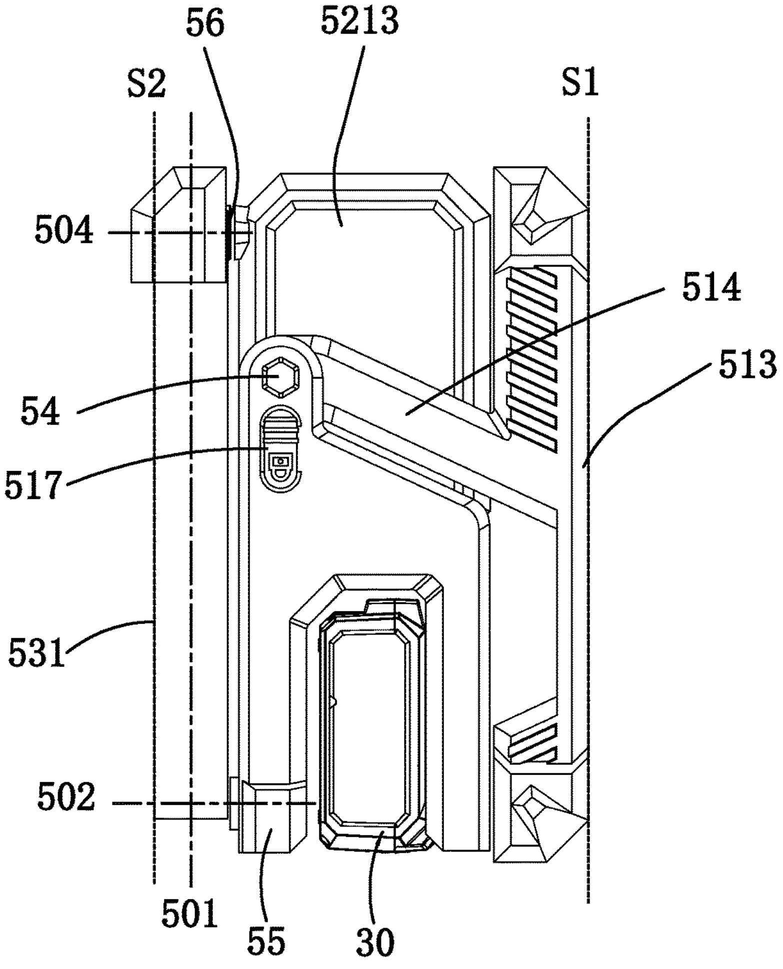
FIG. 35 is a bottom view of FIG. 34.
Figure 36:
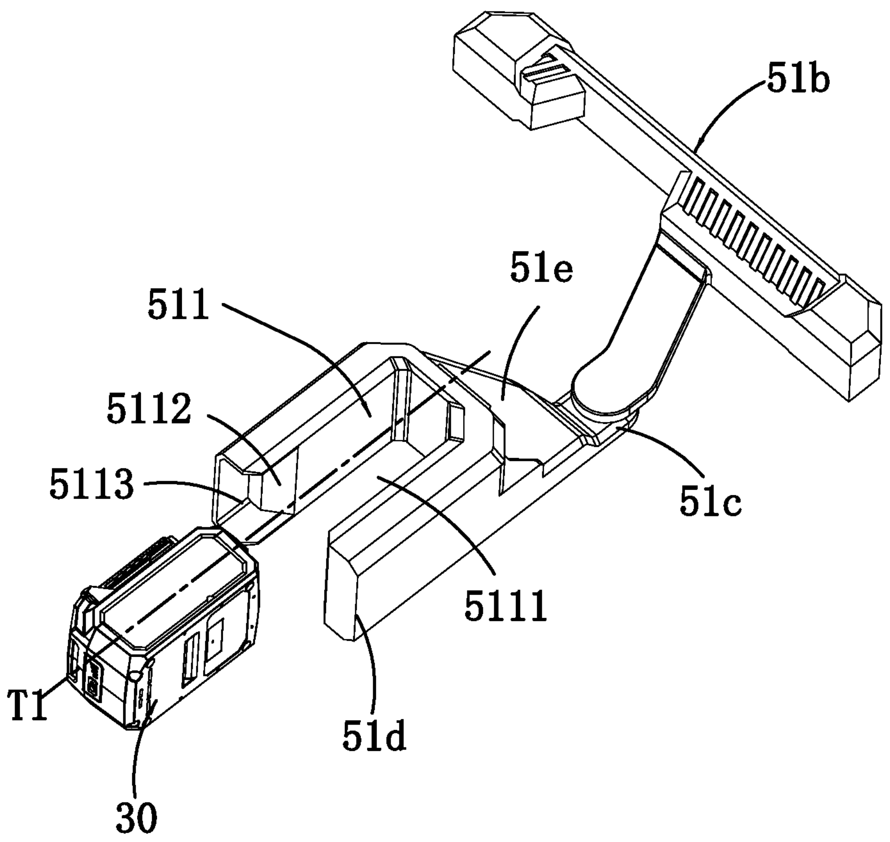
FIG. 36 is an exploded view of FIG. 34 from another perspective.

FIG. 32 shows a third example of the present application. Parts of the first example that are compatible with this example can be applied to this example, and only differences between this example and the first example are described below.

FIGS. 32 to 36 show the third example of the present application. A lighting device 50 includes a support mechanism 51, a lighting mechanism 52, a connection mechanism 53, and an energy source. This example differs from the first example in that the support mechanism 51, the lighting mechanism 52, and the connection mechanism 53 have different specific structures and are connected in different manners.

The support mechanism 51 includes a base 51*a* and a support leg 51*b*. The support leg 51*b* is pivotally connected to the base 51*a*. It is to be understood that the support leg 51*b* is directly connected to the base 51*a* or may be indirectly connected to the base 51*a* by another component. The lighting mechanism 52 includes a lamp head 521 for emitting light. The connection mechanism 53 is movably connected to the base 51*a*. It is to be understood that the connection mechanism 53 may be directly connected to the base 51*a* or may be indirectly connected to the base 51*a* by another component. The connection mechanism 53 includes a telescopic assembly 531 that can be extended or retracted to different lengths, where the telescopic assembly 531 has a central axis 501. In this example, the telescopic assembly 531 is a multi-stage adjustable telescopic rod, and the length of the telescopic rod may be adjusted manually or electrically.

The lighting device 50 may be switched between the standing mode and the storage mode. It is to be understood that in the standing mode, the lighting device 50 is in a working state and the user can use the lighting device 50 to illuminate the work region; and in the storage mode, the lighting device 50 is convenient for the user to carry.

When the lighting device 50 is in the standing mode, the lighting device 50 is configured to be supported by a resting surface formed by the support mechanism 51. It is to be understood that the lighting device 50 in the standing mode is placed on the ground or the work surface for use and the resting surface formed by the support mechanism 51 is in contact with the ground or the work surface. Providing support here means that the lighting device 50 can be placed stably on the ground or the work surface without relying on the external force.

In this example, one support leg is provided. When the lighting device 50 is in the standing mode, a first end of the support leg 51*b* is connected to the base 51*a*, a second end of the support leg 51*b* moves away from the base 51*a*, and the lamp head 521 moves away from the base 51*a*. A projection of the second end of the support leg 51*b* on the resting surface is at least partially located outside a projection of the base on the resting surface. When the lighting device 50 is in the storage mode, the support leg 51*b* moves toward the base 51*a*, and the lamp head 521 moves toward the base 51*a*. Specifically, when the lighting device 50 is in the standing mode, the support leg 51*b* supports the lighting device 50 and is in contact with the ground. It is to be understood that the support leg 51*b* provides a first support for the lighting mechanism 52. The base 51*a* is used as a second support, where the lower bottom surface of the base 51*a* is at least partially in contact with the ground.

In this example, when the lighting device 50 is in the standing mode, the support leg 51*b* rotates to a front side of the base 51*a*, and left and right ends of the second end of the support leg 51*b* extend toward the left and right sides of the base 51*a*, respectively. It is to be understood that a line between the left and right ends of the support leg 51*b* is parallel to or inclined to a line between left and right sidewalls of the base 51*a*. In this example, both the left and right ends of the support leg 51*b* extend beyond two sides of the base 51*a*, increasing the stability of the base 51*a*. That is to say, one support leg 51*b* and the base 51*a* constitute a tripod-type support, where the base 51*a* provides one support of the tripod-type support and the support leg 51*b* provides the other two supports of the tripod-type support. One support leg 51*b* and the base 51*a* can still provide a stable tripod-type support for the lighting mechanism 52 so that the whole machine is simple in structure and convenient to operate, and the whole machine is reduced in mass and convenient to transport and store.

The first support provided by the support leg 51*b* forms several first support points when in contact with the ground. It is to be understood that the first support points are not necessarily located in the same horizontal plane due to unevenness of the ground or the resting surface.

In the standing mode, the resting surface of the support mechanism 51 supports the lighting device 50 so that the lighting device 50 is stably placed on the ground or the work surface without relying on the external force. The resting surface of the support mechanism 51 is formed by at least one surface of the base 51*a* and the ends of the support leg 51*b*.

In this example, the support leg 51*b* includes a support portion 513 for providing a support function and a connecting portion 514, where the first support points are disposed on the support portion 513. The support portion 513 forms the second end of the support leg 51*b*. In this example, the support portion 513 is a rod, and the support leg 51*b* includes only one support portion 513. When the lighting device 50 is in the standing mode, the support portion 513 rotates to the front side of the base 51*a*, and the left and right ends of the support portion 513 protrude beyond the left and right sides of the base 51*a* in a left and right direction, respectively. The connecting portion 514 is rotatably connected to the base 51*a* through a first shaft 54. In this example, one end of the connecting portion 514 connected to the first shaft 54 forms the first end of the support leg 51*b*. When the lighting device 50 is switched between the standing mode and the storage mode, the support portion 513 rotates about a third axis 503 relative to the base 51*a*, where the third axis 503 is an axis of the first shaft 54.

The connection mechanism 53 is rotatably connected to the base 51*a* through a second shaft 55, and the connection mechanism 53 rotates about a second axis 502 relative to the base 51*a*, where the second axis 502 is a central axis of the second shaft 55. The lamp head 521 is rotatably connected to the connection mechanism 53 through a third shaft 56. The lamp head 521 rotates about a fourth axis 504 relative to the connection mechanism 53. The fourth axis 504 is a central axis of the third shaft 56.

A center plane is provided for the base 51*a*, where the center plane is parallel to the front and rear direction. A front end of the base 51*a* in the front and rear direction is a first end 51*c*, and a rear end of the base 51*a* in the front and rear direction is a second end 51*d*. The first shaft 54 is disposed at the first end 51*c*, and the second shaft 55 is located at the second end 51*d*. The first shaft 54 is disposed at the front end or on the left or right side of the front end of the base 51*a*, and the second shaft 55 is disposed at the rear end or on the left or right side of the rear end of the base 51*a*. In this example, the first shaft 54 is located at the front end of the base 51*a*, and the second shaft 55 is located on a side of the rear end of the base 51*a*. The third axis 503 is perpendicular to the second axis 502, and the second axis 502 is parallel to the fourth axis 504.

When the lighting device 50 is in the storage mode, the first shaft 54 is located between the second shaft 55 and the third shaft 56. Specifically, the third shaft 56, the first shaft 54, and the second shaft 55 are sequentially arranged in the front and rear direction. When the lighting device 50 is in the storage mode, the support portion 513 and the telescopic assembly 531 form at least part of an outer contour of the lighting device 50. In this example, the support portion 513 and the telescopic assembly 531 are disposed on the left and right sides of the base 51*a*, respectively, and the connecting portion 514 is located on the front side of the base 51*a*. The base 51*a* is at least partially located between the support portion 513 and the telescopic assembly 531. A plane where an outer edge of the support portion 513 in the left and right direction is located is a first plane S1, and a plane where an outer edge of the telescopic rod in the left and right direction is located is a second plane S2. The first shaft 54 is located between the first plane and the second plane. The base 51*a* is located between the first plane and the second plane. When the lighting device 50 is in the storage mode, the lamp head 521 is at least partially located at the first end 51*c* of the base 51*a* and the lamp head 521 is located between the first plane and the second plane.

In this example, a lamp head accommodation portion 51*e* is provided at the first end 51*c* of the base 51*a*. When the lighting device 50 is in the storage mode, the lamp head accommodation portion 51*e* accommodates at least part of the lamp head 521. Specifically, the lamp head accommodation portion 51*e* matches the lamp head 521 in shape and size. The first shaft 54 is disposed in the lamp head accommodation portion 51*e*. When the lighting device 50 is in the storage mode, the first shaft 54 at least partially overlaps the lamp head 521. In this example, the first shaft 54 is located below the lamp head 521.

When the lighting device 50 is in the storage mode, the telescopic assembly 531 is retracted to the second state. It is to be understood that the second state does not necessarily correspond to a shortest length of the telescopic assembly 531. In this case, the central axis 501 is perpendicular to the third axis 503. Alighting element 5213 of the lamp head 521 providing a light source faces downward. A locking mechanism 517 is provided on the first shaft 54 or provided on the base 51*a* and near the first shaft 54, and the locking mechanism 517 locks a position of the support leg 51*b* in the storage mode of the lighting device 50 so that when the lighting device 50 is in the storage mode, the support leg 51*b* is used as a handle for the user to conveniently hang and store the lighting device 50 or carry the lighting device 50 by hand. When the lighting device 50 is in the storage mode, the lighting device 50 has a dimension of less than or equal to 300 mm in the front and rear direction, a dimension of less than or equal to 200 mm in the left and right direction, and a dimension of less than or equal to 60 mm in the up and down direction.

When the telescopic assembly 531 is in a first state in which the telescopic assembly 531 has the longest length, the lighting device 50 has a dimension of greater than or equal to 1.5 m in the up and down direction.

In this example, a power supply connection assembly 511 includes a battery accommodation portion 5111 and a battery coupling portion 5112, where the battery pack 30 is at least partially disposed in the battery accommodation portion 5111, and the battery pack 30 is electrically connected to the battery coupling portion 5112.

In this example, the battery accommodation portion 5111 is disposed at the second end 51*d* of the base 51*a*, the battery accommodation portion 5111 is a groove opened on the base 51*a* and opened toward the second end 51*d*, and the battery pack 30 is inserted into the battery accommodation portion 5111 in a direction from the second end 51*d* of the base 51*a* to the first end 51*c* of the base 51*a*.

The battery coupling portion 5112 is further formed with a guide structure 5113 for guiding the battery pack 30 to be coupled to the battery accommodation portion 5111 along a direction of a first straight line T1. The first straight line T1 is perpendicular to the third axis 503 and perpendicular to the second axis 502. The battery pack 30 has a length direction, a width direction, and a height direction, and a dimension of the battery pack 30 in the length direction is greater than a dimension of the battery pack 30 in the width direction and greater than a dimension of the battery pack 30 in the height direction. The length direction of the battery pack 30 is parallel to the direction of the first straight line T1. The battery coupling portion 5112 is disposed on a surface of the battery accommodation portion 5111 parallel to a side surface of the base 51*a*. In this example, the battery coupling portion 5112 is provided on a sidewall of the groove of the base 51*a* in which the battery accommodation portion 5111 is located so that the lighting device 50 in the storage mode has better integrity and its shape tends to be a regular rectangle.

When the lighting device 50 is in the storage mode, the lamp head 521 is disposed at the front end of the battery pack 30, and the battery pack 30 and the lamp head 521 are located between the first plane Si and the second plane S2.

Figure 37:
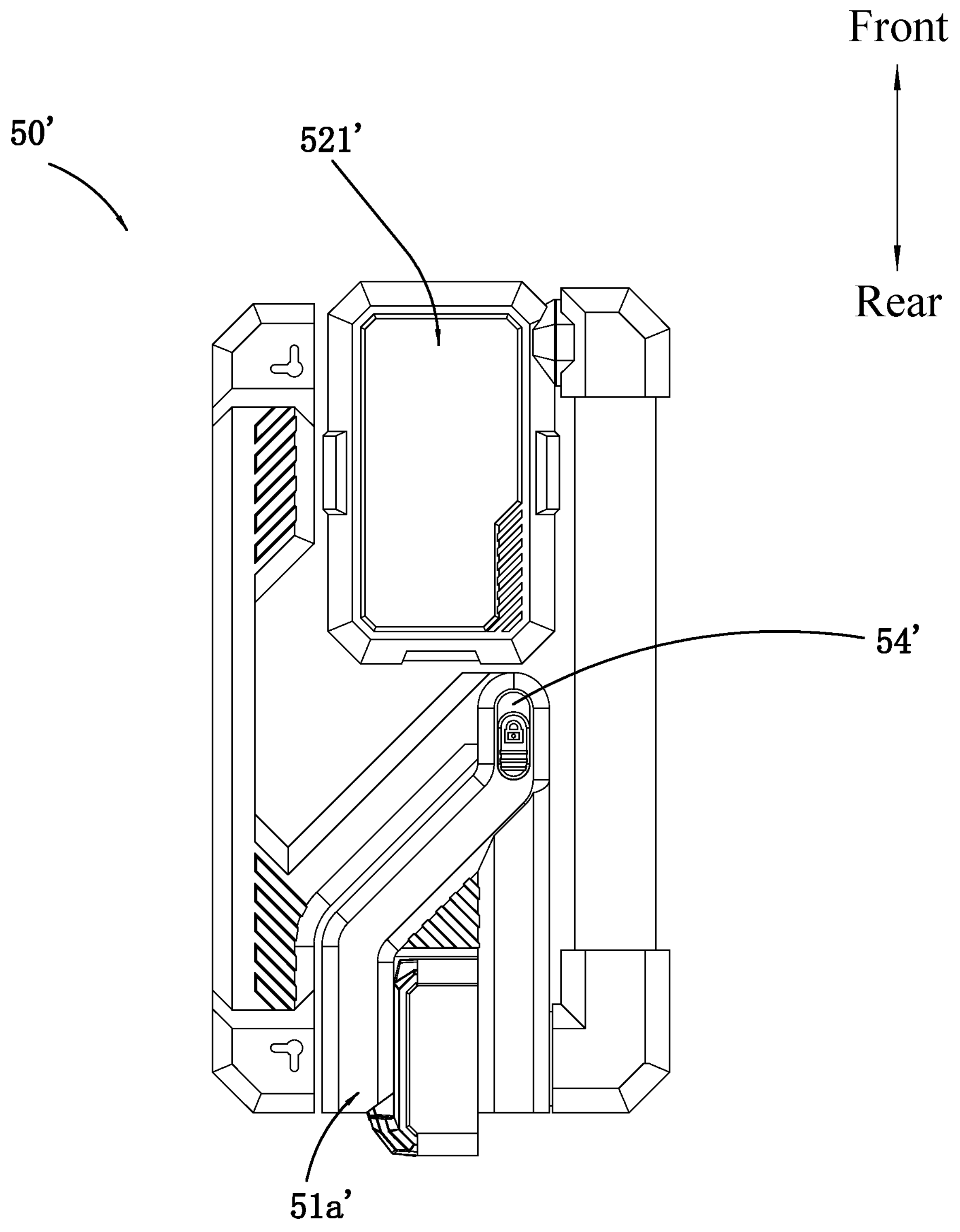
FIG. 37 is a top view of another lighting device in a storage mode according to a third example of the present application.

FIG. 37 shows an alternative structure of this example. When a lighting device 50' is in the storage mode, a lamp head 521' is located on the front side of a base 51*a*', a first shaft 54' is located at the foremost end of the base 51*a*', and basically the lamp head 521' does not overlap the base 51*a'*.

Figure 38:
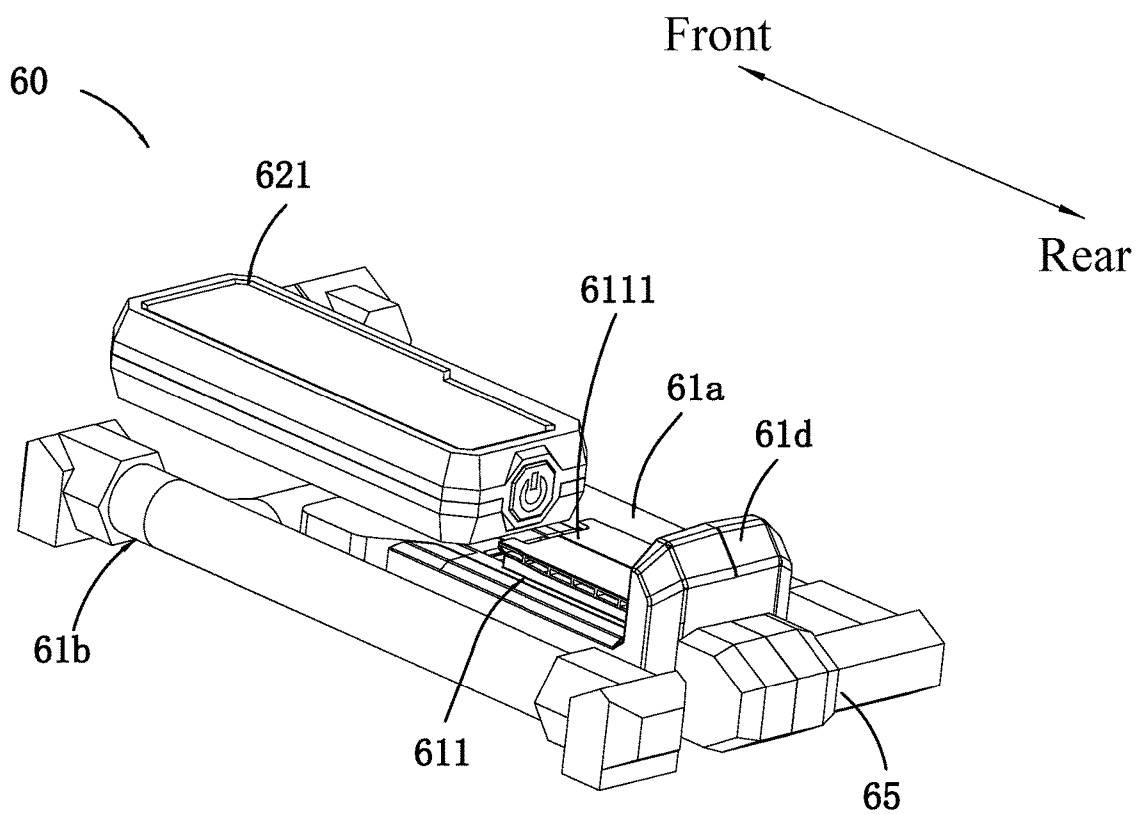
FIG. 38 is a structural view of a lighting device in a storage mode according to a fourth example of the present application, where a telescopic rod of a support leg is in a retracted state.
Figure 39:
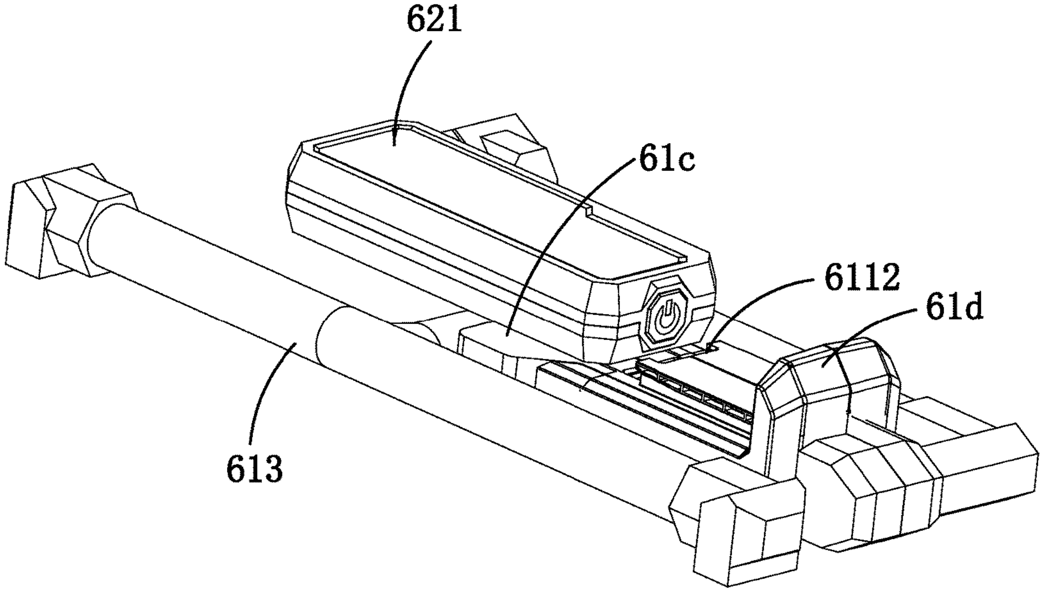
FIG. 39 illustrates that the telescopic rod of the support leg in FIG. 38 is in an extended state.
Figure 40:
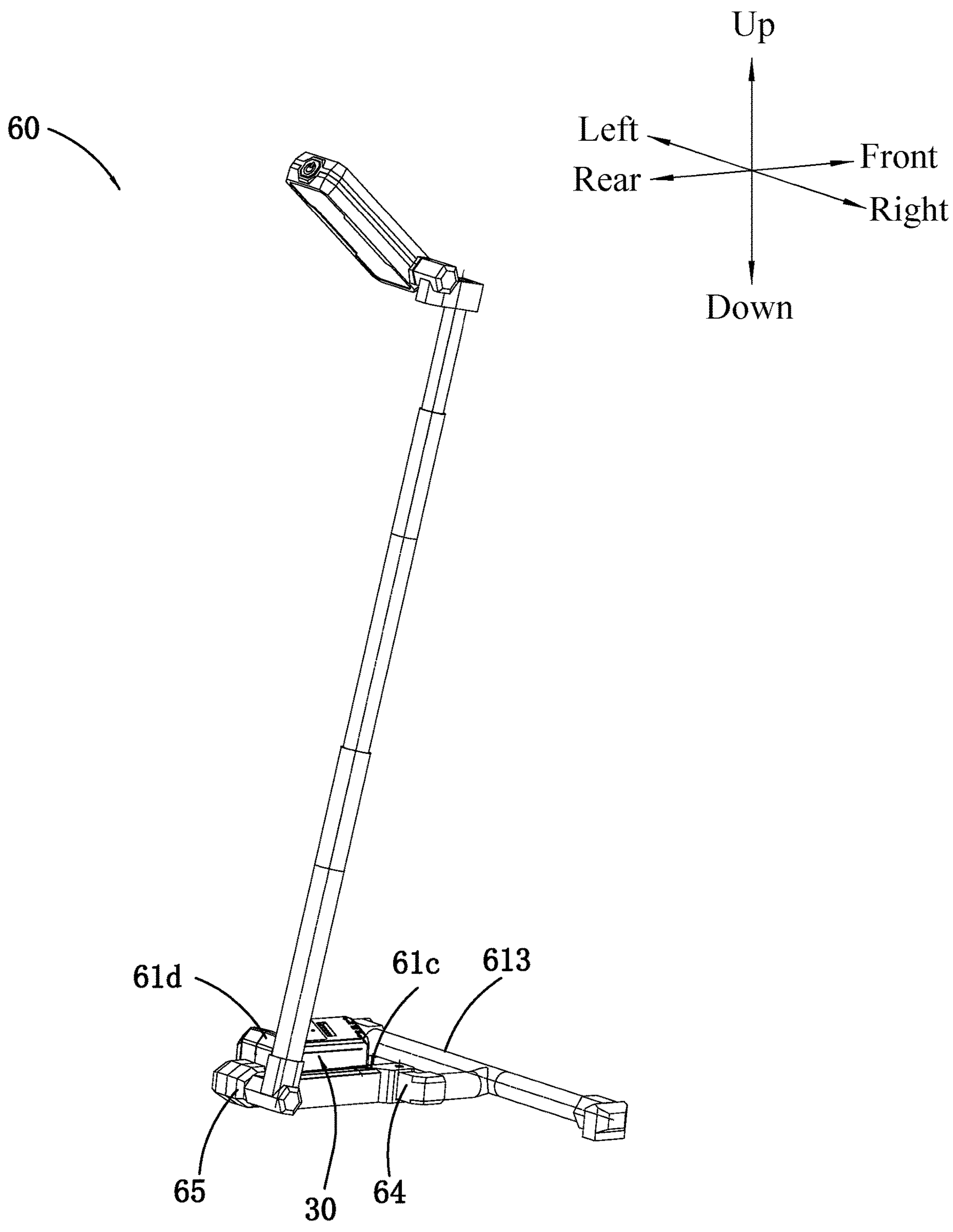
FIG. 40 is a structural view of a lighting device in FIG. 39 in a standing mode and a telescopic portion in FIG. 39 in a first state.

FIGS. 38 to 40 show a fourth example of the present application. Parts of the third example that are compatible with this example can be applied to this example, and only differences between this example and the third example are described below.

In this example, the battery pack 30 is inserted into a battery accommodation portion 6111 in a direction from a first end 61*c* to a second end 61*d*, and a battery coupling portion 6112 is disposed on a surface of the battery accommodation portion 6111 parallel to the upper surface of a base 61*a*. After mounted, the battery pack 30 is located in front of a second shaft 65. A battery mounting portion 611 is disposed near a first shaft 64.

When a lighting device 60 is in the storage mode, a lamp head 621 at least partially overlaps the battery mounting portion 611. When the lighting device 60 is in the storage mode, the battery pack 30 is not mounted on the battery mounting portion 611.

A support portion 613 of a support leg 61*b* is extendable or retractable to different lengths. In this example, the support portion 613 is a multi-stage adjustable telescopic rod. When the lighting device is in the storage mode, the support portion 613 is retracted to make the lighting device more compact.

Figure 41:
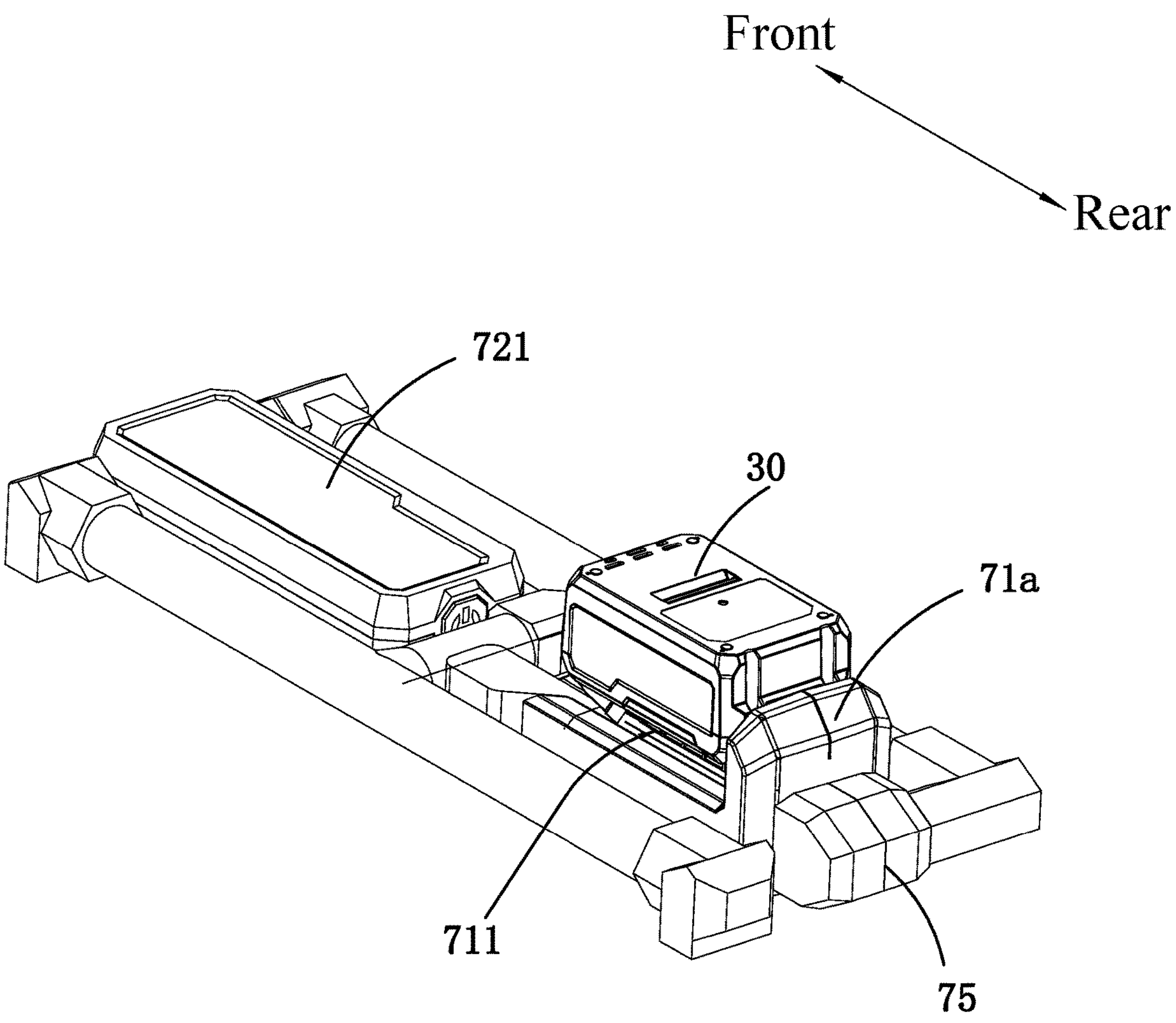
FIG. 41 is a structural view of a lighting device in a storage mode according to a fifth example of the present application.

FIG. 41 shows a fifth example of the present application. Parts of the fourth example that are compatible with this example can be applied to this example, and only differences between this example and the fourth example are described below.

In this example, a second shaft 75 is located at the rear end of a base 71*a*, and a battery mounting portion 711 is disposed near the second shaft 75. When a lighting device 70 is in the storage mode, a lamp head 721 does not overlap the battery mounting portion 711. When the lighting device 70 is in the storage mode, the battery pack 30 is mounted on the battery mounting portion 711.

Figure 42:
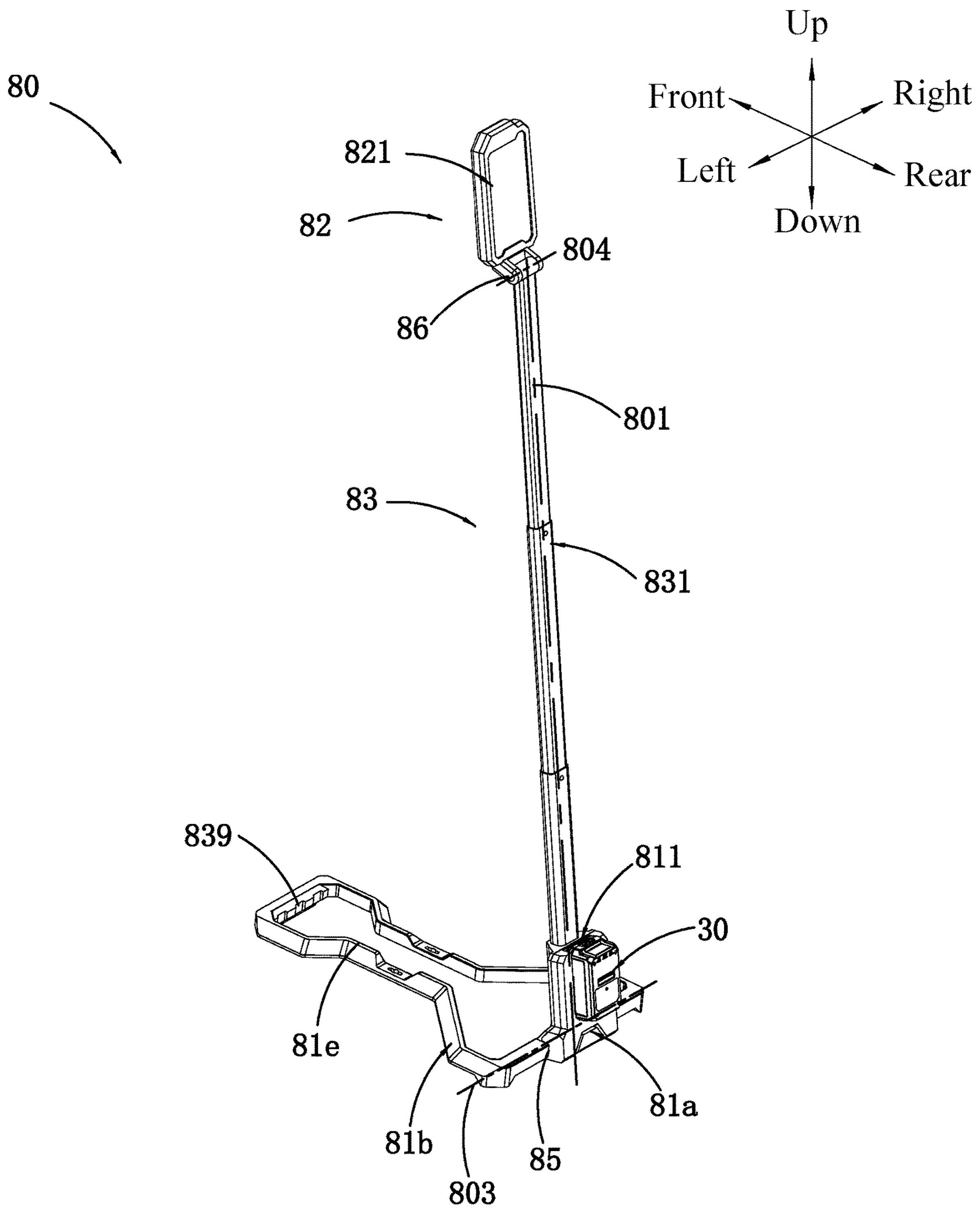
FIG. 42 is a structural view of a lighting device in a standing mode according to a sixth example of the present application.
Figure 43:
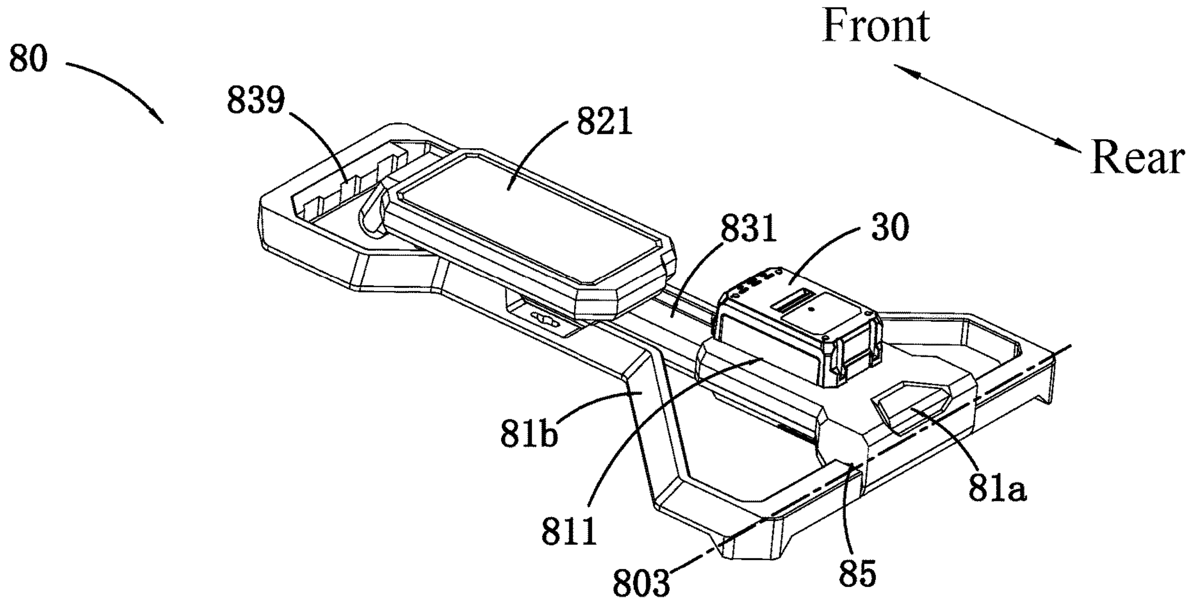
FIG. 43 is a structural view of the lighting device in FIG. 42 in a storage mode.
Figure 44:
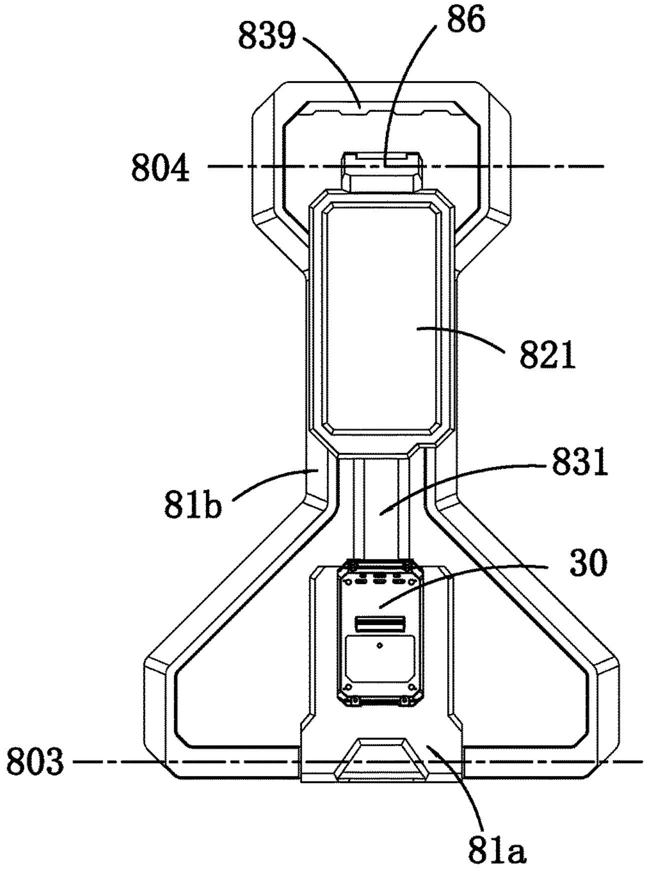
FIG. 44 is a structural view of the lighting device in FIG. 42 in a storage mode from another perspective.

FIGS. 42 to 44 show a sixth example of the present application. The base and the support leg in the third example are different from those in this example. In this example, the structures of the battery pack and lamp head adjustment and connection assemblies in this example are the same as those in the third example. Only differences between this example and the third example are described below.

In this example, a support leg 81*b* and a base 81*a* are rotatably connected by a first shaft 85. A battery mounting portion 811 is provided on the base 81*a*. Alighting mechanism 82 includes a lamp head 821. A connection mechanism 83 supports the lamp head 821. The base 81*a* is connected to the connection mechanism 83. When a lighting device 80 is switched between the standing mode and the storage mode, the battery mounting portion 811 and the connection mechanism 83 synchronously rotate relative to the support leg 81*b* through the first shaft 85.

In this example, the base 81*a* is disposed on the connection mechanism 83. When the lighting device 80 is switched between the standing mode and the storage mode, the base 81*a* and the connection mechanism 83 synchronously rotate relative to the support leg 81*b*. Specifically, the connection mechanism 83 includes a telescopic assembly 831, the base 81*a* is disposed at one end of the telescopic assembly 831 along a direction of a central axis 801, and the lamp head 821 is hinged to the other end of the telescopic assembly 831 about a third shaft 86. An axis of the first shaft 85 is a third axis 803. An axis of the third shaft 86 is a fourth axis 804. In this example, the central axis 801 is perpendicular to the third axis 803. The fourth axis 804 is perpendicular to the central axis 801. In other alternative examples, the fourth axis 804 may be parallel to the central axis 801 or the fourth axis 804 may obliquely intersect with the central axis 801.

When the lighting device 80 is in the storage mode, both the base 81*a* and the lighting mechanism 82 are at least partially located inside the support leg 81*b*. In this example, the base 81*a* and the telescopic assembly 831 are located inside the support leg 81*b*, and the support leg 81*b* is provided with a lamp head accommodation groove 81*e*. When the lighting device 80 is in the storage mode, the lamp head accommodation groove 81*e* accommodates at least part of the lamp head 821. The lamp head 821 is disposed on the front side of the battery pack 30. The support leg 81*b* is provided with a hanging portion 839 for hanging the lighting device 80 at a desired position. The lighting device 80 may be hung when the lighting device 80 is in the storage mode or the standing mode. In this example, the hanging portion 839 is provided at the front end of the support leg 81*b*. In other alternative examples, the hanging portion 839 may be provided at another position of the support leg 81*b*. When the lighting device is switched between the storage mode and the standing mode, the base 81*a* is held at any angular position relative to the support leg 81*b*.

Figure 45:
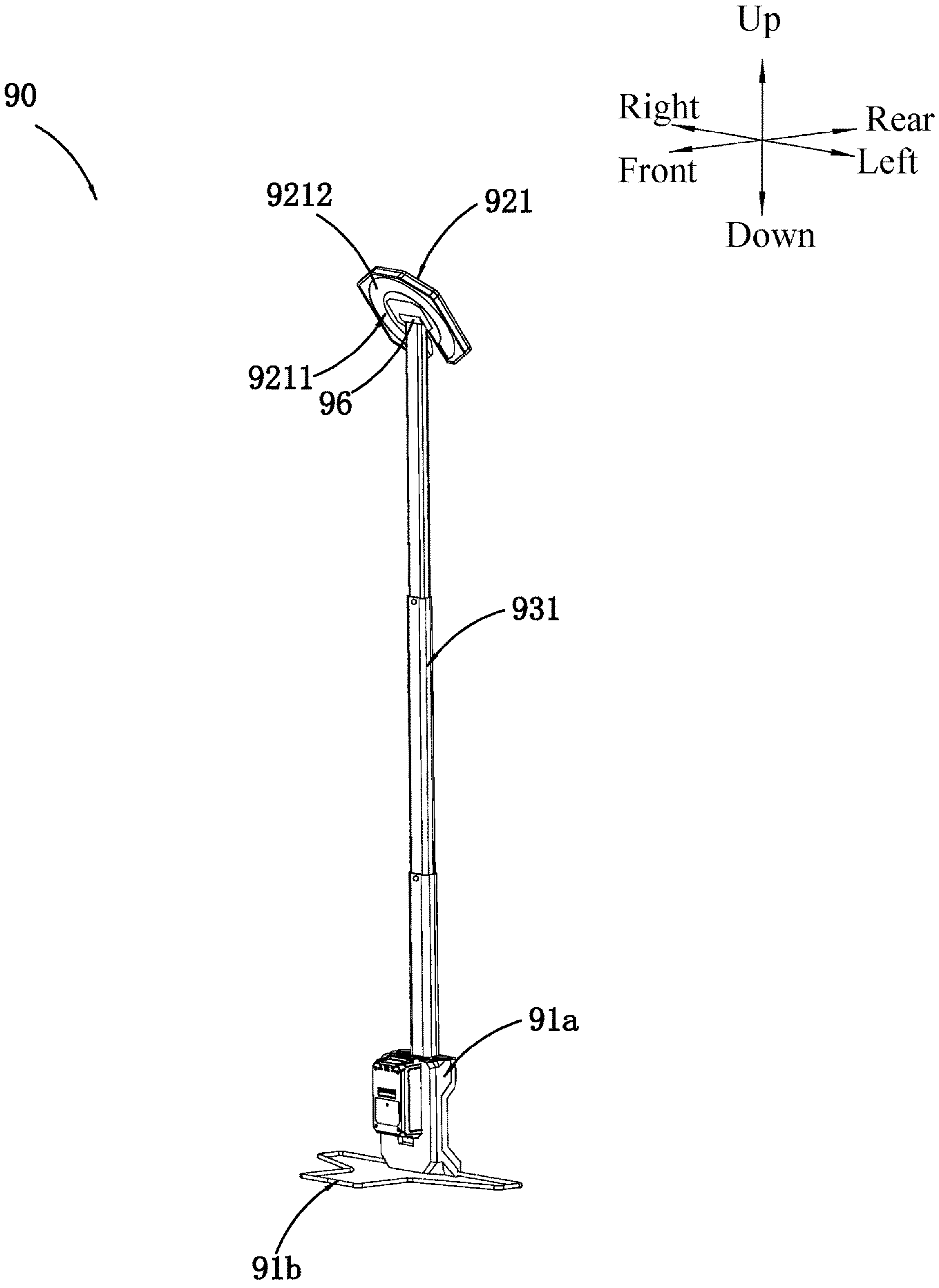
FIG. 45 is a structural view of alighting device in a standing mode and a telescopic portion in a first state according to a sixth example of the present application.
Figure 46:
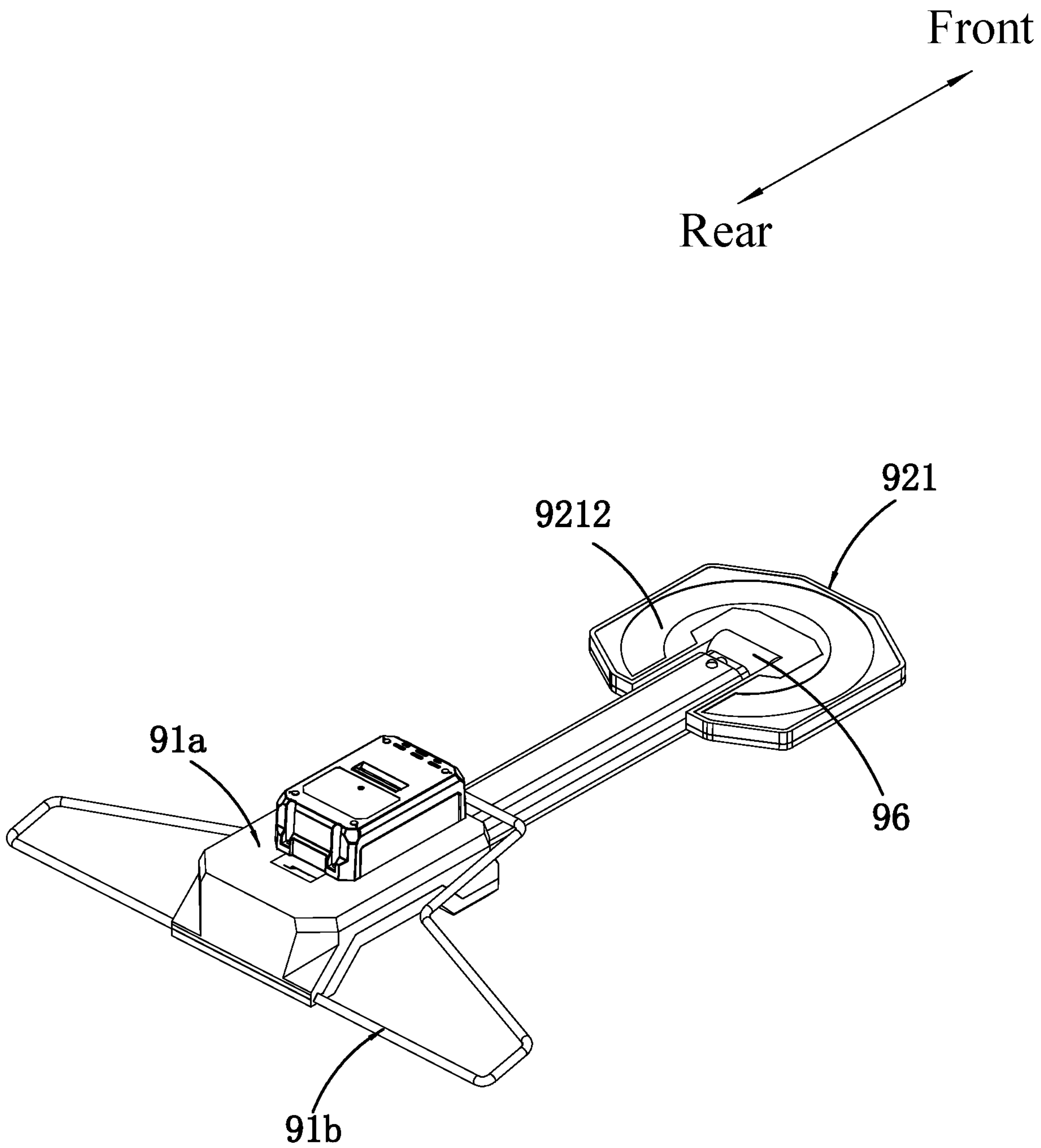
FIG. 46 is a structural view of the lighting device in FIG. 45 in a storage mode.

FIGS. 45 and 46 show a seventh example of the present application. Parts of the sixth example that are compatible with this example can be applied to this example, and only differences between this example and the sixth example are described below.

When a lighting device 90 is in the storage mode, a base 91*a* is disposed inside a support leg 91*b*, and a lamp head 921 is located on the front side of the support leg 91*b*. The lamp head 921 includes a shadowless lamp assembly 9211, where the shadowless lamp assembly 9211 has an annular structure, and the shadowless lamp assembly 9211 includes a light guide plate 9212 and a light-emitting element that emits toward the light guide plate. A telescopic assembly 931 is hinged to the lamp head 921 through a third shaft 96, and the center of the annular structure of the shadowless lamp is disposed on the third shaft 96.

What is claimed is:

1. A power tool, comprising:

a power tool body configured to be adapted to a first battery pack having a first nominal voltage and a first output terminal set and a second battery pack having a second nominal voltage, different than the first nominal voltage, and a second output terminal set;

wherein the power tool body comprises a first input terminal set configured to be selectively electrically connected to one of the first output terminal set and the second output terminal set to supply power to the power tool body, and wherein the power tool body comprises a controller configured to acquire a connection state of a preset terminal in the first input terminal set and determine, according to the connection state of the preset terminal, that the first battery pack or the second battery pack is connected to the power tool body.

2. The power tool of claim 1, wherein, when a number or structure of terminals in the first output terminal set is different from a number or structure of terminals in the second output terminal set, each terminal in the first input terminal set is arranged in correspondence to each terminal in the first output terminal set, and the preset terminal in the first input terminal set is staggered relative to a terminal in the second output terminal set.

3. The power tool of claim 1, wherein the controller is configured to determine that the first battery pack is connected to the power tool body when a preset terminal in the first input terminal set is connected to a signal.

4. The power tool of claim 1, wherein the preset terminal is selectively connected to a first output terminal in the first output terminal set or a second output terminal in the second output terminal set, the first output terminal outputs a first type of signal, and the second output terminal outputs a second type of signal.

5. The power tool of claim 4, wherein the controller is configured to determine that the first battery pack is connected to the power tool body when acquiring that the preset terminal is connected to the first type of signal and determine that the second battery pack is connected to the power tool body when the preset terminal is connected to the second type of signal.

6. The power tool of claim 1, wherein the power tool body comprises a conversion circuit configured to, when the second battery pack is connected to the power tool body, make a communication power supply be electrically connected to the preset terminal and, when the first battery pack is connected to the power tool body, make the communication power supply be disconnected from the preset terminal.

7. The power tool of claim 6, wherein the conversion circuit is further configured to, when the first battery pack is connected to the power tool body, prevent a current of the first battery pack from flowing to the power tool body through the first output terminal.

8. The power tool of claim 1, wherein the power tool body comprises:

an over-discharge protection circuit configured to prevent a current of the first battery pack from flowing to the power tool body when a voltage outputted by the first battery pack is less than a first preset voltage, and further configured to prevent a current of the second battery pack from flowing to the power tool body when a voltage outputted by the second battery pack is less than a second preset voltage; and a compatible circuit configured to enable the over-discharge protection circuit to be adapted to the first preset voltage of the first battery pack and the second preset voltage of the second battery pack.

9. The power tool of claim 1, wherein the first output terminal set is different from the second output terminal set, and the first input terminal set is configured to be selectively electrically connected to one of the first output terminal set and the second output terminal set to supply power to the power tool body.

10. The power tool of claim 1, wherein the controller is configured to operate when a first voltage is applied, the power tool body further comprises a voltage regulation mechanism converting an input voltage inputted from the first input terminal set and outputting the converted input voltage to supply power to the controller, the voltage regulation mechanism comprises a first transformer circuit and a second transformer circuit, the second transformer circuit transforms the input voltage to the first voltage when the input voltage is greater than the first voltage, and the first transformer circuit transforms the input voltage to a second voltage and the second transformer circuit transforms the second voltage to the first voltage when the input voltage is less than or equal to the first voltage.

11. The power tool of claim 10, wherein the voltage regulation mechanism further comprises a first control circuit, the first control circuit is turned on and the second transformer circuit transforms the input voltage to the first voltage when the input voltage is greater than the first voltage, and the first transformer circuit transforms the input voltage to the second voltage and the second transformer circuit transforms the second voltage to the first voltage when the input voltage is less than or equal to the first voltage.

12. The power tool of claim 1, wherein the power tool body is a lighting device.

13. The power tool of claim 12, wherein the lighting device is used for standing on a ground and illuminating a work region and comprises:

a support mechanism;

a lighting mechanism comprising a lamp head for emitting light; and a connection mechanism for supporting the lamp head connected to the support mechanism;

wherein the lighting device has a standing mode and a storage mode, in the standing mode the lighting device is configured to be supported by a resting surface of the support mechanism, the support mechanism comprises a base and a single support leg, and, when the lighting device is in the standing mode, a first end of the support leg is connected to the base, a second end of the support leg is away from the base, and a projection of the second end on the resting surface is at least partially outside a projection of the base on the resting surface.

14. The power tool of claim 1, wherein the power tool body comprises an electric motor and a controller for controlling the electric motor.

15. A power tool system, comprising:

a power tool body; and a first battery pack having a first nominal voltage and a first output terminal set;

wherein the power tool body is directly connectable to the first battery pack, the power tool body is configured to be further directly connectable to a second battery pack having a second nominal voltage and a second output terminal set when the first battery pack is not mounted on the power tool body, the first nominal voltage is different from the second nominal voltage, the first output terminal set is different from the second output terminal set, and the power tool body comprises a first input terminal set configured to be selectively electrically connected to one of the first output terminal set and the second output terminal set to supply power to the power tool body.

16. The power tool system of claim 15, wherein the power tool body is a lighting device.

17. The power tool system of claim 16, wherein the lighting device is used for standing on a ground and illuminating a work region, the lighting device comprises a support mechanism, a lighting mechanism comprising a lamp head for emitting light, and a connection mechanism for supporting the lamp head, the connection mechanism is connected to the support mechanism, the support mechanism comprises a base and a single support leg, the lighting device has a standing mode and a storage mode, and, in the standing mode, the lighting device is configured to be supported by a resting surface of the support mechanism, and the resting surface comprises at least one end of the support leg.

18. The power tool system of claim 15, wherein the power tool body comprises an electric motor and a controller for controlling the electric motor.

* * * * *